Oct. 18, 1966 N. KITZ 3,280,315

KEY CONTROLLED DECIMAL ELECTRONIC CALCULATING MACHINE

Filed Dec. 29, 1961 21 Sheets-Sheet 1

INVENTOR
NORBERT KITZ
BY
Pennie, Edmonds, Morton, Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 2

INVENTOR
NORBERT KITZ
BY
Pennie, Edmonds, Morton, Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 3

INVENTOR
NORBERT KITZ
BY
Pennie Edmonds Morton Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 4

INVENTOR
NORBERT KITZ
BY
Pennie, Edmonds, Morton, Barrows & Taylor
ATTORNEYS

INVENTOR
NORBERT KITZ
BY
Pennie, Edmonds, Morton, Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 6

INVENTOR
NORBERT KITZ
BY
Pennie, Edmonds, Morton, Barrows & Taylor
ATTORNEYS

INVENTOR
NORBERT KITZ
BY
Pennie, Edmonds, Morton
Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961

21 Sheets-Sheet 8

INVENTOR
NORBERT KITZ
BY
Pennie Edmonds Morton Barrows & Taylor
ATTORNEYS

INVENTOR
NORBERT KITZ
BY
Pennie, Edmonds, Morton, Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 10

INVENTOR
NORBERT KITZ

BY
Pennie Edmonds Morton Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 11

INVENTOR

Norbert Kitz

BY

Pennie Edmonds Morton Barrows & Taylor

ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 12

INVENTOR
Norbert Kitz
BY
Pennie Edmonds Morton Barrows Taylor
ATTORNEYS

INVENTOR
Norbert Kitz
BY
Pennie, Edmonds, Morton, Barrows & Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 14

INVENTOR
Norbert Kitz
BY
Pennie Edmonds Morton Barrows Taylor
ATTORNEYS

Oct. 18, 1966 N. KITZ 3,280,315

KEY CONTROLLED DECIMAL ELECTRONIC CALCULATING MACHINE

Filed Dec. 29, 1961 21 Sheets-Sheet 15

INVENTOR
Norbert Kitz
BY
Pennie Edmonds Morton Barrows + Taylor
ATTORNEYS

INVENTOR
Norbert Kitz
BY
Pennie Edmonds Morton Barrows Taylor
ATTORNEYS

Oct. 18, 1966
N. KITZ
3,280,315
KEY CONTROLLED DECIMAL ELECTRONIC CALCULATING MACHINE
Filed Dec. 29, 1961
21 Sheets-Sheet 17

INVENTOR
Norbert Kitz
BY
Pennie Edmonds Morton Barrows & Taylor
ATTORNEYS

INVENTOR
Norbert Kitz
BY
Pennie Edmonds Morton Barrows Taylor
ATTORNEYS

KEY CONTROLLED DECIMAL ELECTRONIC CALCULATING MACHINE

Filed Dec. 29, 1961

INVENTOR

Norbert Kitz

BY

Pennie Edmonds Morton Barrows & Taylor

ATTORNEYS

Oct. 18, 1966 N. KITZ 3,280,315

KEY CONTROLLED DECIMAL ELECTRONIC CALCULATING MACHINE

Filed Dec. 29, 1961

21 Sheets-Sheet 20

INVENTOR

Norbert Kitz

BY

ATTORNEYS

Oct. 18, 1966 N. KITZ 3,280,315

KEY CONTROLLED DECIMAL ELECTRONIC CALCULATING MACHINE

Filed Dec. 29, 1961

21 Sheets-Sheet 21

INVENTOR
Norbert Kitz
BY
Pennie Edmonds Morton Barrows & Taylor
ATTORNEYS

United States Patent Office 3,280,315
Patented Oct. 18, 1966

3,280,315
KEY CONTROLLED DECIMAL ELECTRONIC CALCULATING MACHINE

Norbert Kitz, London, England, assignor to Bell Punch Company Limited, London, England, a company of Great Britain Filed Dec. 29, 1961, Ser. No. 164,645
45 Claims. (Cl. 235—160)

This invention relates to calculating machines, and more particularly to digital calculating machines which may be constructed, in various forms all including important elements in common, to perform any one or more of the arithmetical operations of addition, subtraction, multiplication and division. The invention may be embodied in machines operating essentially by electromechanical means, as regards the development and accumulation together of digital pulses for delivery to storage means, and it may also be embodied in machines employing space discharge devices for the performance of those functions. The present invention is a continuation-in-part of my applications Serial Nos. 682,376, 682,394 and 682,396 filed September 6, 1957 and of my application Serial No. 819,068 filed June 9, 1959, all of which applications have been abandoned.

The invention will now be further described by reference to the accompanying drawings in which.

Figure 13:
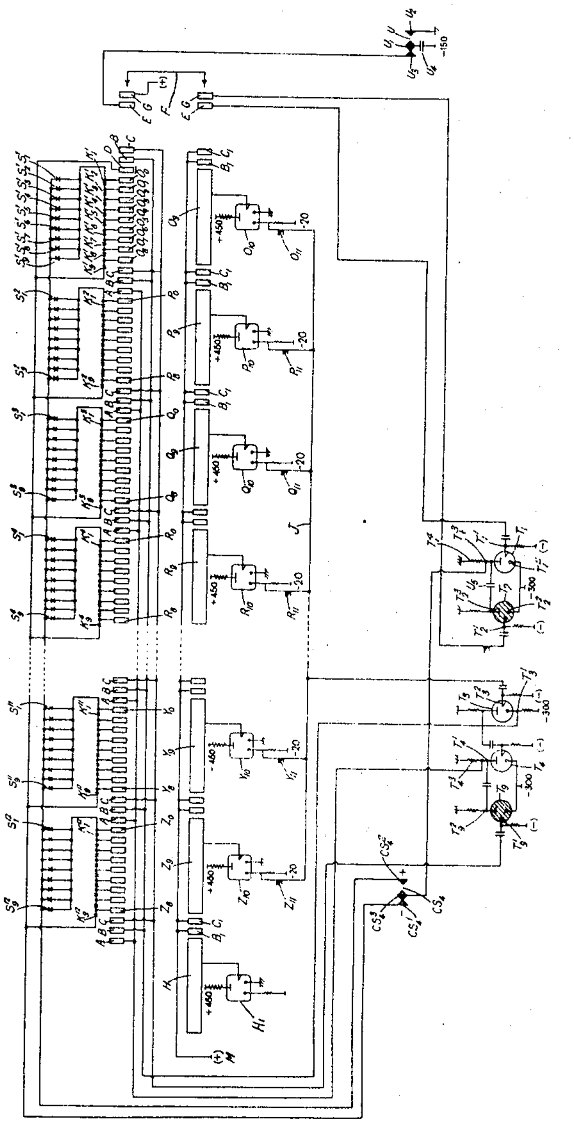
FIGURE 13 is a circuit diagram similar to that of FIGURE 1, but showing the components of the circuit of FIGURE 1 necessary to carry out the operations of addition and subtraction only.

Referring to FIGURE 13 of the drawings, there is shown a circuit diagram of an electromechanical calculating machine constructed in accordance with the present invention, and adapted to perform the operations of addition and subtraction.

In the circuit diagram shown in FIGURE 13 there is diagrammatically illustrated a machine comprising twelve orders of keys. Each order of keys is provided with nine keys, each key being arranged to be manually operated and in so doing to close one pair of contacts associated with said key and open a second pair of contacts associated with the same key. The two pairs of contacts associated with each of these keys are hereinafter designated as S and K contacts and each pair of contacts is designated by a pair of index figures, the superscript indicating the order of keys with which the contacts are associated, the subscript representing the number of the key of the said order. Contacts S and K are respectively normally open and normally closed. Thus the contacts marked $S^3_1$ and $K^3_1$ comprise the contacts which are associated with the first key of the third order of keys. The contacts associated with any one order of keys are connected, in a manner hereinafter described, to nine studs arranged for example as a printed circuit or as a series of studs embedded in a suitable material or in any other suitable manner, in circular formation upon the face of a commutator plate.

The studs associated with the first order of keys are designated $O_0$ to $O_8$, those associated with the second order of keys as $P_0$ to $P_8$, those associated with the third order of keys as $Q_0$ to $Q_8$, those associated with the fourth order of keys as $R_0$ to $R_8$ and so on, for twelve orders of keys, so that the studs associated with the eleventh and twelfth order of keys are designated $Y_0$ to $Y_8$ and $Z_0$ to $Z_8$ respectively. Thus in a calculating machine constructed in accordance with the present invention in which there are twelve orders of keys designed to effect calculations based upon the decimal system, a predetermined number of the nine studs associated with any one particular order of keys can be energized upon the actuation of a selected key of that order. The number of studs which are selected depend upon whether the machine is set to effect addition or subtraction. In the case of addition the number of studs selected is the same as the number which the actuated key represents whereas in the case of subtraction the number of studs selected is the nines complement of the number which the actuated key represents.

Considering the arrangement of S and K pairs of contacts illustrated in FIGURE 13 in connection with the first order of keys, it will be observed that the pairs of contacts $S^1_1$ to $S^1_9$ are connected in parallel with one another and that the pairs of contacts $K^1_1$ to $K^1_9$ are connected in series with one another and also in series with the parallel arranged $S^1_1$ to $S^1_9$ pairs of contacts.

The studs associated with the first order of keys are designated $O_0$ to $O_8$ and are so connected that the first stud $O_0$ is arranged in series with the pair of contacts $S^1_1$ and the remaining studs $O_1$ to $O_8$ are connected so that the stud $O_1$ is connected between the pairs of contacts $K^1_1$ and $K^1_2$, the stud $O_2$ is connected between the pairs of contacts $K^1_2$ and $K^1_3$, the stud $O_3$ between pairs of contacts $K^1_3$ and $K^1_4$, the stud $O_4$ between the pairs of contacts $K^1_4$ and $K^1_5$, the stud $O_5$ between the pairs of contacts $K^1_5$ and $K^1_6$, the stud $O_6$ between the pairs of contacts $K^1_6$ and $K^1_7$, whilst the stud $O_7$ is connected between the pairs of contacts $K^1_7$ and $K^1_8$ whilst the stud $O_8$ is connected between the pairs of contacts $K^1_8$ and $K^1_9$.

The pair of contacts $K^1_9$ is connected to one terminal $CS^1_4$ of a two-way switch $CS_4$ whilst the pairs of contacts $S^1_1$ to $S^1_9$ are connected in parallel to the other terminal $CS^2_4$ of the two-way switch $CS_4$.

When the anode $T^3_1$ of a valve $T_1$ is connected through the terminal $CS^2_4$ of the two-way switch $CS_4$ to the S pairs of contacts of the first order of keys and a key of the first order of keys is actuated the number of studs corresponding to the number which the actuated key represents will have a potential applied to them whereas when the anode $T^3_1$ of the valve $T_1$ is connected to the K pairs of contacts through the terminal $CS^1_4$ of the two-way switch $CS_4$ and a key of the first order of keys is actuated a number of studs corresponding to the nines complement of the number which the actuated key represents will have a potential applied to them. It will be observed that if $CS_4$ is set with the terminal $CS^3_4$ in contact with the terminal $CS^1_4$ and if none of the keys of an order of keys is actuated all the nine studs of the said order will have a potential applied to them whereas if the No. 1 key of that order of keys is actuated eight studs will have a potential applied to them, that is, one less than the number of studs.

The above arrangement enables both addition and subtraction to be effected by depressing a key indicative of the figure which has to be added or subtracted, thus avoiding the necessity of providing keys with two figures, one the complement of the other, in order to guide an operator in the case of a calculation where subtraction is required.

The arrangement described above applies to the studs associated with each order of the twelve orders of keys comprising the machine.

Associated with each batch of studs and arranged parallel thereto are commutator segments $O_9$, $P_9$, $Q_9$, $R_9$, etc., up to $Y_9$ and $Z_9$. Arranged between adjacent batches of nine studs $O_0$ to $O_8$, $P_0$ to $P_8$, $Q_0$ to $Q_8$ and so on up to $Y_0$ to $Y_8$ and $Z_0$ to $Z_8$ are three studs C, B and A. Each pair of studs C and B are arranged in alignment with corresponding pairs of studs $C_1$ and $B_1$, mounted in advance (that is to the right of the right-hand end when viewing FIGURE 13) of each of the commutator segments $O_9$, $P_9$, $Q_9$, $R_9$ and so on up to $Y_9$ and $Z_9$, whilst each of the studs A are arranged in line with the leading portion (that is, the right-hand end portion when viewing FIGURE 13) of each of the commutator segments $O_9$ to $Z_9$. Further, arranged in advance (that is to the right of the stud $O_0$ when viewing FIGURE 13) of the studs $O_0$ to $O_8$ and in line with the leading end (that is the right-hand end portion when viewing FIGURE 13) of the commutator segment $O_9$ of the first order of keys is a stud D to which is applied a negative potential when the switch $CS_4$ is set in the position indicated in the drawing where the machine is arranged to effect subtraction.

The commutator segments $O_9$ to $Z_9$ are each connected to a separate accumulator $O_{10}$ to $Z_{10}$, operable as a result of electrical impulses, and each accumulator is connected through a separate diode $O_{11}$ to $Z_{11}$ or other unidirectional electronic device to a bus-bar J.

Mounted in advance of the batch of studs $O_0$ to $O_8$ and the associated commutator segment $O_9$ (that is to the right of the right-hand stud $O_0$, and to the right of the right-hand end of the commutator segment $O_9$ when viewing FIGURE 13) are a pair of studs E—E which are arranged to be swept by a rotatable brush F preferably arranged to rotate continuously and operable to short circuit any pair of contacts or a contact and a commutator segment which it may bridge. The brush F is arranged as it rotates to sweep over the batches of $O_0$ to $O_8$ up to $Z_0$ to $Z_8$ studs and the commutator segments $O_9$ to $Z_9$ of the various orders of keys so as to bridge associated studs and commutator segments. The brush F is also arranged to bridge the A studs and their associated commutator segments $O_9$ to H and also the B–$B_1$ and the C–$C_1$ studs associated with each order of keys.

The studs C and B mounted in advance of each batch of studs $O_0$ to $O_8$ up to $Z_0$ to $Z_8$ are connected respectively to the trigger electrode $T^1_9$ of the valve $T_9$ and to the cathode $T^1_3$ of the valve $T_3$ whilst the studs $C_1$ and $B_1$ mounted in advance of corresponding commutator segments $O_9$ to $Z_9$ and H are connected to a source of positive potential M.

The studs A mounted adjacent to the leading studs, namely the studs $P_0$, $Q_0$, $R_0$ and so on up to $Y_0$ and $Z_0$ and also following the stud $Z_8$ are connected to the anode $T^1_4$ of a valve $T_4$. The valves $T_3$ and $T_4$ are arranged as a two stage transfer store.

One of the studs E—E is connected to a "one shot device" which comprises a condenser $U_4$ arranged normally to be connected through a common contact $U_1$ and a contact $U_2$ of a two-wap switch U to a source of power designed to charge the condenser $U_4$. When the common contact $U_1$ breaks contact with the contact $U_2$ and makes contact with the contact $U_3$ the condenser U is connected to the upper one of tthe studs E—E above referred to and when the studs E—E are bridged by the brush F, a striking pulse is applied to the trigger electrode $T^1_1$ of the valve $T_1$.

The $O_0$ to $O_8$ up to the $Z_0$ to $Z_8$ studs and the corresponding commutator segments $O_9$ to $Z_9$ associated with the various orders of keys and also the commutator segment H associated with the stud A to the left of $Z_0$ to $Z_8$ are arranged in circular concentric paths upon a commutator plate 12 (FIG. 4) and the brush F is mounted concentrically with the said studs and commutator segments so that as the brush F rotates it successively bridges the $O_0$ to $O_8$ up to $Z_0$ to $Z_8$ studs and the associated commutator segments $O_9$ to $Z_9$ and the stud A to the left of the studs $Z_0$ to $Z_8$ and the commutator H.

The studs $O_0$ to $O_8$ up to $Z_0$ to $Z_8$ and the studs C, B and A, as also the commutator segments $O_9$ to $Z_9$ and H and the associated studs $C_1$, $B_1$ are illustrated in the drawing as lying in line with the brush F regarded as moving over the studs and commutator segments in a linear path from right to left.

It will be observed that when the brush F bridges the studs E—E with the contacts $U_1$ and $U_3$ connecting the condenser $U_4$ to one of the studs E, a positive pulse is applied to the trigger electrode $T^1_1$ of the valve $T_1$. The valve $T_1$ is connected in circuit with a valve $T_2$ which is normally conducting. The cathode $T^2_1$ of the valve $T_1$ is connected to the cathode $T^2_2$ of the valve $T_2$ whilst the anodes $T^3_1$ and $T^3_2$ of the valves $T_1$ and $T_2$ are connected by a condenser $U_5$. The circuit arrangement of the valves $T_1$ and $T_2$ is such that when the valve $T_1$ is conducting the valve $T_2$ is non-conducting and vice versa.

The anode $T^3_1$ of the valve $T_1$ is connected to the common terminal $CS^3_4$ of the two-way switch $CS_4$. The two-way switch $CS_4$ is operable so that in one position with the contact $CS^2_4$ in engagement with the common terminal $CS^3_4$ a circuit is connected from the anode $T^3_1$ of the valve $T_1$ through the common terminal $CS^3_4$ and the contact $CS^2_4$, of the two-way switch $CS_4$, to all the pairs of S contacts of the various orders of keys. Whilst when the common terminal $CS^3_4$ of the two-way switch $CS_4$ is placed in engagement with the contact $CS^1_4$ the anode $T^3_1$ of the valve $T_1$ is connected directly to the K pairs of contacts of the various orders of keys.

It will be observed that all the $O_0$ to $O_8$ up to $Z_0$ to $Z_8$ studs associated with the various orders of keys are normally at zero potential whilst the pairs of $CC_1$ and $BB_1$ studs, when bridged by the brush F, successively apply a positive potential from M to the trigger electrode $T^1_9$ of the valve $T_9$ and the cathode $T^1_3$ of the valve $T_3$. The potentials applied to the cathodes of the valves $T_1$, $T_2$, $T_3$, $T_4$ and $T_9$ are as indicated, merely by way of example, in FIGURE 1 as −300 volts. The anode $T^3_1$ of the valve $T_1$ and the anode $T^1_4$ of the valve $T_4$ are provided with anode resistors $T^4_1$ and $T^3_4$ respectively which ensure that when the valves $T_1$ and $T_4$ are conducting a potential of −150 volts is applied to the studs to which they are connected.

An accumulator $H_1$ is connected to a commutator segment H with which there is not associated an order of keys, the function of the accumulator $H_1$ is merely to accept from the stud A disposed between the $Z_0$ to $Z_8$ and the $O_0$ to $O_8$ series of studs, any transfer that may be transmitted from the accumulator $Z_{10}$.

Arranged in advance (that is to the right-hand side when viewing FIGURE 1) of the studs E—E are a pair of studs G—G one of which is connected to a source of positive potential whilst the other is connected to the trigger electrode $T^1_2$ of the valve $T_2$.

When the machine is set for operation but none of the keys of the various orders of keys has been actuated, the valves $T_2$ and $T_9$ are conductive as is indicated by shade lines, whilst the valves $T_1$, $T_3$ and $T_4$ are non-conductive. The circuit arrangements of the valves $T_1$ and $T_2$ are such that when the valve $T_2$ is conductive the valve $T_1$ is nonconductive and vice versa.

The construction of the machine is such that, in the case of addition and subtraction, upon the depression of any one key of an order of keys a motor driving the movable parts thereof is automatically switched on. As a result of the operation of the motor the contacts $U_1$ and $U_3$ of the one shot device are closed and the condenser $U_4$ is connected to one of the studs E—E.

The brush F which is caused to rotate as a result of the switching on of the motor will be assumed to bridge firstly the contacts E—E and thereby apply a positive pulse to the trigger electrode $T^1_1$ of the valve $T_1$, thus causing the valve $T_1$ to be rendered conductive and the valve $T_2$ nonconductive. As hereinbefore stated, depending upon the position of the common terminal of the two-way switch $CS_4$ the potential from the anode $T^3_1$ of the valve $T_1$ is either applied directly to the S or K pairs of contacts of the various orders of keys.

As the brush F proceeds in its path it bridges and short circuits the studs $C–C_1$ the effect of which is to apply a positive potential from the terminal M to the trigger electrode $T^1_9$ of the valve $T_9$ but as the valve $T_9$ is normally conductive the application of this positive potential is noneffective. The further movement of the brush F causes it to bridge and short circuit the studs $B–B_1$ the effect of which is to apply a positive potential from the terminal M to the cathode $T^1_3$ of the valve $T_3$ but as the valve $T_3$ is at this stage nonconductive the application of the said positive potential is noneffective. It will be observed that at this stage of the operations the transfer device comprising the valves $T_3$, $T_4$ and $T_9$ has been cleared. The continued movement of the brush F causes it to bridge a contact D and the leading end (that is the right-hand end when viewing FIGURE 1) of the commutator segment $O_9$ which if the common terminal $CS^3_4$ of the two-way switch $CS_4$ is making contact with the contact $CS^1_4$ has a negative potential applied to it, whereas if the common terminal $CS^3_4$ of the two-way switch $CS_4$ is making contact with the contact $CS^2_4$ the stud D is dead.

The purpose of the stud D will be hereinafter explained when dealing with subtraction.

The further movement of the brush F over the studs $O_0$ to $O_8$ of the first order of keys transmits, in the form of an impulse or impulses, the potential, which has been applied to a stud or a selected series of studs of the first order of keys as the result of a key actuation, to the commutator segment $O_9$, whereupon the impulse or impulses are transmitted from the commutator segment $O_9$ to the accumulator $O_{10}$ to register in the said accumulator a numeral which is related to the numeral of the actuated key of the first order of keys.

The continued movement of the brush F causes it to bridge studs $C–C_1$ which precede the studs $P_0$ to $P_8$ associated with the second order of keys. The bridging of the studs $C–C_1$ applies a potential to the trigger electrode $T^1_9$ of the valve $T_9$ which remains conductive or is returned to the conductive state depending upon whether or not a carry was being propagated. If there was such a carry $T_4$ will be turned on by $T_3$ clearing. When the brush F bridges the $B–B_1$ studs which precede the second order of studs $P_0$ to $P_8$, the effect is as with the first order that the valve $T_3$ remains nonconductive. As the brush F sweeps over the studs of the second order of studs $P_0$ to $P_8$ to which a potential has been applied from the anode $T^3_1$ of the valve $T_1$, an impulse or impulses is or are transmitted through the commutator segment $P_9$ to the accumulator $P_{10}$ of the second order of keys to vary the value registered in the second accumulator by an amount related to the value of the actuated key. The further movement of the brush F over the succeeding orders of studs $Q_0$ to $Q_8$ up to $Z_0$ to $Z_8$ will vary the value in the succeeding accumulators $Q_{10}$ to $Z_{10}$ by numbers which are related to the keys which are actuated in the said orders.

When the brush F has made one complete revolution it will bridge the studs G—G and in so doing will apply a positive potential to the trigger electrode $T^1_2$ of the valve $T_2$, thereby rendering the valve $T_2$ conductive, and the valve $T_1$ nonconductive.

When the accumulator associated with any one order of keys reaches the maximum numeral that that accumulator is designed to register means are provided according to the present invention to transfer unity into the accumulator of the next higher order. This is in the main accomplished by the provision of a two stage transfer store which comprises, following each of the pairs of studs $B–B_1$ and $C–C_1$, the provision of a stud A arranged in line with the leading end of the associated commutator segment and capable of having a potential applied to it upon an accumulator of one order reaching the maximum capacity thereof and transferring an impulse as a result of such applied potential to the accumulator of the next higher order. The arrangement according to the present invention is that each A stud disposed between succeeding orders of studs $O_0$ to $O_8$ up to $Z_0$ to $Z_8$ has a potential applied to it when the accumulator of the preceding order has reached the maximum numeral that it is designed to register. Thus in the arrangement illustrated in FIGURE 13 it will be assumed that the accumulators $O_{10}$ to $Z_{10}$ are operable to register according to the decimal system. The accumulators are designed so that in changing from 9 to 0 an accumulator transmits an impulse through a diode or any other undirectional electronic tube associated with the said accumulator to a bus-bar J from which it is transmitted to the trigger electrode $T^2_3$ of the valve $T_3$ whereby the valve $T_3$ is rendered conductive. The further movement of the brush F bridges the contacts $B$–$B_1$ which applies a positive potential from the terminal M to the cathode $T^1_3$ of the valve $T_3$ thus rendering the valve $T_3$ nonconductive and the valve $T_4$ conductive. The valves $T_3$ and $T_4$ are so interconnected that when $T_3$ is switched off valve $T_4$ is switched on (under all other conditions $T_3$ and $T_4$ do not affect each other). It will therefore be observed that by the transfer of an impulse from one accumulator to the busbar J a potential is applied to the stud A associated with the commutator segment of the next higher order by virtue of the fact $T_4$ conducts and in consequence one is added into the accumulator of the next higher order before the brush F has commenced to sweep the key controlled studs associated with the said next higher order. It will be readily understood that when the valve $T_4$ was rendered conductive the valve $T_9$ was rendered nonconductive.

It will be further observed that after a transfer impulse has been transmitted from the valve $T_4$ and after the studs of the said next higher order have been swept by the brush F the valve $T_4$ is rendered nonconductive by the valve $T_9$ being rendered conductive as a result of the brush F bridging the contacts $C$–$C_1$ immediately following the said next higher order of studs.

Upon the further movement of the brush F the studs $B$–$B_1$ are bridged and the valve $T_3$ is cleared ready to receive a further transfer impulse even if such further impulse should be produced as a result of the brush F sweeping over the first stud of the next higher order and causing the accumulator of the said next higher order to register its maximum. It will be observed that the short circuiting by brush F of the studs $B$–$B_1$ which follow the order in which the accumulator reached zero not only turns on $T_4$ in order to effect a carry into the next higher order but also restores $T_3$ to nonconducting condition in which it can accept evidence of a further carry even if the accumulator of the said next higher order is brought to zero by the first carry pulse. The valve $T_4$ is only rendered conductive after the valve $T_3$ has been firstly rendered conductive by a transfer impulse from the busbar J and thereafter rendered nonconductive by an impulse from the studs $B$–$B_1$ being applied to the cathode thereof. The valves $T_3$ and $T_4$ therefore can be regarded as a two-stage transfer store which is common to the accumulators of all the orders of keys.

As hereinbefore stated the keys associated with any one order of keys are operable in such a manner that when a key of an order of keys is actuated the corresponding S pair of contacts is closed and the corresponding K pair of contacts is opened. Referring to the first order of keys it will be observed that if the third key thereof is actuated the contacts $S^1_3$ are closed and the contacts $K^1_3$ are opened and provided the common terminal $CS^3_4$ of the two-way switch $CS_4$ is making contact with the contact $CS^2_4$ a potential will be applied, after the brush F has bridged the contacts E—E, from the anode $T^3_1$ of the valve $T_1$ through the third pair of contacts $S^1_3$ and thereafter through the closed contacts $K^1_1$ and $K^1_2$ to the studs $O_0$, $O_1$ and $O_2$ which when swept by the brush F will transmit three impulses to the commutator segment $O_9$ and thence to the accumulator $O_{10}$, thereby registering upon the accumulator $O_{10}$ the value of 3 if the reading of the said accumulator was previously zero.

If the common terminal of switch $CS_4$ is arranged in contact with the contact $CS^1_4$ it will be observed that the anode $T^3_1$ of the valve $T_1$ will be placed directly in circuit with the K pairs of contacts and not through the S pairs of contacts, and in consequence if a key is depressed, for example, the second key of the first order of keys, the switch $K^1_2$ will be opened and a potential will be applied to each of the last seven studs, namely the studs $O_8$ to $O_2$, thus ensuring that when the brush F sweeps over the said studs seven impulses will be transmitted to the commutator $O_9$ and thereafter into the accumulator $O_{10}$. In view of the fact that the first stud D of the series of studs associated with the first order of keys is energized from the same line as the seven studs $O_8$ to $O_2$ an additional impulse will have initially been transmitted to the accumulator $O_{10}$ by the brush F sweeping over the contact D and the commutator segment $O_9$. In consequence the accumulator $O_{10}$ will register 8 which is the tens complement of the numeral of the actuated key, if the said accumulator was previously registering zero. It will therefore be observed that by the setting of the switch $CS_4$ into one of two desired position, it is either possible to effect addition or subtraction without calling upon the operator when effecting subtraction to distinguish the keys which he has to actuate when effecting subtraction from the keys which he has to actuate when effecting addition. Further it will be readily observed that in the remaining orders is the nines complement and not the tens complement that is added into the accumulators when a calculation involving subtraction is being carried into effect.

With the benefit of the foregoing detailed description of the apparatus of FIG. 13 a summary of the operation of the calculating machine of the invention in the performance of addition and substraction may be given as follows:

For purposes of addition or subtraction the machine of the invention includes a plurality of orders of keys and an accumulator for each such order, and a further accumulator ($H_1$) for the storage of carries. The accumulators may take the form of multicathode tubes of the type sometimes called "Dekatrons," illustrated in FIG. 2. Associated with each order of keys there is provided a series of nine contacts, arranged to be bridged successively, via a commutator bar, to the input of the accumulator of that order by means of a pair of brushes F which successively bridge the contacts of each order with the commutator bar of that order, and thus scan all orders successively in the performance of a single addition or subtraction operation. When the machine is set for addition the actuation of a key in any order effects energization of contacts in that order to a number equal to the value of the key operated. When the machine is set for subtraction the operation of a key effects energization of contacts in its order to a number equal to the nines complement of the value of the key actuated.

When one or more keys have thus been actuated, the addtion or subtraction operation desired is effected by initiating motion of the brush, which, in sweeping over the contacts of all orders, applies to the accumulator of each order as many pulses as there are energized contacts in that order. Such a scanning of the contacts of all orders may be called a machine cycle, and upon its completion, in a case of addition or subtraction, the motor which drives the brush by which the scanning is effected is deenergized, and the machine comes to a stop. Addition of two numbers together is effected in two such machine cycles. Subtraction of one number from another is effected first by introducing the minuend into the accumulators (previously cleared) in an addition operation, followed by a machine cycle with the machine set for subtraction and with actuated keys representative of the subtrahend.

In both addition and subtraction the actuated keys are released at the end of the operation.

Means are provided for the transfer of a "carry" from the accumulator of each order but the highest into that of the next higher order, and from that of the highest order into the carry accumulator. These carry means comprise additional contacts between the contacts of adjacent orders, which are energized in appropriate fashion by trigger circuits responsive to output pulses developed in the accumulators of the orders of key orders when those accumulators reach their maximum setting, e.g. a zero setting in a machine operating on the decimal system.

Referring to FIGS. 3 to 12, the machine there shown embodies the circuit of FIG. 13, and certain other apparatus hereinafter to be described in connection with FIG. 1. Specifically, in FIG. 3, there are shown nine orders or columns of nine keys each. Operation of any one of these keys closes, in its order, the S switch and opens the K switch of corresponding subscript. In addition, by means hereinafter explained in conjunction with FIGS. 4 and 5, it starts a motor which drives the brush F and it operates the one-shot device U. Switch $CS_4$ is set to the subtraction position shown in FIG. 1 by operation of a subtract key 88, and it is set to the opposite position, for addition, by operation of an add key 87. Each of the twelve orders of nine main keyboard keys has associated therewith a display device shown as a numeral wheel 70, for indication of the contents of the accumulator $O_{10} \ldots Z_{10}$ of that order.

Figure 1:
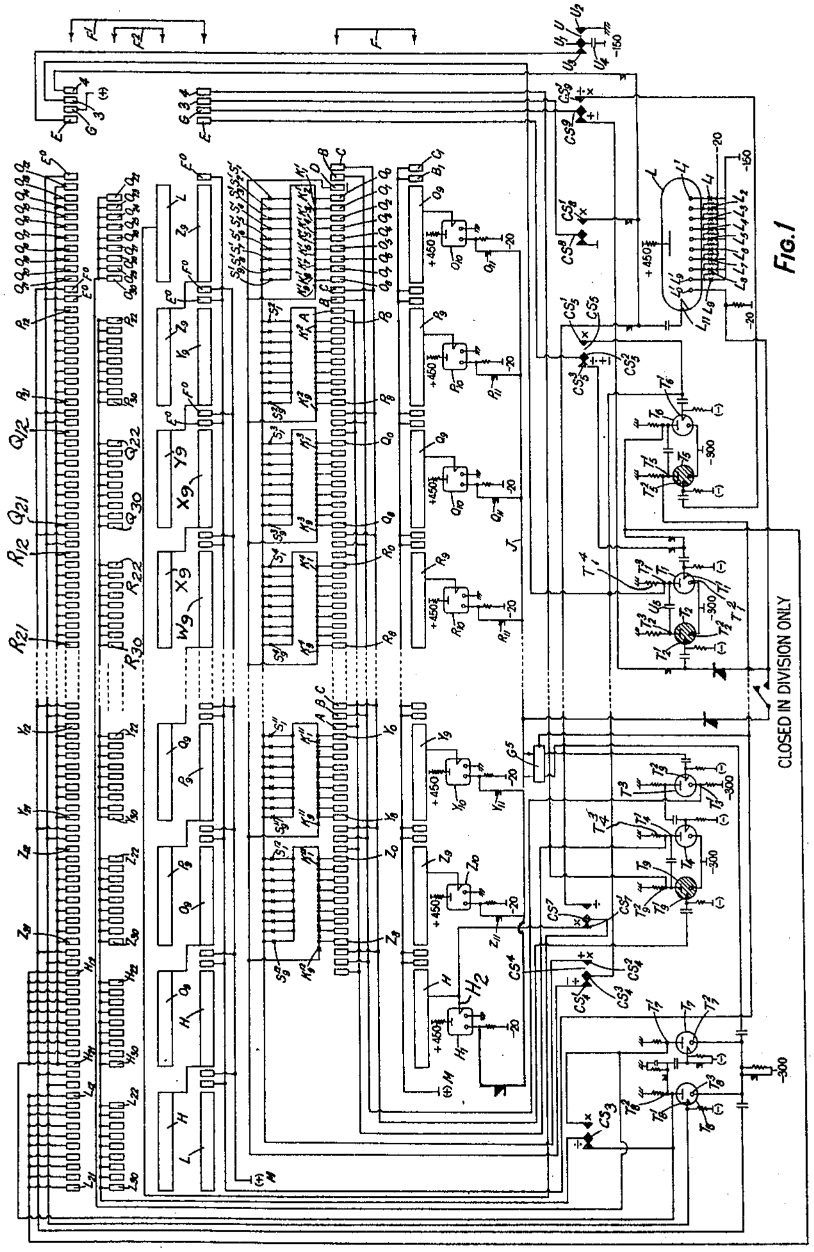
FIGURE 1 is a circuit diagram of an electronically controlled electromechanical key operated calculating machine according to the invention capable of effecting addition, subtraction, multiplication or division.

FIG. 1 is a circuit diagram of an electromechanical calculating machine according to the invention incorporating the apparatus of FIG. 13 and including in addition structure permitting performance of the operations of multiplication and division. In the apparatus of FIG. 1 (so far as concerns the performance of addition and subtraction) the control studs E—E and G—G are scanned by a separate brush $F^1$, mechanically coupled to the brush F, and in addition switches $CS_5$ and $CS_9$ in the circuits of those control studs are set to a common addition-subtraction position, by operation of either of keys 87 and 88 of FIG. 3.

To recapitulate therefore, for the performance of addition and subtraction the machine of FIGS. 1 and 2 to 12 or 13 and 2 to 12 includes, for each decimal order, a set of nine keys, nine pairs of S and K switches operable by those keys, nine studs or contacts (e.g. $O_0$ to $O_8$) selectively energizable by those keys, a carry stud or contact A, and an accumulator (e.g. $O_{10}$). The nine S switches including one switch from each pair are normally open and are connected in parallel between a bus (energizable when addition is to be performed) and the first of the nine studs (e.g. $O_0$). The other nine key-controlled switches K of each order are normally closed and are connected in series, with the remaining eight studs (e.g. $O_1$ to $O_8$) between them, between the first stud and a second bus, energizable when subtraction is to be performed. For each order, a commutator is provided, which serves as an input electrode to the accumulator, delivering to the latter pulses scanned from the energized ones of the nine studs of its order by a brush which traverses the studs of all orders successively in the performance of an addition or subtraction operation.

An extra accumulator may be provided to accept carries from the accumulator of highest order.

A carry bus accepts pulses from the other accumulators when they reach zero count. The voltage on the carry bus is employed, in a two-stage transfer store, to energize the carry stud of the next higher order, from which an extra pulse is then scanned into the accumulator of next higher order when the brush reaches that next higher order.

A flip flop ($T_1$, $T_2$) is reversed in conduction phase at the start of each addition or subtraction operation to energize a first bus, from which voltage is extended to one or the other of the first-named buses according to the setting of an add-subtract switch $CS_4$. The flip flop is reset at the completion of a scan by the brush. Operation of any one or more keys simultaneously (only one key in any one order) initiates a cycle of brush travel and reversal in conduction phase of the flip flop, so that the indicated addition or subtraction is performed. Such a cycle of brush travel, with the accompanying complete cycle of states for the flip flop, may be referred to as a machine cycle. Addition together of two numbers is effected in two such machine cycles.

For subtraction, an additional stud is provided in advance of the studs of the first order, which is connected to the subtraction bus and which effects addition into the accumulator of the first order of the tens rather than the nines complement of the number punched into the first order (1, in case no key is punched in the first order).

The brush or brushes (in FIG. 13 one brush F is shown for engagement with the control studs E—E and G—G as well as with the counting studs, while in FIG. 1 a separate brush $F^1$ is provided for the control studs E—E and G—G) are driven by the motor together and may stop in any position. When the motor is started up by operation of a key, by switch means not shown in FIG. 1, the brush or brushes rotate until control studs E—E are bridged. This starts the machine cycle, which is completed when control studs G—G are bridged.

Figure 4:
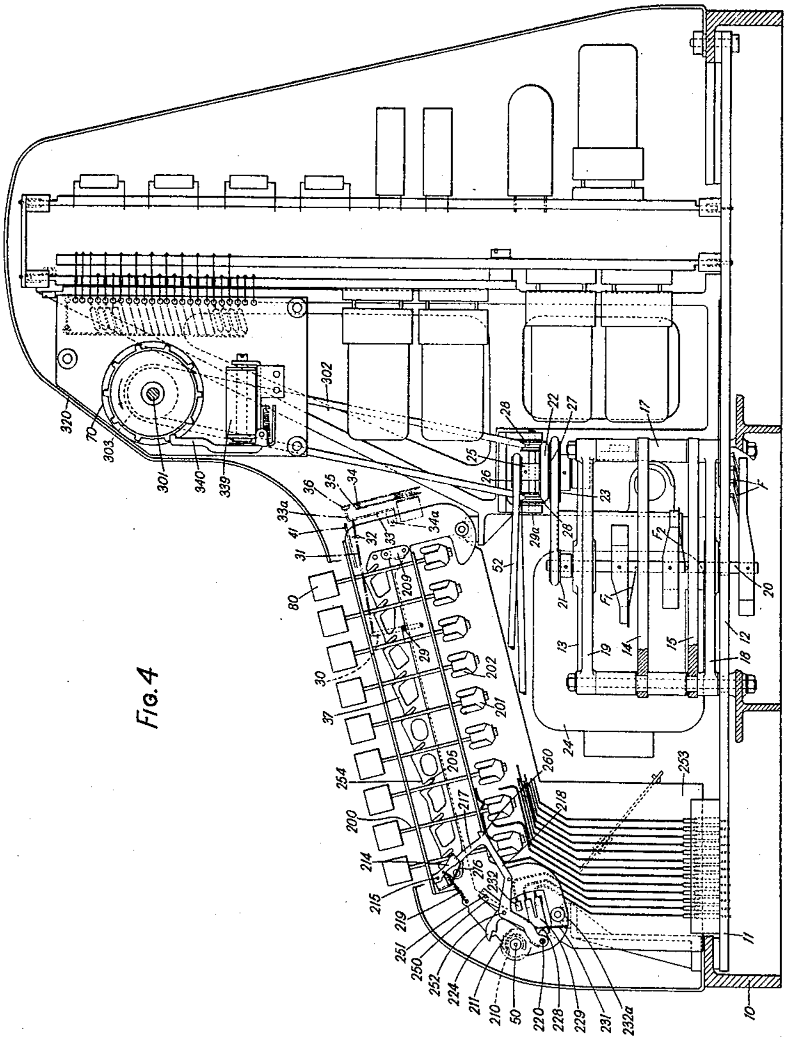

On addition and subtraction, the motion of any main keyboard key slide due to operation of a key in such order will energise the motor which carries brushes F, $F^1$ and $F^2$ by engaging contacts 34 and 35 in FIG. 4.

On multiplication, such engagement is prevented, by element 41 as controlled from the multiplication function key 39 via element 43 (FIG. 3), until the slide of the order of multiplier keys is actuated by operation of a multiplier key therein.

Figures 5, 6:
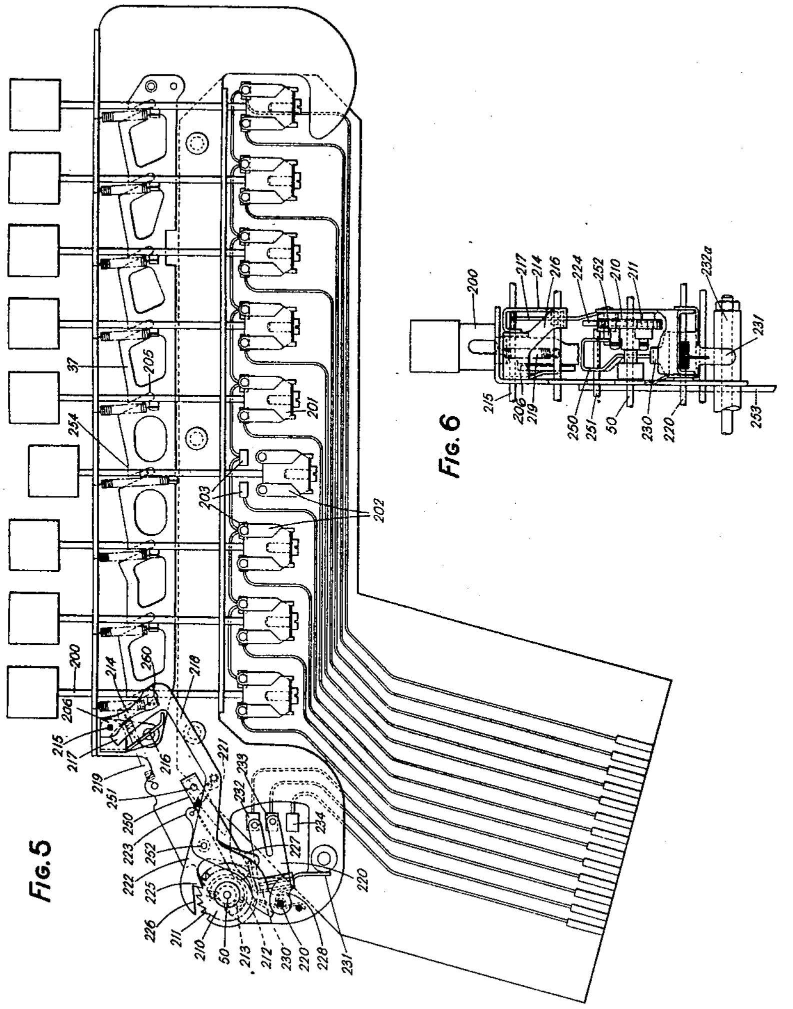
FIGURES 5 and 6 are side and elevation views of one order of keys in the main keyboard of the machine of FIGURES 3 and 4.

On addition and subtraction, the one-shot device U is controlled by contacts 232 to 234 of FIG. 5, of which there is a set for each order of main keyboard keys. These contacts are shifted to deliver a striking voltage to the contacts E–E of FIG. 1 whenever any key of the main keyboard is operated. On multiplication and division, there are substituted for these contacts the contacts 417, 418 and 424, 425 on the key slide of the multiplier key column, wherein the "Divide" key 400 causes, on division, the extraction of a quotient digit. See FIG. 11. During multiplication operation of any one of these keys in this column effects a similar shift of contacts 417, 418, 424 and 425, and during division operation of key 400 does so.

Instead of employing the three valves $T_9$, $T_4$ and $T_3$ only one pair of valves $T_3$ and $T_4$ need be employed in which case the valve $T_9$ can be disregarded but otherwise the circuit arrangement would be as illustrated in FIGURE 1. Such an arrangement ensures that the valve $T_3$ is available, at the shortest possible notice after it has received one impulse from the busbar J, to receive a further impulse in view of the fact that the duty of the first impulse has been taken over by the valve $T_4$.

The valve $T_9$ is of value as a means of rendering the valve $T_4$ nonconductive.

Thus it will be seen that according to the present invention there is provided an extremely simple means in an electronic calculating machine of transferring unity from one accumulator to the accumulator of the next higher order which involves the employment of not more than three electronic tubes but wherein even only two tubes could be employed to perform the function successfully.

In the employment of electronics considerable difficulty has hitherto been experienced in displaying the results stored in electronic devices upon accumulators, such, for example, as the numeral wheels of calculating machines, owing to the difficulty which arises both from the amount of energy consumed in the operation of any such mechanical devices and also due to the comparatively low speeds at which mechanically, or like operated devices, operate as compared with the high speeds of electronic actuation.

In practice, it has been found that if one wishes to ascertain a result of an electronic calculation during the course of said calculation, it becomes necessary eithter to stop the electronic actuation so as to allow a mechanical indicator to operate, or to slow down the electronic action to a speed commensurate with the speed of operation of a mechanical indicator.

An object of the accumulator hereinafter described is to provide means whereby the result of rapid electronic actuation may be readily discernible without the necessity of involving the disadvantages referred to above.

One method of effecting the above result will be hereinafter described with reference to a stepping electronic tube operating at approximately 4,000 counts per second. In the main, according to the present invention, the fixed contacts of a rotary switch are connected to the cathodes of a stepping electronic tube, and the movable contact or contacts of the rotary switch is or are arranged to sweep continuously over the said contacts. The rotary switch is so designed that, if the glow remains on one cathode for a sufficient period of time, when the rotary contact makes contact with a fixed contact with which the glowing cathode is connected, an arresting relay connected in circuit with the said rotary contact is energised. The voltage received from the glowing cathode of the stepping electronic tube is amplified in order to effect the actuation of the arresting relay. The energisation of the arresting relay causes the movement of the switch to be arrested in the position in which it is in engagement with the contact connected to the glowing cathode until such time as the cathode ceases to glow, whereupon the arresting relay is deenergised and the rotary switch is released and resumes the rotary movement thereof whereupon the rotary contact or contacts of the rotary switch continue to hunt for another glowing cathode. This will continue until at least the rate of counting of the stepping electronic tube approaches a speed which the eye can follow.

It will be appreciated that if the stepping electronic tube is provided with 10 cathodes which are connected to 10 fixed contacts associated with a rotary switch, the rotary contact of the switch will be arrested upon the first "live" fixed contact connected to a glowing cathode which it encounters provided the glow persists for a sufficiently long period of time to ensure the actuation of the arresting relay. The rotary contact is connected to a flanged numeral wheel arranged to move therewith and having the numerals 0 to 9 arranged around the flanged face thereof and the numeral wheel is arranged behind the casing of the calculating machine which is provided with a suitable aperture. The numeral wheel is so arranged behind the casing that the number of the fixed contact upon which the rotary contact is arrested is displayed through the aperture in the said casing. In this way it will be observed that there is provided in accordance with the rotary contact operable as a result of energy emitted from the glowing cathode of a stepping electronic tube to cause the numeral associated with said cathode to be displayed by the numeral wheel hereinbefore referred to in a readily discernible manner.

Figure 3:
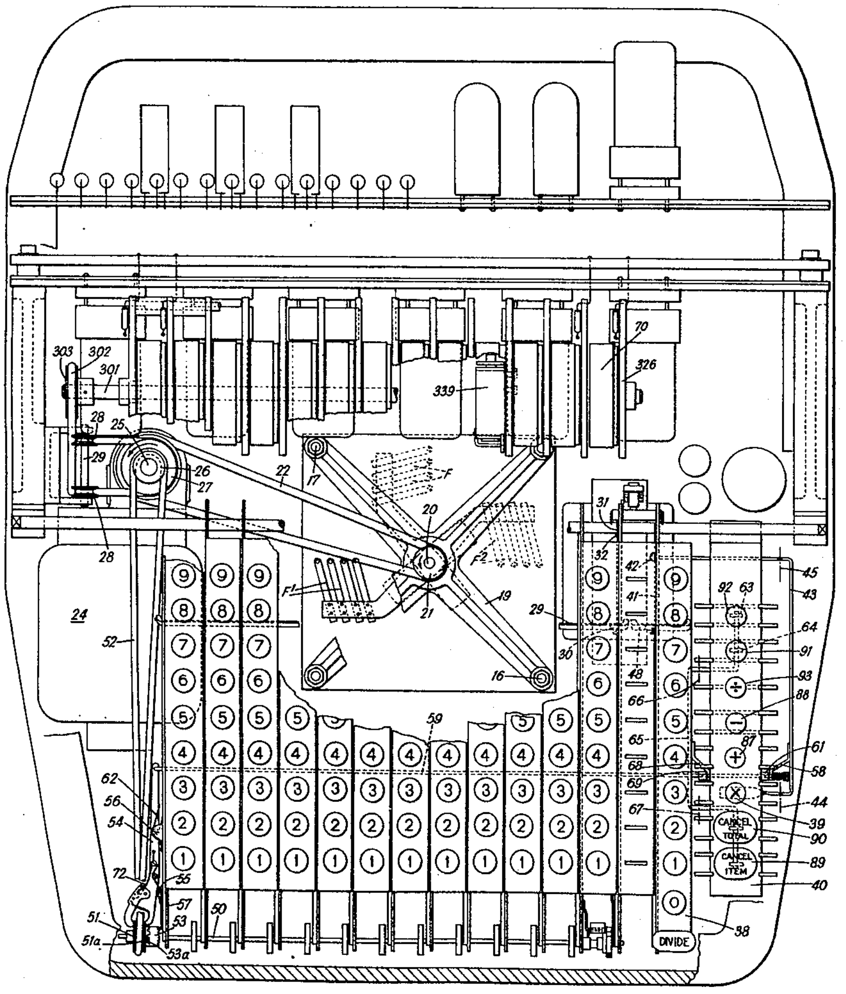
FIGURES 3 and 4 are respectively plan and side elevation views of a key controlled calculating machine embodying the circuit arrangement illustrated in FIGURE 1 to effect addition, subtraction, multiplication or division.
Figures 7, 8:
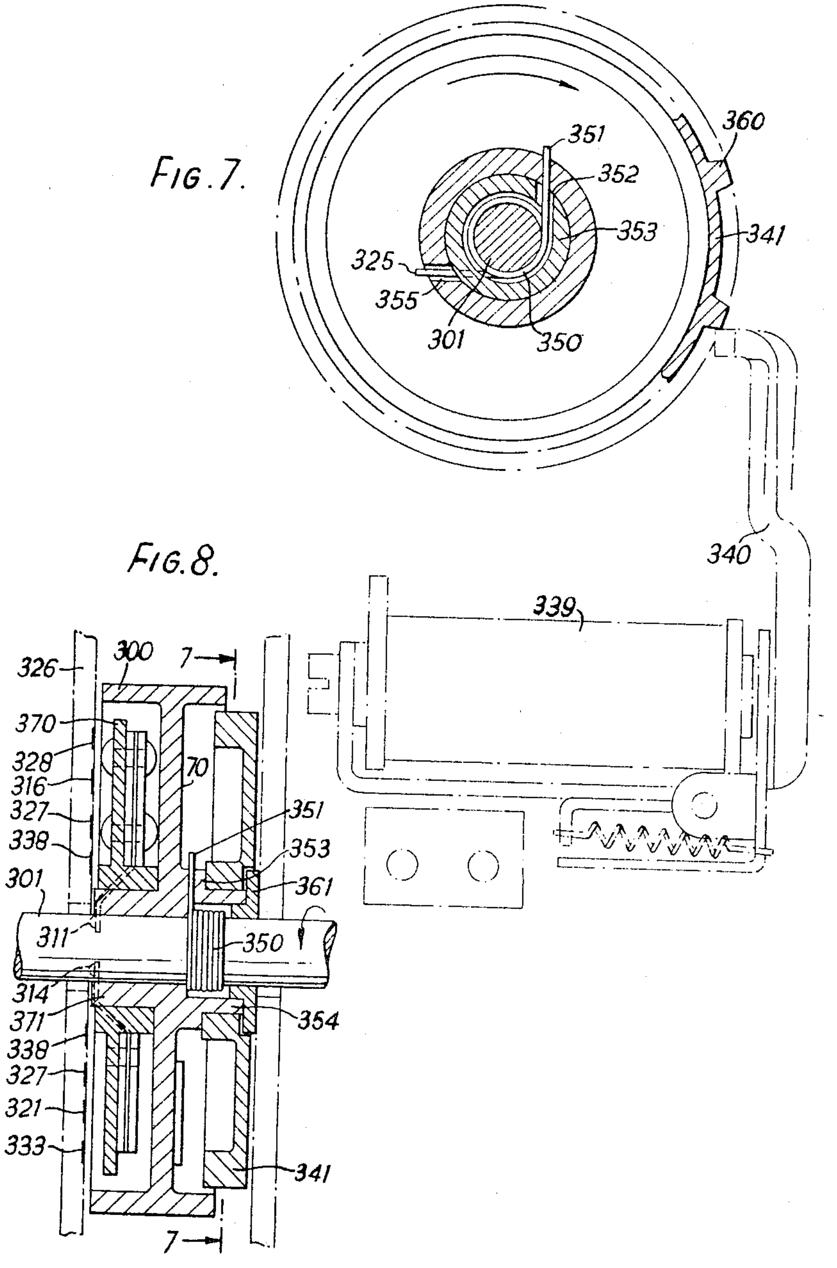
FIGURES 7, 8, 9 and 10 illustrate a device whereby the numeral registered upon a multicathode counting tube of a key controlled office calculating machine can be registered upon a mechanically operated numeral wheel.
Figure 9:
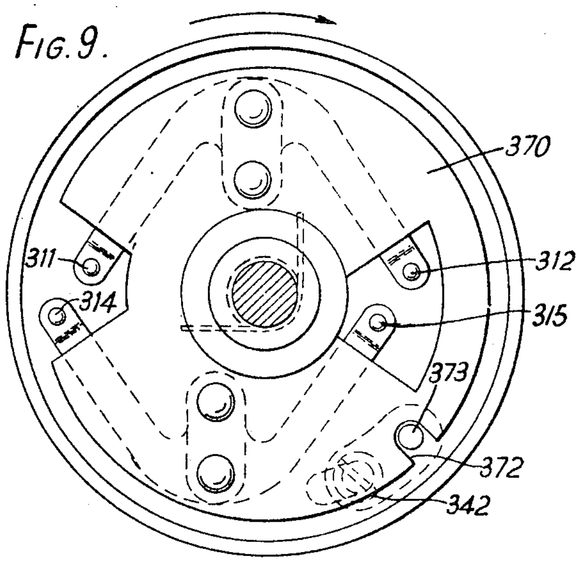
Figure 10:
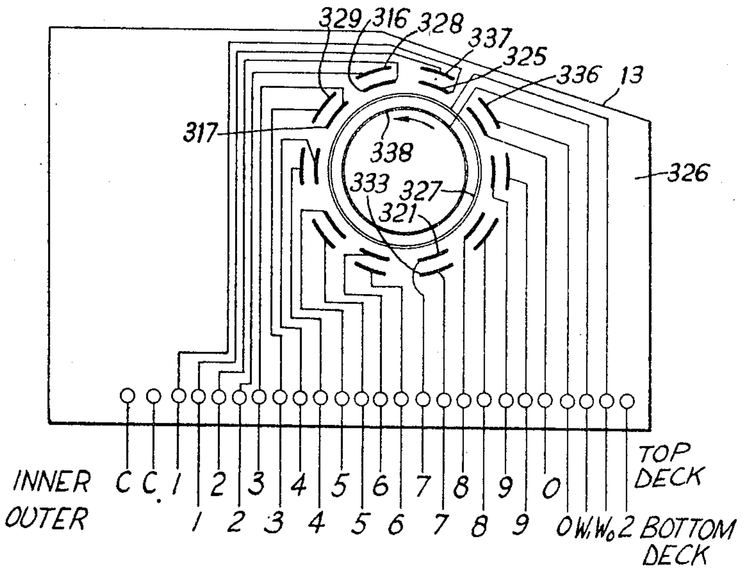

The accumulator illustrated in FIGURES 3 and 4 comprises a numeral wheel 70 bearing the numbers 0 to 9 equally spaced around a circumferential flange 300 thereof (FIGURE 8). The numeral wheel 70 is mounted upon a continuously rotating spindle 301 which is driven by a belt 302 which extends firstly around a pulley 303 mounted upon the spindle 301 and thereafter around a pair of pulleys 28 carried upon a lay-shaft 29 and finally around a pulley 27 (FIGURE 4). The pulley 27 is mounted upon the upright spindle 25 of the motor 24 whereas the pulley 303 is mounted upon the spindle 301 which carries the thirteen numeral wheels required for a machine having twelve orders of keys. The numeral wheel 70 (FIGURE 8) is provided upon one side face thereof with a carrier disc 370 which is mounted on a boss 371 of the numeral wheel 70. The carrier disc 370 is provided with a slot 372 (FIGURE 9) which engages with a pin 373 attached to an adjustment plate 342 clamped by a screw to the numeral wheel 70. Mounted upon the carrier disc 370 are two pairs of interconnected contacts 311 and 312 and 314 and 315. As the numeral wheel rotates the contact 311 is arranged to bear successively upon the contacts of a set of 10 fixed contacts 316 to 325 (FIGURE 10) arranged in a circle, upon a stationary panel 326 so that the contacts 316 to 325 are coaxial with the axis of the rotating spindle 301 of the numeral wheel 70 whilst the contact 312 is arranged to engage with a fixed circular commutator segment 327 extending around the face of the panel 326 so as to be coaxial with both the spindle 301 and the 10 contacts 316 to 325. The second pair of contacts 314 and 315 are correspondingly mounted and bridge a second set of 10 contacts 328 to 337 and an associated commutator segment 338 mounted so as to be coaxial with the first set of contacts 316 to 325 and commutator segment 327. Each of the 10 contacts of the two sets of contacts 316 to 325 and 328 to 337 hereinbefore referred to are arranged to be connected sequentially to the cathodes of a stepping electronic tube, whilst each of the commutator bars 327 and 338 is arranged to engage through an amplifier (not shown) with a relay 339 (FIGURE 7) mounted adjacent to each numeral wheel 70 of each order of keys (FIGURE 3). The relay 339 is provided with an armature 340 which, when the relay 339 is energised, is moved to engage with one of ten teeth 360 formed on an arrester wheel 341 mounted coaxially with the axis of the numeral wheel 70 and mounted in yielding relationship thereto in a manner hereinafter described.

The above arrangement is operable in such a manner that when a glowing cathode of the associated stepping electronic tube is connected to a contact on the fixed panel 326 and one pair of the interconnected contacts 311, 312 or 314 and 315 carried upon the carrier disc 370 adjustably mounted upon the numeral wheel, short circuit the "live" contact and the associated circular commutator bar the relay 339 is energised and the arrester wheel 341 is arrested by the armature 340 of the relay 339 engaging with the appropriate tooth 360 on the arrester wheel 341 which corresponds to the glowing cathode of the stepping electronic tube. In this position the numeral on the numeral wheel which corresponds to the number of the "glowing" cathode of the stepping electronic tube will register within an aperture in the casing 320 (FIGURE 4) of the machine and so cause the number corresponding to the glowing cathode of the stepping electronic tube to be readily discernible.

The indicator described above shows an arrangement where the numeral wheel 70 is arranged to be continuously rotated and arrested when the speed of counting of the stepping electronic tube approaches a speed at which the impulses received from the cathode of the stepping electronic tube are slow enough to enable the relay 339 to be energized.

The drive between the numeral wheel 70 and the spindle 301 comprises a coil spring 350 (FIGURES 7 and 8) which normally binds tightly on the spindle 301 which is driven in an anticlockwise direction when viewed from the right-hand side of FIGURE 8. One limb 351 of the spring 350 is arranged to extend through a slot 352 (FIGURE 7) in the boss 353 of the numeral wheel 70 and to exert a turning force on the numeral wheel 70 causing it to rotate at the same sped as the spindle 301.

The arrester wheel 341 is arranged as a sliding fit on a boss 354 (FIGURE 8) of the numeral wheel 70 and is provided with a slot 355 in its boss arranged to receive the second limb 325 so that it exerts a light turning movement on the arrester wheel 341 and causes it to rotate at the same speed and in the same direction as the spindle 301 and the numeral wheel 70.

In order to arrest the numeral wheel 70 the armature 340 of the relay 339 must be energized by completing an electrical circuit by the contacts 311 and 312 or 314 and 315 sweeping over the associated fixed contacts and fixed commutator segments, until the armature 340 engages one of the teeth 360 on the arrester wheel 341 and stops its rotation. The arrest of the arrester wheel resists the turning movement of spring 350 causing it to unwind slightly and the driving force of the spindle 301 on the spring 350 is consequently relieved, and whilst the spindle 301 continues to rotate, the numeral wheel 70, the arrestor wheel 341 and the spring 350 remain stationary.

When the electrical circuit which energises the relay 339 is broken the armature 340 disengages from tooth 360 thus allowing the spring 350 to resume its positive clutch on the spindle 301 and produce a turning movement on the numeral wheel, the arrester wheel 341 and the spring 350.

A bush 361 is arranged as a free fit on the spindle 301 and has a clearance from the arrester wheel 341, thus ensuring that the pressure of the contact points 311, 312, 314 and 315 on righthand side panel 326 does not create any friction between the arrester wheel 341 and the panel 326 and thereby restrict the freedom of the arrester wheel 341 to revolve.

Figure 2:
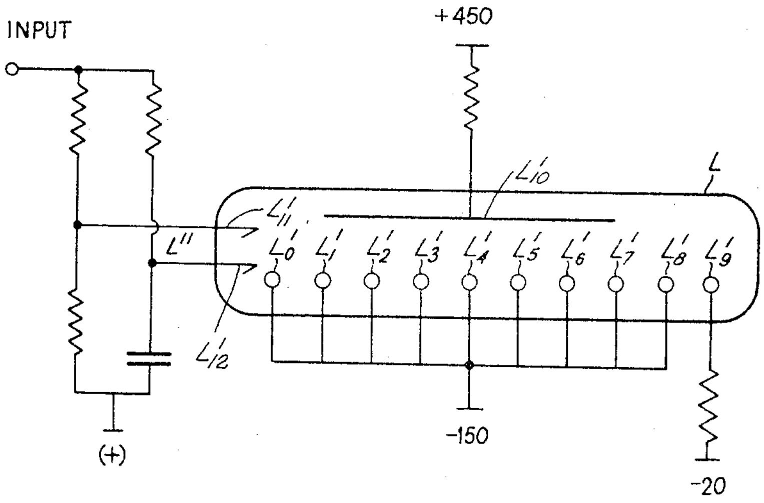
FIGURE 2 illustrates diagrammatically a multicathode stepping electronic tube which may be employed as a counting device in a machine constructed in accordance with the present invention.

Referring to FIGURE 2 of the drawings the counting device employed upon an office calculating machine constructed in accordance with the present invention comprises a multicathode stepping electronic tube which normally has ten cathodes $L^1_0$ to $L^1_9$ although a larger number of cathodes could, if desirable, be employed. A glow is maintainable between a single $L^1_{10}$ and any one and only one of the above-mentioned cathodes $L^1_0$ to $L^1_9$.

The glow can be stepped from one cathode to another by providing a suitable series of pulses. By referring to the cathode as the No. 0 cathode $L^1_0$ and to the adjacent cathode $L^1_1$ as the No. 1 cathode and so on, up to any desired maximum, for example up to the cathode $L^1_9$ as the No. 9 cathode, it is possible to register in any notation according to the number of cathodes selected.

In a stepping electronic tube employed in connection with an office calculating machine constructed in accordance with the present invention two subsidiary electrodes $L^1_{11}$ and $L^1_{12}$ hereinafter referred to as guides 1 and 2, are provided between each pair of adjacent cathodes. The electrodes $L^1_{11}$ and $L^1_{12}$ are only shown diagrammatically on the left hand side of the tube, the portions of these electrodes that are located between adjacent pairs of cathodes being omitted for the sake of clarity. It should be understood that, when "guide 1" or "guide 2" is hereinafter referred to as being made momentarily more negative than an adjacent cathode, this applies to each pair of guides 1 and 2 which are arranged between adjacent cathodes since all guides 1 are commoned and all guides 2 are commoned.

Normally the voltage difference between the cathodes $L^1_0$ and $L^1_9$ and the single anode $L^1_{10}$ is kept greater than the voltage difference between the guides 1 and 2 and the anode $L^1_{10}$, thus ensuring that the glow rests on a predetermined cathode.

When it is desired to step the glow from one cathode to the next, for example, from cathode No. 8 to cathode No. 9, the guide 1 adjacent to the No. 8 cathode is momentarily made more negative than the No. 8 cathode with the result that the glow steps to the said guide 1. Thereupon, guide 2 is also made momentarily more negative than the No. 8 cathode, with the voltage on guides 1 and 2 being the same, thereby causing the glow to be shared by the said guides 1 and 2. The voltage on guide 1 is then raised to normal, whereupon the whole glow transfers to guide 2 and finally, when the voltage on guide 2 is raised to normal, the glow which was resting on guide 2 steps to No. 9 cathode.

The pulses which are applied to guides 1 and 2 are derived by means of a single pulse which is applied directly to guide 1 through the resistor $R_{10}$ and via an integrating circuit comprising resistors $R_{10}$ and $R_{11}$ and capacitor $C_{10}$ to guide 2, the delay necessary between switching off the pulses to guide 1 and guide 2 is provided by the charge stored in the capacitor $C_{10}$.

It will be appreciated that after the drive pulse has disappeared the glow will rest on guide 2 until such time as the charge on the capacitor $C_{10}$ has dropped sufficiently to allow the glow to step to cathode No. 9.

The mechanism employed for ensuring a delay in the release of a key of the main keyboard, hereinbefore referred to until at least the purpose for which the key has been actuated has been achieved will be hereinafter described with reference to FIGURES 3, 4, 5 and 6 and more particularly with reference to FIGURES 5 and 6. Each key stem 200 is provided, upon the end thereof remote from the key top 20, with an extension 201 which is made from an insulating material, such, for example, as nylon, a bifurcated contact device 202 being secured to the said extension. The arrangement is such that each contact device bridges and connects electrically a pair of contacts 203 so long as the key associated with that contact device is not depressed, the electrical bridging being broken when the key is depressed. The stem 200 of each key is also provided with a laterally extending lug 204. Each lug is so disposed as to engage, when the key with which it is associated is depressed, an inclined slot 205 formed in a key bar 37, the downward travel of the lug 204 when engaged with the said inclined slot 205 causing the key bar to be moved towards the front of the machine (that is to the left when viewing FIGURES 4 and 6). The key bar 37 is pivotally mounted at the front thereof upon one limb of an inverted U-shaped stirrup 206 and at the rear thereof between the limbs of an upright U-shaped stirrup 209.

Located at the front of each order of keys is a shaft 50, connected through a dog clutch 53 to the pulley 51 which is driven at a constant speed from the vertical output spindle 25 of the motor 24. The shaft 50 carries a fixed hub 210 which acts as an abutment piece and of which a segment is cut away. A ratchet wheel 211 is mounted on and rotates freely on the shaft 50 but is constrained to move generally with the hub 210 by means of a tension spring 212 one end of which is attached to the hub 210 and the other end of which is attached to a pin 213 on the ratchet wheel 211 in such a position that, if the ratchet wheel is restrained whilst the shaft 50 rotates, the tension spring 212 will stretch until the hub 210 abuts the pin 213. Thereafter, the ratchet wheel 211 will again be turned by the shaft 50.

It has been stated above that the key bar 37 is pivotally connected to and suspended from an inverted stirrup 206 at the front end thereof. The stirrup 206 and an inverted U-shaped secondary latch 214 are both mounted for pivotal movement about a spindle 215 which extends through all of the orders of the machine. The yoke of the stirrup 206 is extended downwardly and at an angle of approximately 45° towards the rear of the machine to form a toe 216 which acts as a stop for an arcuate, upwardly directed extension 217 of a lever 218 hereinafter described in greater detail. When the lever 218 and the arcuate extension 217 thereof are in the rest position thereof, the toe of the secondary latch 214 is held in contact with the rear edge of the arcuate extension 217 by means of a tension spring 219. The toe 216 of the stirrup 206 makes contact with the forward edge of the toe of the secondary latch 214, but the radius of the underside of the toe 216 of the stirrup 206 is slightly less than the radius of the underside of the toe of the secondary latch 214, both radii being taken from the axis of the spindle 215 about which the two parts pivot, so that whilst the toe 216 of the stirrup 206 forms the stop for the arcuate extension 217 this extension in turn forms a forward stop for the toe of the secondary latch 214.

Each lever 218 extends from a point adjacent the number "1" key of the order of keys with which it is associated towards the front of the machine to a point substantially vertically below the axis of the shaft 50. At this point, each lever 218 is mounted for pivotal movement about a spindle 220 which extends through all of the orders of the machine and the lever 218 is urged in an anticlockwise direction about the axis of the spindle 220 by a spring. One end of another spring 221 is anchored to the lever 218 at about the mid-length thereof and the other end of the spring 221 is attached to a rearwardly directed arm of a three-armed pawl 222 which is carried by the lever 218. The lever 218 is cranked at a point adjacent to the ratchet wheel 211 on the shaft 50 and the three-armed pawl 222 is pivotally mounted upon the lever 218 where the lever is cranked.

The three-armed pawl 222 has one rearwardly directed arm 223, a second and upwardly inclined arm 224 provided on the underside thereof with a tooth and a ramp 226 of which the purpose will be hereinafter explained, and a third and downwardly inclined arm 227 which is in line with the ratchet wheel.

A stirrup-shaped member 228, which is mounted for pivotal movement upon the same spindle 220 as that upon which the lever 218 is mounted, carries upon the yoke thereof a bifurcated electrical contact device 229, the contact device 229 is insulated from the stirrup-shaped member 228 and also is urged in an anticlockwise direction by the same spring that urges the lever 218 with the arcuate extension 217 in an anticlockwise direction. The upper edge of the yoke of the member 228 is extended upwardly and bent so as to provide a horizontal platform 230 whilst the lower edge of the said yoke is extended downwardly to form a stop arm 231 which, when it abuts one of the spacers 232, which are employed to space apart the frame plates of the machine, serves to limit the movement of the stirrup-shaped member 228.

There are provided three fixed contacts 232, 233 and 234 disposed one above the other, the middle and lowermost contacts 233 and 234 being bridged and electrically connected to one another by the bifurcated electrical contact device 229 when the said device is in the rest position thereof. However, the said contact device 229 is caused to bridge and connect electrically the uppermost and middle contacts 232 and 233 when the machine is set to effect a calculation. When the contact device 229 is bridging the uppermost and middle contacts 232 and 233 the stop arm 231 of the yoke of the stirrup-shaped member 228 which carries the contact device 229 is in contact with the frame spacer 232.

Another substantially U-shaped lever 250 is mounted on a spindle 251 extending through all the orders of the machine. The spindle 251 is located on the straight line extending between, the point of pivotal attachment of the key bar 37 to the inverted U-shaped stirrup 206 at the front of the machine and the spindle 220 about which pivots the lever 218 and the arcuate extension 217 thereof. One arm of this U-shaped lever 251 is arranged in contact with the pivot stud 252 by means of which the three-armed pawl 223 is pivotally secured to the lever 218 with the arcuate extension 217. The other arm 227 of the U-shaped lever 250 rests on the horizontal platform 230 which is formed from the extension of the upper edge of the yoke of the stirrup-shaped member 228 which is urged in an anticlockwise direction by a spring and which would be rotated in an anticlockwise direction but for the restraining influence of the arm 227 resting on the said horizontal platform 230.

The pairs of contacts 203 which are bridged by the contact devices 202 upon the key stems 200 in each order and the sets of three contacts 232, 233 and 234 disposed one above the other in the vicinity of the ratchet wheels 211 in each order are mounted in or on an insulating panel 253. Wiring or printed circuitry connects the contacts, which may also be printed, to the appropriate part of the calculating mechanism.

Having described the mechanism at rest, the action of the various parts during a quick key stroke and the release of a key, such as occurs during a normal adding operation will now be described:

When a key 20 is depressed, the lug 204 on the key stem 200 engages the inclined slot 205 in the key bar 37, urging the key bar towards the front of the machine (that is to the left when viewing FIGURES 4 and 6). The rear shoulder 254 of each pair of shoulders which define the opening of the inclined slot 205 move forwardly and beneath the lugs 204 on the key stems 200 of those keys which have not been depressed. Thus, once a key in any order has been depressed, it is not possible to depress another key in that order until the depressed key has been released and restored to the uppermost rest position thereof by spring action. Further, the depressed key is held depressed by interengagement of the lug 204 on the stem 200 of the depressed key with the inclined slot of the forwardly displaced key bar 37.

The inverted U-shaped stirrup 206 from one limb of which the front end of the key bar 37 is suspended, is moved about the pivot 215 thereof in a clockwise direction by the movement of the key bar 37, thereby causing the toe 216 of the said stirrup 206 to slide forwardly over the top surface of the arcuate extension 217. Whilst the toe 216 of the stirrup 206 still partially engages the arcuate extension 217 the bifurcated contact device 202 on the lower end of the key stem 200 will have been caused to slide off the contacts 203 normally bridged by the said device, thereby disconnecting them from the supply of voltage. Continued movement of the key bar and the toe 216 of the stirrup 206 will cause the toe 216 to disengage the arcuate extension 217, thereby permitting the lever 218 of which the arcuate extension 217 forms a part to move in an anticlockwise direction until arrested by the action of the three-armed pawl 223.

It will be appreciated that one arm of a substantially U-shaped lever 250 is caused to bear against the pivot stud 252, which connects the three-armed pawl 223 to the lever 218, under the influence of the spring which tends at all times to move in an anticlockwise direction the stirrup-shaped member 228 provided with the horizontal platform 230, the platform 230 being contacted by the arm 227 of the U-shaped lever. When therefore, the stirrup-shaped member 228 and the lever 218 with the arcuate extension 217 are freed for movement about the spindle 220 in an anticlockwise direction, the pivot rod 252 not only carries the three-armed pawl 223 forwardly but also allows the substantially U-shaped lever 250 to rotate in a clockwise direction about its pivot 251. Due to the proportions of the parts concerned this movement of the U-shaped lever 250 (which removes the restraining influence applied by the other arm 227 of the U-shaped lever 250 to the horizontal platform 230 hereinbefore referred to) ensures that the stirrup-shaped member 228 to which the bifurcated contact device 229 is connected is released rapidly, this rapid release in turn ensuring that the uppermost and middle fixed contacts 232 and 233 are electrically bridged with a snap action.

Continued movement of the lever 218 with the arcuate extension 217 will cause the downwardly directed arm 227 of the three-armed pawl 223 to abut the periphery of the ratchet wheel 211, so that movement of the pawl thereafter will cause anticlockwise rotation of the pawl 224 and tip the tooth 225 of the said pawl into engagement with a tooth of the ratchet wheel 211.

The arc through which the lever 218 with the arcuate extension 217 travels is limited by a lug 260 formed at the lower end of the arcuate extension 217 of the lever 218 abutting against the underside of the secondary latch 214. The lug 260 preferably forms an integral part of the lever 218 and projects rearwardly from the base of the arcuate extension 217.

When the tooth 225 of the three-armed pawl 223 engages a tooth of the ratchet wheel 211, the movement of the ratchet wheel 211 is arrested. However, in view of the fact that the ratchet wheel 211 is free to rotate on the shaft 50 when it is arrested, the shaft 50 continues to rotate without driving the ratchet wheel 211 until such time as the hub on the shaft (to which hub one end of a spring is attached) has completed an arc of movement of approximately 70° and abuts against a pin secured to the ratchet wheel (to which pin the other end of the said spring is attached). It will be appreciated that there is an interval of time between the arrest of the ratchet wheel 211 and the resumption of the drive thereof, this interval of time being essential for the correct working of the electronic apparatus. When the hub on the shaft 50 has abutted the pin on the ratchet wheel as aforesaid the drive between the shaft and the ratchet wheel will be solid and the three-armed pawl 222 will be pushed rearwardly (that is to the right when viewing FIGURES 4 and 6). This rearward movement of the pawl 222 is communicated to the lever 218 to which the pawl 222 is pivotally connected and is maintained until the ramp 226, which is adjacent the tooth 225 of the pawl 224, raises the tooth 225 of the pawl 224 out of engagement with the ratchet wheel 211 as a result of coming into contact with the teeth of the ratchet wheel 211. The time taken to cause this disengagement to the tooth 225 of the pawl from the ratchet wheel 211 provides a further delay which supplements the delay already referred to.

At some time during the cycle so far described the key will have been released by the operator but it will be prevented from rising to the normal rest position thereof by virtue of the fact that the key bar is held in its forwardmost position by engagement of the arcuate extension 217 with the toe 216 of the inverted U-shaped stirrup 206, the associated inclined slot in the key bar 200 trapping the lug 204 on the stem 200 of the key which has been depressed. Towards the end of the return movement, in a clockwise direction, of the lever 218 with the arcuate extension 217 the pivot 252 which connects the three-armed pawl 223 to the lever 218 abuts one arm of the substantially U-shaped lever 250 and moves the lever 250 in an anticlockwise direction about its pivot 251. Such anticlockwise rotation of the substantially U-shaped lever 250 causes the other arm thereof to depress the horizontal platform 230 which forms a part of the assembly which includes the bifurcated contact device 229, thereby causing the said device to move from the position in which the uppermost and middle contacts 232 and 233 of the three fixed contacts are bridged to the position in which the lowermost and middle contacts 234 and 233 are bridged. The final part of the arc of travel of the lever 218 with the arcuate extension 217 in a downward direction moves the top of the said arcuate extension 217 clear of the lowermost edges of the toe of the inverted U-shaped stirrup 216 and of the secondary latch 214. The toe of the said stirrup thereupon snaps over the top of the arcuate extension 217, thus restoring the key bar 37 to its rest position and releasing the depressed key. Furthermore, the rear end of the toe 216 of the said stirrup holds the toe of the secondary latch 214 clear of the arcuate extension 217 which, on release of the tooth 225 of the three-armed pawl 223 from the tooth 225 of the ratchet wheel 211, settles with the uppermost surface of the arcuate extension 217 abutting the underside of the toe 216 of the inverted U-shaped stirrup 206.

The above description of the operation of the various parts of the mechanism presupposes that the operator, having depressed a key, releases it quickly. Should, however, the operator hold the key depressed for a period of time in excess of the normal time of the cycle, the operation of certain parts at the end of the operating cycle is slightly different from that described above. The operating cycle under the new circumstances is the same as before up to the time when the arcuate extension 217 and the lever 218 of which it forms a part descend (that is when they rotate about the pivot 252 in a clockwise direction) due to the drive from the ratchet wheel 211 through the three-armed pawl 223. When the drive from the ratchet wheel 211 has caused the top of the arcuate extension 217 to pass below the level of the toe 216 of the inverted U-shaped stirrup 206 the toe 216 will not, as before, snap over the top of the arcuate extension 217 because the key is still being held down by the operator and because the lug 204 on the key stem 200 holds the key bar 37 to which the inverted U-shaped stirrup 206 is connected against movement. Therefore, the tension spring 219 secured to the secondary latch 214 causes the said latch to snap across the top of the arcuate extension 217 until the said latch is arrested by contact with the edge face of the toe 216 of the inverted U-shaped stirrup 206. In this position the secondary latch 214 will prevent further upward movement of the arcuate extension 217 which would otherwise automatically take place when the tooth 225 of the three-armed pawl 223 becomes disengaged from the ratchet wheel 211.

When the operator releases the key, the key bar will move rearwardly, thereby causing the toe 216 of the inverted U-shaped stirrup 206 to push the toe of the secondary latch 214 off the top of the arcuate extension 217 so that the toe of the latch 214 will drop below and behind the top of the arcuate extension 217 and permit the arcuate extension 217 to rise by the small clearance distance between the face of the toe 216 and the face of the secondary latch 214 into contact with the underside of the toe 216 of the inverted U-shaped stirrup 206.

The delay afforded by the mechanism hereinbefore described is at least $1/10$ second.

On addition and subtraction, this key delay apparatus insures completion of one addition or subtraction operation before insertion of other data into the main keyboard (comprising the twelve orders of keys 1 to 9 in FIG. 3), by preventing reoperation of the one-shot device U of FIG. 1 at contacts 232 until the keys involved in that addition or subtraction operation are restored.

For the case of multiplication the machine hereinbefore described is provided with means which are capable of producing electrically what has hitherto been effected mechanically by the transverse movement of the carriage which carries the accumulators. The means in their broadest aspect consist in transferring the contents of the accumulator of each order into the next higher order which when operating according to the decimal system has the effect of mutiplying the contents of the various accumulators of the different orders of keys by ten. This is achieved by adding impulses into a particular order sufficient to produce a transfer whereupon the remaining number of impulses are added into the next higher order. Thus, for example, if there exist in the accumulators associated with the first, second and third order of keys the numbers 4, 1 and 3 respectively, the means hereinafter described achieves the result of transferring the numeral 3 from the third order into the fourth order, transferring the numeral 1 from the second order into the third order and transferring the numeral 4 from the first order into the second order, and thus the figures which are displayed upon the accumulators of the calculating machine will be 3 1 4 0.

Dealing more specifically with the arrangement for achieving the above result, an electromechanical calculating machine constructed in accordance with the present invention is provided, in addition to the arrangement hereinbefore described, with two additional sets of O to Z studs. The said two sets of studs are associated with a pair of valves $T_7$ and $T_8$ operable to apply alternatively a potential to one or other of the said sets of studs. Each batch of studs of the first added set of studs is associated via a brush $F^1$ with a commutator segment of a particular order of keys whilst the corresponding batch of studs of the second added set of studs is associated via a brush $F^2$ with the commutator segment of the next adjacent order of keys.

The brushes $F^1$ and $F^2$ rotate with the brush F. Thus, the brush $F^1$ associates with the first added set of studs a set of commutators $O_9$ to $Z_9$, in however the order of $Z_9$ to $O_9$, so that brush $F^1$ delivers pulses from the O order of studs in the first added set to a segment $Z_9$, from the P order in the first added set to a segment $Y_9$, and so on. The brush $F^2$ associates with the second added set of studs a set of commutator segments L, $Z_9$, $Y_9$, etc. to $P_9$. Thus the brush $F^2$ delivers pulses from the O order of studs in the second added set to a segment L, from the P order of studs in the second added set to a segment $Z_9$, from the Q order of studs in the second added set to a segment $Y_9$, and so on, and lastly from the Z order in the second added set to a segment $P_9$. The commutator segments $O_9$ to $Z_9$ shown in FIG. 1 as engaged by the brushes $F^1$ and $F^2$ are short-circuited respectively to the similarly identified commutator segments of the series $O_9$ to $Z_9$ engaged by brush F. In addition there is provided a commutator segment L, engaged by the brush $F^2$ when sweeping the studs $O_{22}$ to $O_{30}$ of the first order in the second added set of studs. On multiplication this segment is connected through a switch $CS_7$ to the trigger electrode of the carry accumulator $H_1$. Further, for multiplication, the machine of FIG. 1 includes a counting tube L and a further pair of tubes $T_5$ and $T_6$. As will be further explained, the multiplying operation is controlled by a set of ten multiplier keys 0 through 9 seen at the right in FIG. 3. These keys control switches in the cathodes of the tube L.

On division, the commutator segment L connects through $CS_7$ to the stepping electrode of the counting tube L. Moreover, for multiplication and division the machine of FIG. 1 includes two additional pairs 3—3 and 4—4 of control studs, arranged like the studs E—E and G—G to be bridged by the brush $F^1$. The additional sets of studs and their associated commutator segments are preferably arranged upon a commutator plate in which both the studs and the commutator segments comprise either printed circuits or studs and bars embedded in suitable insulating material or in any other suitable manner. The brushes are mounted so as to rotate about the axis of the said commutator plate and bridge and short circuit one set of studs and their associated commutator segments.

Referring more specifically to FIGURE 1 of the accompanying drawings there is illustrated a circuit arrangement for effecting what will hereinafter be referred to as "multiplication by ten," although it is to be clearly understood that the system is not limited to a decimal system and is equally applicable to any system wherein the accumulators are capable of operating to a definite maximum, and wherein the accumulators all register to the same maximum. Assuming that the accumulators are all capable of registering up to a maximum of ten, the circuit arrangement comprises a first added set of ten studs associated with each order of keys and a further added set of nine studs associated with each order of keys. The first of the two sets of added studs comprises twelve batches each of ten studs, and will be hereinafter referred to as the $O_{12}$ to $O_{21}$, $P_{12}$ to $P_{21}$, $Q_{12}$ to $Q_{21}$, $R_{12}$ to $R_{21}$ etc. up to $Y_{12}$ to $Y_{21}$, and $Z_{12}$ to $Z_{21}$ batches of studs. The second added set of studs comprises twelve batches each of nine studs which will be hereinafter referred to as $O_{22}$ to $O_{30}$, $P_{22}$ to $P_{30}$, $Q_{22}$ to $Q_{30}$, $R_{22}$ to $R_{30}$ and so on up to $Y_{22}$ to $Y_{30}$ and $Z_{22}$ to $Z_{30}$ batches of studs. Each of the studs $O_{22}$, $P_{22}$, $Q_{13}$, $R_{22}$ and so on up to $Y_{22}$ and $Z_{22}$ of the second added set are disposed respectively in line with the studs $O_{13}$, $P_{13}$, $Q_{13}$, $R_{13}$ and so on up to $Y_{13}$ and $Z_{13}$ of the first added set, assuming brushes $F^1$ and $F^2$ (and for good measure, brush F) to be abreast of each other. Moreover, in each order, the first stud of subscript 22 in the second added row of studs is aligned with the first or O-subscript stud of those engaged by brush F.

It will therefore be observed that the first stud of each batch of studs of the second added set of studs is always disposed in alignment with the second stud of each batch of studs of the first added set of studs as clearly illustrated in FIGURE 1 of the drawing. Arranged in advance of the first stud of each batch of studs of the first set of added studs, namely in advance of the studs $O_{12}$, $P_{12}$, $Q_{12}$, $R_{12}$, and so on until $Y_{12}$ and $Z_{12}$ is a stud $E^0$, and arranged in advance, that is to the right of each $E^0$ stud in each order, with the exception of the order of studs $O_{12}$ to $O_{21}$, is a stud $F^0$.

The arrangement is such that when the brush $F^1$ sweeps over the studs $P_{12}$, $Q_{12}$ and so on up to $Y_{12}$ and $Z_{12}$ of the first added set, it will first contact with an $F^0$ stud arranged in advance of each batch of studs. Further in its sweep over the various sets of studs $F^1$ will contact, in advance of each batch of studs, an $E^0$ stud associated with each of the batches of studs $O_{12}$, $P_{12}$, $Q_{12}$, $R_{12}$, etc. Associated with the $O_{12}$, $P_{12}$ and so on up to $Z_{12}$ batches of studs swept by brush $F^1$ are commutator segments $Z_9$, $Y_9$, $X_9$, etc., up to $P_9$ and $O_9$. Arranged in advance of each of the commutator segments $Y_9$, $X_9$, etc., up to $P_9$ and $O_9$ engaged by brush $F^1$ are studs $E^0$ and $F^0$ arranged in alignment with the corresponding $E^0$ and $F^0$ studs associated with the $P_{12}$, $Q_{12}$, $R_{12}$, etc., up to $Y_{12}$ and $Z_{12}$ studs of the first added set of studs. Similarly, arranged in advance of the segment $Z_9$ associated with brush $F^1$ there is a stud $E^0$ bridgeable by $F^1$ to the $E^0$ stud in advance of the $O_{12}$ to $O_{21}$ studs of the first added set. The $E^0$ studs associated with the $O_{12}$, $P_{12}$, $Q_{12}$, $R_{12}$ up to $Y_{12}$ and $Z_{12}$ set of studs are connected to the trigger electrode $T^1{}_8$ of a valve $T_8$. The $E^0$ studs mounted in advance, (that is to the right when viewing FIGURE 1) of the commutator segments $Z_9$, $Y_9$, $X_9$, and so on up to $P_9$ and $O_9$ for brush $F^1$, are connected to the anode $T^1{}_5$ of a valve $T_5$. The batches of studs $O_{12}$ to $O_{21}$, $P_{12}$ to $P_{21}$, $Q_{12}$ to $Q_{21}$, $R_{12}$ to $R_{21}$ and so on up to the studs $Y_{12}$ to $Y_{21}$ and $Z_{12}$ to $Z_{21}$ are connected to the anode $T^2{}_8$ of the valve $T_8$. The $F^0$ studs in advance of the segments $Y_9$ to $O_9$ for brush $F^1$ are connected to a source of positive potential, and the $F^0$ studs between the orders of $-12$ to $-21$ studs in the first added set are coupled to the cathodes of $T_7$ and $T_8$. The second row of studs $O_{22}$ to $O_{30}$, $P_{22}$ to $P_{30}$, $Q_{22}$ to $Q_{30}$, $R_{22}$ to $R_{30}$, up to $Y_{22}$ to $Y_3$ and $Z_{22}$ to $Z_{30}$ are all connected during multiplication to the anode $T^1{}_7$ of a valve $T_7$, the cathode of which, like the cathode of $T_8$, is connected through a gate $G_5$ to the busbar J. The gate $G_5$ is operable in such a manner that when the valve $T_5$ is non-conducting the gate $G_5$ prevents any transfer impulse being applied to the trigger electrode $T^2{}_3$ of the valve $T_3$, but permits a transfer impulse to be applied to the cathodes of the valves $T_7$ and $T_8$.

The valves $T_7$ and $T_8$ are so interconnected that normally they are both maintained nonconductive when an impulse is fed through the gate $G_5$ to the cathodes of the valves $T_7$ and $T_8$ but if the valve $T_8$ has been rendered conductive prior to a transfer impulse being applied to the cathodes of the valves $T_7$ and $T_8$, the valve $T_8$ is rendered nonconductive and the valve $T_7$ conductive.

The valve $T_5$ hereinbefore referred to is so interconnected with the valve $T_6$ that when one of the valves is rendered conductive the other is rendered nonconductive, and further, when the machine is not being operated the valves $T_2$, $T_5$ and $T_9$ are all conductive and the valves $T_1$, $T_3$, $T_4$, $T_7$, $T_8$ and $T_6$ nonconductive.

The trigger electrode $T^1{}_6$ of the valve $T_6$ is connected through a contact $CS^1{}_5$ and a common terminal $CS^2{}_5$ of a two-way switch $CS_5$ to the "one shot device" in a manner more specifically described in connection with FIGURES 3 to 12. The two-way switch $CS_5$ in the alternative position thereof, with the common terminal $CS^2{}_5$ in engagement with the contact $CS^3{}_5$, connects the trigger electrode of the valve $T_1$ to the one shot device. Therefore in the case of calculations involving addition, division and subtraction the one shot device is connected to the trigger electrode $T^1{}_1$ of the valve $T_1$ whilst in the case where multiplication is to be effected the switch $CS_5$ connects the one shot device to the trigger electrode of the valve $T_6$. In order to effect multiplication there are provided six switches $CS_3$, $CS_4$, $CS_5$, $CS_7$, $CS_8$ and $CS_9$. The switches are shown with arithmetical signs indicating the positions to which they must be set in order to effect multiplication. It will be observed that when set for multiplication the common terminal of the switch $CS_3$ is connected to the anode $T^1_7$ of the valve $T_7$ and the switch $CS_4$ connects the anode $T^3_1$ of the valve $T_1$ as for addition. The electrode $H_2$ of the accumulator $H_1$ is connected to the contact $CS^1_7$ of the switch $CS_7$ and to the commutator segment H. On multiplication the switch $CS_5$ connects the trigger electrode $T^1_6$ of the valve $T_6$, through the studs E—E to the one shot device U. The electrode $L_{11}$ of the counter tube L is connected through the switch $CS_8$ and the studs 3—3 to the anode $T^3_1$ of the valve $T_1$. The switch $CS_9$ is arranged through the studs G—G to apply a positive pulse to the trigger electrode $T^2_5$ of the valve $T_5$ when the studs G—G are bridged and shorted by the brush $F^1$. The anode $T^2_8$ of the valve $T_3$ is connected as hereinbefore stated to the batches of studs $O_{12}$ to $O_{21}$, $P_{12}$ to $P_{21}$, $Q_{12}$ to $Q_{21}$, $R_{12}$ to $R_{21}$, and so on up to the studs $Y_{12}$ to $Y_{21}$ and $Z_{12}$ to $Z_{21}$ of the sets of studs which are swept by the brush $F^1$ and arranged to be bridged and short circuited successively by the brush $F^1$ with the commutator segments $Z_9$, $Y_9$ and so on up to $P_9$ and $O_9$. With the switches set for multiplication it will be observed that when the brush $F_1$ bridges the studs E—E with the one shot device in the position illustrated in the drawing, that is after any one key of a set of multiplier keys have been actuated, an impulse is transmitted from the one shot device through the contacts $CS^1_5$ and $CS^2_5$ of the switch $CS_5$ to the trigger electrode $T^1_6$ of the valve $T_6$ whereby the valve $T_6$ is rendered conductive and the valve $T_5$ nonconductive. The effect of the valve $T_5$ being rendered nonconductive is to place a zero voltage from the anode $T^1_5$ upon the studs $E^0$ associated with and in advance of each of the commutator segments $Z_9$, $Y_9$ and so on up to $R_9$, $P_9$ and $O_9$, and as the brush $F^1$ short circuits the said $E^0$ stud with the associated $E^0$ stud arranged in advance of each of the batch of studs $O_{12}$ to $O_{21}$, $P_{12}$ to $P_{21}$, $Q_{12}$ to $Q_{21}$, $R_{12}$ to $R_{21}$ and so on up to $Y_{12}$ to $Y_{21}$ and $Z_{12}$ to $Z_{21}$, zero potential is applied to the negative biassed trigger electrode $T^1_8$ of the valve $T_8$, which is thereupon rendered conductive and applies a potential to all the studs $O_{12}$ to $O_{21}$, $P_{12}$ to $P_{21}$, $Q_{12}$ to $Q_{21}$, $R_{12}$ to $R_{21}$ and so on up to $Y_{12}$ to $Y_{21}$ and $Z_{12}$ to $Z_{21}$. It will be observed that as the valve $T_8$ is rendered conductive the valve $T_7$ is nonconductive and therefore does not place a potential upon the studs $O_{22}$ to $O_{30}$, $P_{22}$ to $P_{30}$, $Q_{22}$ to $Q_{30}$, $R_{22}$ to $R_{30}$, and so on up to $Y_{22}$ to $Y_{30}$ and $Z_{22}$ to $Z_{30}$. Consequently, if the brush $F^1$ is arranged to make one complete revolution and to sweep over all the studs of each batch of studs ten impulses will be transmitted from each batch of studs through the commutator segments associated with the said batches of studs and the accumulators connected to the said commutator segments. Each accumulator will be stepped up ten places.

It will be observed from FIGURE 1 that the studs $O_{12}$ to $O_{21}$, $P_{12}$ to $P_{21}$, $Q_{12}$ to $Q_{21}$ and so on up to the studs $Y_{12}$ to $Y_{21}$ and $Z_{12}$ to $Z_{21}$ are associated respectively with the commutator segments $Z_9$, $Y_9$, $X_9$, $W_9$ and so on up to $P_9$ and $O_9$ and that the studs $O_{22}$ to $O_{30}$, $P_{22}$ to $P_{30}$, $Q_{22}$ to $Q_{30}$, $R_{22}$ to $R_{30}$ and so on up to $Y_{22}$ to $Y_{30}$ and $Z_{22}$ to $Z_{30}$ are associated respectively with the commutators L, $Z_9$, $Y_9$, $X_9$ and so on up to $Q_9$, $P_9$.

Assuming that the numerals 4, 1 and 3 are registered in the accumulators $O_{10}$, $P_{10}$ and $Q_{10}$ and the switches $CS_3$, $CS_4$, $CS_5$, $CS_7$, $CS_8$ and $CS_9$ are all set to multiplication, it will be readily appreciated that upon the brush $F^1$ bridging and short circuiting the contacts E—E an impulse will be sent from the one shot device U through the common terminal $CS^2_5$ of the two-way switch $CS_5$ to the contact $CS^1_5$ and thence to the trigger electrode $T^1_6$ of the valve $T_6$. The valve $T_6$ is rendered conductive and the valve $T_5$ nonconductive. The zero potential from the anode $T^1_5$ of the valve $T_5$ is applied to the contacts $E^0$ mounted in advance of the commutator segments $Z_9$, $Y_9$, $X_9$, $W_9$ and so on up to $P_9$ and $O_9$ and short circuited by the brush $F^1$ to the trigger electrode $T^1_8$ of the valve $T_8$ which will be rendered conductive and cause a potential from the anode $T^2_8$ to be applied to the studs $O_{12}$ to $O_{21}$, $P_{12}$ to $P_{21}$, $Q_{12}$ to $Q_{21}$, $R_{12}$ to $R_{21}$ and so on up to $Y_{12}$ to $Y_{21}$ and $Z_{12}$ to $Z_{21}$. The brush $F^1$ sweeping over the 0 contacts and the commutator $Z_9$ will send ten impulses from the $O_{12}$ to $O_{21}$ batch of studs to the accumulator $Z_{10}$ and a transfer impulse will be sent from the accumulator $Z_{10}$ through the diode or any other unidirectional electronic tube $Z_{11}$ and the gate $G_5$ to the cathodes $T^2_7$ and $T^3_8$ of the valves $T_7$ and $T_8$, whereupon the valve $T_8$ will be rendered nonconductive and the valve $T_7$ conductive applying a potential from the valve $T_7$ to all the studs $O_{22}$ to $O_{30}$, $P_{22}$ to $P_{30}$ and so on up to $Y_{22}$ to $Y_{30}$ and $Z_{22}$ to $Z_{30}$. In view of the fact that when this occurs the brush $F^2$ has passed over the stud $O_{30}$ and the commutator segment L nothing will result from the valve $T_7$ having been rendered conductive. Upon the brush $F_1$ reaching the pair of studs $F^0$—$F^0$ mounted in advance of $P_{12}$ to $P_{21}$ batch of studs and the commutator segment $Y_9$, a positive impulse will be transmitted to the cathodes $T^3_8$ and $T^2_7$ of the valves $T_8$ and $T_7$ which ensures that the valve $T_7$ is rendered nonconductive. When the brush $F^1$ bridges the studs $E^0$ mounted in advance of the $P_{12}$ to $P_{21}$ batch of studs and the associated commutator segment $Y_9$ a pulse is applied to the trigger electrode of the valve $T_8$ and this valve is made conductive. As a result, when the brush $F^1$ sweeps over the contacts $P_{12}$ to $P_{21}$, ten impulses are transmitted to the accumulator $Y_{10}$ which will record zero, but an impulse will be transmitted through the diode or any other unidirectional electronic tube $Y_{11}$ through the gate $G_5$ to the valve $T_8$ which is again rendered nonconductive, and the valve $T_7$ conductive which in turn is rendered nonconductive by the bridging of the studs $F^0$—$F^0$ mounted in advance of the Q studs and $X_9$ commutator segment.

The above procedure will continue until the brush $F^1$ reaches the $X_{12}$ $X_{21}$ set of studs (not shown), whereupon impulses will be sent to the commutator segment $Q_9$ and thence to the accumulator $Q_{10}$. In view of the fact that the accumulator $Q_{10}$ is recording 3 the brush $F^1$ will, after having swept over seven studs cause the accumulator $Q_{10}$ to register zero and an impulse will be transmitted through the diode or any other unidirectional electronic tube $Q_{11}$ to the cathode $T^3_8$ of the valve $T_8$ which will render the valve $T_8$ nonconductive and the valve $T_7$ conductive whereupon three impulses will be transmitted from the studs $X_{28}$, $X_{29}$ and $X_{30}$ (not shown) through the brush $F^2$ to the commutator $R_9$ (not shown) causing the accumulator $R_{10}$ to read 3. As the brush $F_1$ sweeps over the remaining commutator segments $P_9$ and $O_9$ associated with the batches of studs $Y_{12}$ to $Y_{21}$ and $Z_{12}$ to $Z_{21}$, ten impulses will be transmitted, in the manner indicated above from the $Y_{12}$ to $Y_{21}$ and $Z_{12}$ to $Z_{21}$ batches of studs to the accumulators $P_{10}$ and $O_{10}$ causing them successively to register zero and at the same time cause the valve $T_8$ to become nonconductive and the valve $T_7$ conductive with the result that the accumulators $P_{10}$, $Q_{10}$ and $R_{10}$ will register 4, 1 and 3 whilst the accumulator $O_{10}$ will read zero. It will be observed that by the above operation the numerals originally registered in the accumulators $O_{10}$, $P_{10}$ and $Q_{10}$ have all been stepped up one order, thereby multiplying the quantity originally shown on the accumulators by ten.

A calculation involving multiplication is carried into effect upon the machine hereinbefore described with reference to the accompanying drawings by, firstly, setting the machine for multiplication and then actuating keys of selected orders of keys which correspond to the number of the multiplicand. Each key representing a number of the multiplicand upon being actuated is held in its actuated position by means of a key locking mechanism. The highest digit of the multiplier is then set up upon the counter tube L by the depression of the appropriate multiplier key. Upon the actuation of the multiplier key in the manner hereinafter described the "one shot device" is set with the contact $U_1$ of the two-way switch U in contact with the contact $U_3$. The brush $F^1$ being set in rotation by the actuation of a key marked "X," in a manner hereinafter described, makes a contact in its path over the commutator plate with the studs E—E, causing a potential from the one shot device U to be applied to the trigger electrode $T^1_6$ of the valve $T_6$, thereby rendering the valve $T_6$ conductive and the valve $T_5$ nonconductive. Upon the valve $T_5$ being rendered nonconductive zero potential is applied from the anode $T^1_5$ thereof to all the contacts $E^0$ disposed in advance of the commutator segments $Z_9$, $Y_9$ and so on up to $Q_9$, $P_9$ and $O_9$ engageable by brush $F^1$, with the result that zero potential is applied to the trigger electrode $T^1_8$ of the valve $T_8$ which thereby renders the same conductive. Upon the valve $T_8$ being rendered conductive a potential is applied from the anode $T^2_8$ thereof to the contacts $O_{12}$ to $O_{21}$, $P_{12}$ to $P_{21}$, and so on up to $Y_{12}$ to $Y_{21}$ and $Z_{12}$ to $Z_{21}$, so that as the brush $F_1$ sweeps over the contacts $O_{12}$ to $O_{21}$ up to $Z_{12}$ to $Z_{21}$ impulses are transmitted to the commutator segments $Z_9$, $Y_9$ and so on up to the commutator segments $R_9$, $Q_9$, $P_9$ and $O_9$, and therefrom to the accumulators $Z_{10}$, $Y_{10}$ and so on to $R_{10}$, $Q_{10}$, $P_{10}$ and $O_{10}$.

More specifically, when the brush $F^1$ has swept over the studs $O_{12}$ to $O_{21}$ it bridges the stud $F^0$ arranged in advance of the studs $P_{12}$ to $P_{21}$ and also the stud $F^0$ arranged in advance of the commutator segment $Y_9$ causing a positive potential to be applied to the cathode $T^3_8$ of the valve $T_8$, thereby rendering the valve $T_7$ conductive.

Upon the brush $F^1$ sweeping over the studs $E^0$—$E^0$ arranged in advance of the studs $P_{12}$ to $P_{21}$, a zero potential is once again applied to the trigger of the valve $T_8$ causing the valve $T_7$ to be nonconductive. By the further movement of the brush $F^1$ the studs $P_{12}$ to $P_{21}$ are bridged successively with the commutator segment $Y_9$ and ten impulses are transmitted to the numerator $Y_{10}$. The above sequence of operations is carried through the twelve orders leaving all the numerators reading zero, as they were at the start of the operation.

The continued movement of the brush $F^1$ will cause it to bridge the studs G—G with the result that a positive potential will be applied to the trigger electrode $T^2_5$ of the valve $T_5$, thereby rendering the valve $T_5$ conductive and the valve $T_6$ nonconductive.

When the valve $T_6$ is rendered nonconductive it applies zero potential from the anode $T^2_6$ to the trigger electrode $T^1_1$ of the valve $T_1$ rendering the valve $T_1$ conductive and the valve $T_2$ nonconductive.

The valve $T_1$ being rendered conductive applies potentials through the common terminals $CS^3_4$ and contact of the two-way switch $CS_4$ to the S pairs of contacts of the keys of the multiplicand which have been actuated and held actuated in the various orders of keys and also through the pairs of contacts K of the same keys to the studs of the various orders of keys. Thus, for example, if the multiplicand comprises the numeral 851 the stud $O_0$ of the first order of keys will have a potential applied to it, the studs $P_0$, $P_1$, $P_2$, $P_3$ and $P_4$ of the second order of keys will have a potential applied to them and the studs $Q_0$, $Q_1$, $Q_2$, $Q_3$, $Q_4$, $Q_5$, $Q_6$, and $Q_7$ of the third order of keys will have a potential applied to them. As the brush F sweeps over the various studs of the first three orders of keys, it will transfer one pulse at each revolution into the accumulator $Q_{10}$, it will transmit five impulses into the accumulator $P_{10}$, and it will transmit eight impulses into the accumulator $Q_{10}$.

Assuming that the multiplier is 97 and the ninth multiplier key has been actuated, a glow will appear at the first cathode $L^1_1$ of the counter tube L.

Subsequent to the shift operation, after the brush F has completed one revolution over the various studs $O_0$ to $O_8$ up to $Z_0$ to $Z_8$ of the different orders of keys, the brush $F^1$ will have bridged the studs 3—3 and will have thereby caused an impulse from the anode of $T_2$ to be delivered through switch $CS_8$ to the driving electrode $L_{11}$ so that the glow in the counter L will pass from the first cathode $L^1_1$ to the second cathode $L^1_2$. After the brush F has made two revolutions the accumulator $P_{10}$ will read zero, having had ten impulses transmitted to it, and in consequence will have passed an impulse through the diode $P_{11}$ and $G_5$ to the trigger electrode $T^2_3$ of the valve $T_3$. Upon the further movement of the brush F over the studs C B and $C_1$ $B_1$ the valve $T_3$ will be rendered nonconductive and the valve $T_4$ conductive, applying a potential to the stud A which thereupon applies an impulse to the commutator segment $Q_9$ of the accumulator $Q_{10}$ which is therefore stepped up one before the brush F commences to step over the studs $Q_0$ to $Q_9$.

The movement of the brush F over the studs $O_0$ to $O_8$ up to $Z_0$ to $Z_8$ will continue until the counter tube L has stepped up nine steps, one step at a time, by the brush $F^1$ bridging the studs 3—3 at each revolution and applying a potential to the drive electrode $L_{11}$, whereupon an impulse will be transmitted from the electrode $L^1_0$ to the trigger electrode $T^1_2$ of the valve $T_2$ which thereupon renders the valve $T_2$ conductive and the valve $T_1$ nonconductive.

After the multiplicand has been introduced nine times into the accumulators $O_{11}$, $P_{11}$, $Q_{11}$ and $R_{11}$ the numerals in the various accumulators will come to rest whereupon the operator inserts the next highest numeral of the multiplier into the multiplier column whereupon the machine firstly moves all the numerals registered in the accumulators each into its next higher order, whereupon the multiplication by the next digit of the multiplier is effected in the manner hereinbefore described.

Thus to effect multiplication, the machine is first set for multiplication by operation of the multiplication key 39 of FIG. 3. Operation of this key sets the switches $CS_3$, $CS_4$, $CS_5$, $CS_7$, $CS_8$ and $CS_9$ to the positions indicated therefor in FIG. 1 by the multiplication sign. It also changes the machine from key responsive to key set operation, so that keys on the main keyboard once punched will remain depressed until a cancel key 89 or 90 is operated.

The multiplicand is thereafter inserted into the main keyboard, preferably with the lowest ordered digit thereof in the lowest order of keys. The multiplier key in column 38 corresponding to the digit of highest order in the multiplier is then operated. This starts the motor, operates the so-called one-shot device and closes a normally open switch connecting one of the cathodes of the multicathode counter tube L, which controls the number of addition cycles which will be automatically performed and initiates a shift operation. During this shift operation, beginning with the accumulator of highest order (except the carry accumulator H), the contents of each accumulator is shifted into the accumulator of next higher order, the contents of the accumulator of highest order being shifted into accumulator H. Assuming that the machine had been reset so that all accumulators read zero on insertion of the multiplicand into the main keyboard, as is desirable, this shift operation makes no change in the appearance of the accumulators. It is immediately followed, faster than the eye can perceive in practice, by addition of the multiplicand into the accumulators a number of times equal to the value of the operated multiplier key, the glow in counter tube L shifting one step towards the $L^1_0$ cathode on each such addition until it reaches the cathode $L^1_0$, whereupon the indicators come to rest.

The multiplier key corresponding to the multiplier digit of next lower order is then operated and the process is repeated. In this case however, since the accumulators are not initially at zero, the shift operation changes the status of the register, effectively multiplying its contents by ten. This shift operation is immediately followed, again before the numeral wheels 70 come to a stop, by addition into the register of the multiplicand a number of times equal to the value of the operated multiplier key, representing the second multiplier digit.

In the machine of FIG. 1 which has been described, the "shift" operation which precedes the working out of each multiplier digit is a shift to the left. For this reason, the multiplier digits are employed successively beginning with the multiplier digit of highest order. Consistently with the invention it is possible to construct the machine to shift the partial products to the right instead of to the left. In such a machine, multiplication would start with the multiplier digit of lowest order.

To the apparatus of FIG. 1 thus far described, a number of further elements are added for the performance of division. These elements, shown in FIG. 1, will be further described hereafter. Essentially they comprise the following:

(1) In the first added set of studs, thirteenth and fourteenth batches of ten studs $H_{12}$ to $H_{21}$ and $L_{12}$ to $L_{21}$, each of these batches being preceded by an $E^0$ and an $F^0$ stud. The studs $H_{12}$ to $H_{21}$ are connected, like the O through Z batches of studs in the first added set, to the plate of $T_8$. The studs $L_{12}$ to $L_{21}$ are connected to the plate of $T_6$. The $E^0$ and $F^0$ studs preceding the $H_{12}$ to $H_{21}$ and $L_{12}$ to $L_{21}$ batches are connected respectively, like the other $E^0$ and $F^0$ studs of the first added row, to $T_8$ grid and to the $T_7$, $T_8$ cathodes.

(2) In the second set of added studs, thirteenth and fourteenth batches of nine studs $H_{22}$ to $H_{30}$ and $L_{22}$ to $L_{30}$.

(3) A connection via switch $CS_3$ whereby, in the second added set of studs, the batch $O_{22}$ to $O_{30}$ is connected to the plate of $T_7$, as in multiplication, whereas the remaining P through Z, H and L batches are connected instead to the plate of $T_8$.

(4) Thirteenth and fourteenth commutator segments H and L associable by brush $F^1$ with the studs $H_{12}$ to $H_{21}$ and $L_{12}$ to $L_{21}$. These segments H and L are preceded by $E^0$ and $F^0$ studs aligned with the similarly identified studs preceding the $H_{12}$ to $H_{21}$ and $L_{12}$ to $L_{21}$ studs in the first added row and connected respectively to the plate of $T_5$ and to a source of positive potential.

(5) Thirteenth and fourteenth commutator segments $O_9$ and H associable by brush $F^2$ with the studs $H_{22}$ to $H_{30}$ and $L_{22}$ to $L_{30}$.

(6) A connection from the 0 cathode of the carry accumulator $H_1$ to the carry bus J.

(7) A connection from the 0 cathode $L^1_0$ of the control tube to the bus J via the switch labelled in FIG. 1 "Closed in Division Only."

The commutator segments mentioned in the fourth and fifth numbered paragraphs immediately preceding are short-circuited to the commutator segments of like designation already described in connection with the application of the machine of FIG. 1 to addition, subtraction and multiplication.

The machine will be hereinafter described with reference to a calculation involving division and a method of effecting such a calculation.

Dealing more specifically with the arrangement for achieving division, a machine constructed in accordance with the present invention is provided in addition to the arrangement hereinbefore described, with two sets of studs L and H in addition to the O to Z studs. The said two sets of studs are associated with a valve operable to apply simultaneously or alternatively a potential to both of the said sets of studs. Each batch of studs of a set of studs is associated with a commutator segment of a particular order of keys whilst the corresponding batch of studs of the other set of studs is associated with the commutator segment of the next adjacent order of keys.

Each of the additional sets of studs and their associated commutator segments hereinbefore referred to are arranged to be swept by rotatable brushes $F^1$ and $F^2$. The additional sets of studs and their associated commutator segments are preferably arranged upon a commutator plate in which both the studs and the commutator segments comprise printed circuits or studs and commutator segments embedded in suitable material or in any other suitable manner. The brushes are mounted so as to rotate about the axis of the said commutator plate and bridge so as successively to short circuit each stud of a set of studs and the associated commutator segment.

In order to effect a calculation in division it is first necessary to set the machine for addition and, the register first having been cleared, to insert the dividend into the register with the most significant digit thereof in the highest order of keys, that is, in the example illustrated in FIGURE 1, in the twelfth order of keys. When the divident has been registered in the appropriate accumulators of the register the machine is set for division by operation of the key 93. This sets switches $CS_3$, $CS_4$, $CS_5$, $CS_7$, $CS_8$ and $CS_9$ and the "Closed in Division Only" switch to the positions indicated therefor in FIG. 1 for division. It also sets the counting tube L with the glow therein at the cathode $L^1_9$. The divisor is then inserted into the main keyboard of the machine with the most significant numeral thereof in the highest order of keys, namely in the twelfth order of keys. The actuation of the key marked "DIVIDE" in FIG. 3 causes the one shot device U to operate and starts a division cycle.

Upon the actuation of the one shot device U an impulse is transmitted to the trigger electrode $T^1_1$ of the valve $T_1$ thereby rendering the same conductive and the valve $T_2$ nonconductive. Upon the valve $T_1$ being rendered conductive a potential is applied through the switch $CS_4$ and the K switches to the various orders of studs with the result that as the brush F sweeps over the stud $O_0$ to $O_8$, $P_0$ to $P_8$ and so on up to $Y_0$ to $Y_8$ and $Z_0$ to $Z_8$, the complement of the divisor is added into the dividend. If, as a result of the addition of the complement of the divisor to the dividend a transfer is effected from the accumulator $Z_{10}$ to the accumulator $H_1$ the valve $T_9$ (of the transfer device comprising the arrangement of valves $T_3$, $T_4$, and $T_9$ hereinbefore described), will be rendered non-conductive and consequently zero potential will be applied from the anode $T_2^9$ to one stud 4 of the pair of studs 4—4 which when the studs 4—4 are bridged by the brush $F^1$ will cause a zero potential to be applied to the drive electrode $L^{11}$ of the stepping electronic tube L and consequently the stepping electronic tube L is unaffected. The brushes then perform a second cycle in which the complement of the divisor is again added to the dividend, and this process continues until on such an addition no carry into $H_1$ is produced.

In that event the first quotient digit has been extracted (at $H_1$). This is followed without stopping of the brushes, by what may be called a shift and complement operation. The result of this operation, presently to be described in detail, is to transfer the content of each of the accumulators $O_{10}$ to $Y_{10}$ into the accumulator of next higher order and to replace it there by its nines complement, to transfer the content of $Z_{10}$ in uncomplemented form into the control tube L and in nines complemented form into $H_1$, and the content of $H_{10}$ in nines complemented form into $O_{10}$. The machine then comes to a stop, with the first quotient digit appearing in nines complemented form at $O_{10}$. Extraction of the second quotient digit is then initiated by a second operation of the DIVIDE key of FIG. 3, and when the indicator wheels 70 next come to a stop, at the end of the shift and complement operation which is the concluding effect of the second operation of that key, accumulators $P_{10}$ and $O_{10}$ contain respectively the first and second quotient digits, both in true form. Quotient digits are thus extracted in pairs.

To revert now to the explanation previously undertaken, when during the extraction of the first quotient digit an addition of the divisor complement does not effect a transfer or carry from the accumulator $Z_{10}$ to the accumulator $H_1$, the valve $T_9$ will remain conductive and a potential of −150 volts will be applied as the brush $F^1$ bridges the studs 4—4, to the drive electrode $L^{11}$ of the stepping electronic tube L to step the glow from $L^1_9$ to $L^1_0$ and in so doing transmit an impulse to the trigger electrode $T^1_2$ of the valve $T_2$ causing the valve $T_1$ to be rendered nonconductive and the valve $T_2$ conductive. Upon the valve $T_1$ being rendered nonconductive a pulse is applied from the anode thereof to the trigger electrode $T^1_6$ of the valve $T_6$ which renders the valve $T_6$ conductive and the valve $T_5$ nonconductive.

When the valve $T_5$ is rendered nonconductive a zero potential is applied from the anode $T^1_5$ of the valve $T_5$ to the studs $E^0$ arranged in advance of the commutator segments $Z_9$, $Y_9$ and so on up to H and L. When the brush $F^1$ bridges the successive pairs of studs $E^0$—$E^0$, zero potential is applied from the anode $T^1$- of the valve $T_5$ to the normally negatively biased trigger electrode of the valve $T_8$ which is thereupon rendered conductive. When rendered conductive the valve $T_8$ applies a negative potential to the studs $O_{12}$ to $O_{21}$, $P_{12}$ to $P_{21}$, up to $H_{12}$ to $H_{21}$ and to the studs $P_{22}$ to $P_{30}$ and so on up to $L_{22}$ to $L_{30}$.

The sequence of operations is that the shifting operation commences at the accumulator $Z_{10}$. The contents of $Z_{10}$ are initially transferred into the control tube L without being complemented, leaving the accumulator $Z_{10}$ clear. The contents of the accumulator $Y_{10}$ are then shifted into the accumulator $Z_{10}$ and complemented, the contents of the accumulator $X_{10}$ complemented and shifted into the accumulator $Y_{10}$ and so on until the contents of the accumulator $O_{10}$ are complemented and shifted into the accumulator $P_{10}$. At this stage the contents of the accumulator $H_{10}$ are complemented and shifted into the accumulator $O_{10}$ which has become a clear stage. This leaves the accumulator $H_{10}$ clear. The number which should have been complemented and shifted, at the commencement of the operations from the accumulator $Z_{10}$ into the accumulator $H_{10}$ can now be shifted and complemented from the accumulator L into the accumulator $H_{10}$. As the tube L is used to control "catching up," it is necessary that the number which was shifted, without complementing from $Z_{10}$ into the tube L be preserved in the tube L. Accordingly, it is essential in the step of shifting and complementing the content of L into $H_{10}$ to deliver ten pulses to the tube L and not to stop pulsing it when it reaches zero. The studs $L_{12}$ to $L_{21}$ are therefore supplied with a voltage from the anode of the valve $T_6$ which is conductive during the whole cycle of shifting and complementing.

It will therefore be observed that in order to effect division the dividend is firstly added into the register. The machine is set for division, whereupon the stepping electronic tube L is set to 9. The divisor is entered on the keys of the main keyboard and the DIVIDE key is actuated once for every digit of the quotient that the operator desires. The actuation of the DIVIDE key merely effects the operation of the one shot device which causes the valve $T_1$ to become conductive. The valve $T_1$ applies a potential through the switch $CS_4$, the contacts K of the various batches of studs $O_0$ to $O_8$, $P_0$ to $P_8$ and so on up to $Y_0$ to $Y_8$ and $Z_0$ to $Z_8$ and depending upon which keys in the various orders of keys have been actuated so the various studs (viewing from the left-hand side of FIGURE 1) $Z_8$ to $Z_0$, $Y_8$ to $Y_0$ and so on down to $P_8$ to $P_0$ and $O_8$ to $O_0$, have a potential placed upon them and to complement of the divisor is added into the successive accumulators $Z_{10}$, $Y_{10}$ and so on up to $P_{10}$ and $O_{10}$. If upon the addition of the complement of the divisor to the dividend there is no transfer from the accumulator $Z_{10}$ to $H_1$, the valve $T_9$, which is normally conductive, applies a potential through the studs 4—4 to the drive electrode $L^{11}$ of the stepping electronic tube L and causes the glow on the electrode $L^1_9$ to move to the electrode $L^1_0$ with the result that a pulse is applied from the electrode $L^1_0$ to the trigger electrode $T^1_2$ of the valve $T_2$ causing the valve $T_2$ to be rendered conductive and the valve $T_1$ to be rendered nonconductive. Upon the valve $T_1$ being rendered nonconductive a pulse is sent to the trigger electrode $T^1_6$ of the valve $T_6$ which is rendered conductive causing the valve $T_5$ to be rendered nonconductive. Upon the valve $T_5$ being rendered non-conductive, zero potential from the anode $T^2_5$ of the valve $T_5$ is applied to the studs $E^0$ arranged in advance of the commutator segments $Z_9$, $Y_9$ and so on up to H and L and as the brush $F^1$ bridges and short circuits the associated studs E—E the zero potential from the anode $T^2_5$ of the valve $T_5$ is applied to the trigger electrode $T^1_8$ of the valve $T_8$ which thereupon becomes conductive and applies a potential to all of the studs of both sets of studs $O_{12}$ to $O_{21}$, and $P_{12}$ to $P_{21}$ and so on up to $H_{12}$ to $H_{21}$, as well as upon the studs $P_{22}$ to $P_{30}$ and so on up to $H_{22}$ to $H_{30}$ and $L_{22}$ to $L_{30}$. The studs $L_{12}$ to $L_{21}$ are fed with −150 volts from $T_6$ whilst the studs $O_{22}$ to $O_{30}$ are energised from $T_7$.

As a result of this operation and the movement of the brushes $F^1$ and $F^2$ over the various studs and the commutators of the various accumulators, the numeral standing in any one accumulator is shifted to the next order and complemented. Thus the numeral standing in the accumulator $Z_{10}$ is moved into the tube L without being complemented and is also moved into the accumulator $H_1$ and complemented, the numeral standing in the accumulator $Y_{10}$ is shifted into the accumulator $Z_{10}$ and complemented and so on until the numeral appearing in the $H_1$ accumulator is shifted into the $O_{10}$ accumulator and complemented.

After this operation is completed the operator once again actuates the key marked DIVIDE on the control panel, whereupon the operation as hereinbefore described is repeated with the exception that if there is a transfer from the accumulator $Z_{10}$ into the accumulator $H_1$ the valve $T_9$ will be rendered nonconductive and in consequence the studs 4 will have a zero potential applied to one of them which when applied through the brush $F^1$ to the drive electrode $L_1$ of the stepping electronic tube L will have no effect, and consequently the valve $T_2$ will not be rendered conductive and in consequence the valve $T_1$ will remain conductive and the valve $T_6$ will remain non-conductive and the operation of adding the complement of the divisor to the dividend will continue.

When, however, the numeral which is shifted from the accumulator $Z_{10}$ into the stepping tube L is not nine, it will be observed that until the stepping electronic tube L has been moved so that the glow is on the electrode $L_0$ the shifting and complementing operation hereinbefore described will not take place and the machine under such circumstances performs automatically what is known as catching-up. The amount that has got to be caught up is determined by the stepping electronic tube L which is in turn controlled by the numeral which is transferred from the accumulator $Z_{10}$ into the said stepping electronic tube L. The process carried out by the machine is best understood from the attached chart in which the operation of the machine is shown in the case in which the numeral 2555 is being divided by the numeral 35. As hereinbefore stated the dividend 2555 is first introduced with the machine set for addition and the numeral 2 in the twelfth order of keys. The machine is thereupon set for division and the keys 35 in the twelfth and eleventh order of keys are actuated. The stepping electronic tube L is set to $L_9$ with the result that the cycle of operations, which will be clearly appreciated from the following chart, is initiated. The operator depresses a key marked DIVIDE as many times as there are required digits of the quotient.

The following chart is set out with only the readings of the first three and the last five accumulators as the readings of the remaining five accumulators will only vary between 0 and 9.

In the foregoing chart, the numbers in line 1 show the content of the register after the machine has been set up to divide 2555 by 35. The "add 65" operation described at the right of that line results from a first operation of the DIVIDE key of FIG. 3. Line 2 represents the

| | $H_1$ | L | $Z_{10}$ | $Y_{10}$ | $X_{10}$ | $W_{10}$ | | $Q_{10}$ | $P_{10}$ | $O_{10}$ | |
|---|---|---|---|---|---|---|---|---|---|---|---|
| 1 | 0 | 9 | 2 | 5 | 5 | 5 | 0 | 0 | 0 | 0 | Add 65 in $Z_{10}$ and $Y_{10}$. |
| 2 | 0 | 0 | 9 | 0 | 5 | 5 | 0 | 0 | 0 | 0 | No carry from $Z_{10}$ to $H_1$ but one pulse is added to L causing glow to reach $L_0$. Therefore shift and complement. (Note that contents of $Z_{10}$ are shifted into L without complementing and into $H_1$ with complementing.) |
| 3 | 0 | 9 | 9 | 4 | 4 | 9 | 9 | 9 | 9 | 9 | Add 65 in $Z_{10}$ and $Y_{10}$. |
| 4 | 1 | 9 | 5 | 9 | 4 | 9 | 9 | 9 | 9 | 9 | Carry from $Z_{10}$ to $H_1$. Therefore add 65 again. |
| 5 | 2 | 9 | 2 | 4 | 4 | 9 | 9 | 9 | 9 | 9 | Carry from $Z_{10}$ to $H_1$. Therefore add 65 again. |
| 6 | 2 | 0 | 8 | 9 | 4 | 9 | 9 | 9 | 9 | 9 | No carry from $Z_{10}$ to $H_1$ but one pulse is added to L causing glow to reach $L_0$. Therefore shift and complement. |
| 7 | 1 | 8 | 0 | 5 | 0 | 0 | 0 | 0 | 0 | 7 | (Note that glow is now on $L_8$ indicating that there is "1" to catch up.) Add 65. |
| 8 | 1 | 9 | 7 | 0 | 0 | 0 | 0 | 0 | 0 | 7 | No carry from $Z_{10}$ to $H_1$ but one pulse is added to L causing glow to reach $L_9$ which indicates that "1" has been caught up. Add 65. |
| 9 | 2 | 9 | 3 | 5 | 0 | 0 | 0 | 0 | 0 | 7 | Carry from $Z_{10}$ to $H_1$. Therefore add 65 again. |
| 10 | 3 | 9 | 0 | 0 | 0 | 0 | 0 | 0 | 0 | 7 | Carry from $Z_{10}$ to $H_1$. Therefore add 65 again. |
| 11 | 3 | 0 | 6 | 5 | 0 | 0 | 0 | 0 | 0 | 7 | No carry from $Z_{10}$ to $H_1$ but one pulse is added to L causing glow to reach $L_0$. Therefore shift and complement. |
| 12 | 3 | 6 | 4 | 9 | 9 | 9 | 9 | 9 | 2 | 6 | (Note that the glow is now on $L_6$ indicating that there is "3" to catch up.) Add 65 in $Z_{10}$ and $Y_{10}$. |
| 13 | 4 | 6 | 1 | 4 | 9 | 9 | 9 | 9 | 2 | 6 | Carry from $Z_{10}$ to $H_1$. Therefore add 65 again. |
| 14 | 4 | 7 | 7 | 9 | 9 | 9 | 9 | 9 | 2 | 6 | No carry from $Z_{10}$ to $H_1$ but one pulse is added to L causing glow to reach $L_7$ which indicates that there is still "2" to catch up. Therefore add 65 again. |
| 15 | 5 | 7 | 4 | 4 | 9 | 9 | 9 | 9 | 2 | 6 | Carry from $Z_{10}$ tl $H_1$. Therefore add 65 agian. |
| 16 | 6 | 7 | 0 | 9 | 9 | 9 | 9 | 9 | 2 | 6 | Carry from $Z_{10}$ to $H_1$. Therefore add 65 again. |
| 17 | 6 | 8 | 7 | 4 | 9 | 9 | 9 | 9 | 2 | 6 | No carry from $Z_{10}$ to $H_1$ but one pulse is added to L causing glow to reach $L_8$ which indicates that there is still "1" to catch up. Therefore add 65 again. |
| 18 | 7 | 8 | 3 | 9 | 9 | 9 | 9 | 9 | 2 | 6 | Carry from $Z_{10}$ to $H_1$. Therefore add 65 again. |
| 19 | 8 | 8 | 0 | 4 | 9 | 9 | 9 | 9 | 2 | 6 | Carry from $Z_{10}$ to $H_1$. Therefore add 65 again. |
| 20 | 8 | 9 | 6 | 9 | 9 | 9 | 9 | 9 | 2 | 6 | No carry from $Z_{10}$ to $H_1$ but one pulse as added to L causing glow to reach $L_9$ indicating that catching up is complete. Add 65 again. |
| 21 | 9 | 9 | 3 | 4 | 9 | 9 | 9 | 9 | 2 | 6 | Carry from $Z_{10}$ to $H_1$. Therefore add 65 again. |
| 22 | 9 | 0 | 9 | 9 | 9 | 9 | 9 | 9 | 2 | 6 | No carry from $Z_{10}$ to $H_1$ but one pulse is added to L causing glow to reach $L_0$. Therefore shift and complement. |
| 23 | 0 | 9 | 0 | 0 | 0 | 0 | 0 | 7 | 3 | 0 | Quotient appears in $Q_{10}$ and $P_{10}$. |

result of that operation, but it cannot be seen, in practice, by the observer since the shift and complement operation of line 2 follows automatically in a time which may readily be a small fraction of a second.

The result of this shift and complement operation is shown in line 3. The machine has now come to a stop, and $O_{10}$ contains the nines complement of the first quotient digit.

The operator presses the DIVIDE key again, as a result of which the machine carries out the operations described at the right of lines 3 through 6. The machine comes to rest displaying the numbers shown in line 7, where the contents of $P_{10}$ and $O_{10}$ are the first two quotient digits in true form.

The operator now presses the DIVIDE key a third time, as a result of which the machine carries out the operations described at the right of lines 7 through 11, the machine coming to rest displaying the numbers shown in line 12. The contents of $Q_{10}$, $P_{10}$ and $O_{10}$ now represent the first three quotient digits in nines complemental form. Note that in this sequence of operation the first addition of the divisor complement represents catching up and not, in the narrow sense, extraction of a quotient digit.

The operator now punches the DIVIDE key a fourth time, initiating the operations described in lines 12 through 22 resulting in stopping of the machine with the register as indicated in line 23, where the four quotient digits appear in $R_{10}$ (not shown, but displaying zero) $Q_{10}$, $P_{10}$ and $O_{10}$.

Figure 11:
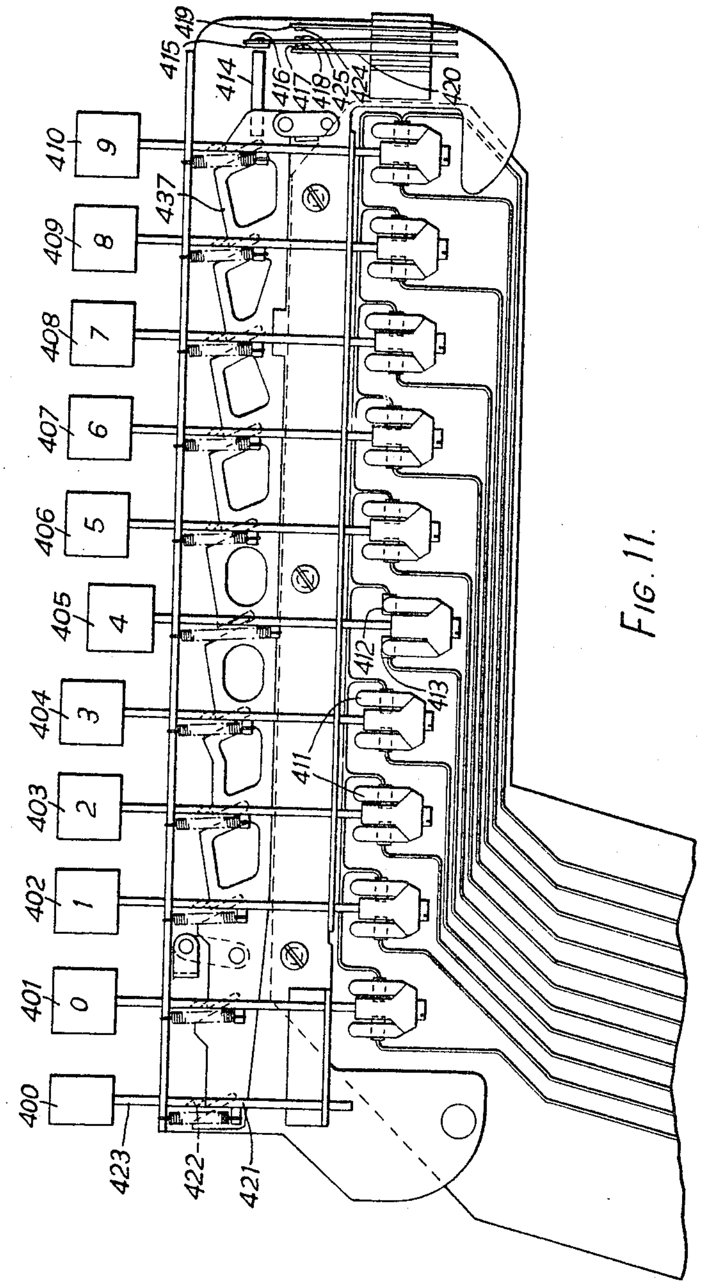
FIGURES 11 and 12 are respectively side elevations of the multiplier key and control key columns in the machine of FIGURES 3 and 4.

On division operation of the DIVIDE key 400 of FIGS. 3 and 11 briefly closes a pair of normally open contacts temporarily to connect the $L^1_9$ cathode in tube L of FIG. 1 to the −150 volt bus shown beneath that tube in order to draw the glow in that tube to cathode $L^1_9$. The multiplier keys 1 through 9 effect respectively temporary closure, during multiplication, of similar normally open contacts between the −150 volt bus and the cathodes $L^1_9$ through $L^1_1$ respectively. For the multiplied digit 0, similar contacts are provided between the $L^1_0$ cathode and the −150 volt bus.

There has been hereinbefore described with reference to FIGURE 1 of the accompanying drawings a circuit diagram of a calculating machine capable of carrying into effect electronically operations which hitherto have been mainly, if not solely, effected by mechanical means. In FIGURES 3 to 10 there are illustrated a machine and the parts thereof showing one means whereby the essential mechanical operations of such a machine are carried into effect so as to ensure that the electrical result designed to be achieved by means of the circuit arrangements illustrated in connection with FIGURE 1 may be effected as a result of certain mechanical actuations on the part of an operator.

Thus, FIGURES 3 and 4 illustrate a calculating machine having a plurality of orders of keys 80, an accumulator 70 associated with each order of keys, selecting means, in the form of a rotatable brush F and a commutator plate 12 operable upon the actuation of a key in any one order of keys to ensure the transmission of a selected number of electrical impulses to control the actuation of the accumulator 70 associated with the said orders of keys and ensure that the number registered by the said accumulator 70 is varied by an amount related to the numeral which the actuated key represents.

Further, means are provided for controlling adjacent pairs of accumulators 10 so that a transfer from one order of the machine may be recorded in the accumulator of the next adjacent higher order.

The machine illustrated in FIGURES 3 and 4 comprises a base frame 10 to which is fitted or secured a panel 11, which may be made in a single piece or as a built up structure. The panel 11 is arranged to embody or carry a commutator plate 12 upon which are arranged either in the form of a printed circuit or as elements embedded in a suitable material or in any other desired manner, studs corresponding to the studs $O_0$ to $O_8$, $P_0$ to $P_3$, $Q_0$ to $Q_8$ and so on up to $Y_0$ to $Y_8$ and $Z_0$ to $Z_8$ of the circuit illustrated in FIGURE 1 and also commutator segments $O_9$, $P_9$, $Q_9$ and so on up to $Y_9$ and $Z_9$ corresponding to the commutator segments $O_9$ to $Z_9$ of the circuit illustrated in FIGURE 1. The commutator segments $O_9$ to $Z_9$ are arranged on the plate 12 so as to be respectively associated with the batches of studs $O_0$ to $O_8$, $P_0$ to $P_8$, $Q_0$ to $Q_8$ and so on up to $Y_0$ to $Y_8$ and $Z_0$ to $Z_8$. In addition to the studs hereinbefore referred to there are provided in advance of the batch of studs $O_0$ to $O_8$, the two studs C and B and the stud D. In advance of each of the remaining batches of studs $P_0$ to $P_8$, $Q_0$ to $Q_8$ and so on up to $Y_0$ to $Y_8$ and $Z_0$ to $Z_8$ are three studs C, B and A. Mounted in advance of each commutator segment corresponding to the various batches of studs are contacts $C_1$ and $B_1$. Each of the studs A are arranged in line with the leading end (that is the right-hand end when viewing FIGURE 1) of each commutator segment $P_9$, $Q_9$ and so on up to $Z_9$ and H. The commutator plate 12, whether formed integral with or supported by the panel 11, has in the example illustrated in FIGURES 3 and 4 the studs and the commutator segments thereof mounted on the under-side so as to face downwardly when viewing FIGURE 3. Secured upon the panel 11 which carries the commutator plate 12 are, if necessary, a series of additional commutator plates, for example the commutator plates 14 and 15, which are employed in a calculating machine where functions such as automatic multiplication and division are desired. The commutator plates 14 and 15 are carried upon columns 16 and 17 and in the example illustrated carry their requisite studs and commutator segments upon the upwardly directed face thereof. Arranged to extend through the plates 12, 14 and 15 and carried in suitable bearings on intervening panels 18 and 19 is a spindle 20 to which are attached suitable brushes F, $F^1$ and $F^2$ arranged to bridge the studs and the commutator segments and the pairs of studs hereinbefore referred to and in the manner described in connection with FIGURE 1. The brushes F, $F^1$ and $F^2$ are arranged to be rotated by means of a pulley-wheel 21 mounted at the upper end when viewed in FIGURE 3 of the spindle 20, the pulley 21 being secured to the spindle and arranged to receive a belt 22 which engages with a pulley 23 driven by a vertical output spindle 25 of an electric motor 24.

The motor 24 with integral gear reduction is mounted on the base 10 and is connected, for example, by two belts from two pulleys 27 and 26 mounted upon the vertical output spindle 25 of the gear box or by any other conventional gears and shafts to a spindle 301 of the accumulator 70 and to the spindle 50 of the keyboard delay mechanism hereinafter described.

The keyboard delay mechanism is arranged to ensure that once a key of any order of keys has been actuated another key in the same order of keys cannot be actuated until the machine has cleared all the data which is carried upon the commutator plates 12, 14 and 15.

The machine illustrated in FIGURES 3 and 4 shows a machine having a plurality of orders of keys which are operable to vary the numeral displayed either upon a mechanically operated accumulator wheel 70 or any stepping electronic tubes arranged either to supplement or take the place of the said mechanically operated accumulator wheel 70.

Referring to FIGURES 3 and 4, there will now be described how the motor 24 is switched on when any one key of the plurality of orders of keys 80 which comprises the main keyboard of the machine is actuated in a calculation involving addition and subtraction. Normally, the motor 24 is switched off and arranged to be brought into operation by permitting a yieldingly-controlled contact 34 to make contact with a contact 35.

Dealing with a calculation involving addition, the mechanism for permitting the contact 34 to engage with the contact 35 comprises a switch stirrup 29 (FIGURE 3) which is arranged to span the main keyboard and is provided with an upwardly projecting arm 30 connected adjacent to the right-hand end thereof (when viewing FIGURE 3). The arm 30 is provided with a hole at the upper extremity thereof arranged to receive the end of a rod 31 which is guided between a pair of studs or pressed lugs 32 carried by or formed upon a fixed part of the machine. The free end of the rod 31 (FIGURE 4) is arranged to bear against the face of a flap 33 mounted upon a pivot 34_a_. The flap 33 is provided at the displaceable free end thereof with a rearwardly extending projection 33_a_, the free end of which abuts against an insulated button 36 fitted to the displaceable end of the spring contact 34. It will be observed that when any one key of an order of keys is actuated the rod 31 moves with the associated key bar 37 towards the left-hand side of the drawing (when viewing FIGURE 4) and thereby permits the flap 33 to move to the left about its pivot 34_a_ (when viewing FIGURE 4) and thereby permit the contact 34 to move into engagement with the contact 35, and so close the circuit of the motor 24. Upon the restoration of the actuated key to its normal position the rod 31 will push the flap 33 towards the right and thereby move the contact 34 out of engagement with the contact 35 and so open the circuit of the motor 24.

It will be appreciated that in order to ensure that the overrun of the motor continues for a sufficient time to permit, for example, the accumulator 70 to follow any change in the stepping electronic tubes effected by the bridging of the studs and commutator segments described with reference to FIGURE 1, it may be necessary to provide either a mechanical delay device such as a dashpot or the electrical equivalent in the circuit between the contacts 34, 35 and the motor 24.

In order to effect multiplication upon a machine embodying the characteristics hereinbefore described it is first necessary to "make" switch $CS_8$ and to move the common terminal of the switch $CS_9$ to the left, thereby connecting a stepping electronic counter tube L in circuit with the stud 3 and also the trigger electrode $T^1{}_2$ of the valve $T_2$ in circuit with the zero cathode of the tube L. The above operation can be effected by the actuation of the multiplication key 39 in the control column 40 of FIGURE 3.

The stepping tube L is set by the actuation of one of a series of multiplier keys numbered 0 to 9 mounted in the multiplier key column 38 of FIGURE 3. Normally the tube L is clear and if it is desired to effect multiplication by any numeral the actuation of the corresponding multiplier key sets the stepping electronic tube L to the "tens" complement of that figure. Thus, if it is desired to multiply by six, the actuation of the No. 6 multiplier key will ensure that the stepping electronic tube L is set for 10—6, namely 4, thereby ensuring that the stepping electronic tube L is moved six steps in returning to zero or the clear position. At the clear or zero position a potential will be applied to the trigger electrode $T^1{}_2$ whereby the valve $T_2$ will be rendered conductive and in consequence render the valve $T_1$ nonconductive and so break the supply of potential to the studs of the various orders of keys.

The arrangement for carrying into effect automatic multiplication of a multiplicand by a digit of a multiplier necessitates the driving electrode $L^{11}$ of the stepping electronic tube L being connected to one of the pair of studs 3—3 the other stud being connected to the anode $T^3{}_1$ of the valve $T_1$. The arrangement is such that when it is desired to multiply a number for example 851 by 97 the multiplication key 39 of the control column 40 is actuated and then the keys 1, 5 and 8 of the first, second and third order of keys are depressed. The keys so representing the multiplicand are locked or held in their actuated position. Upon the actuation of the No. 7 key of the multiplier keys the motor operable to drive the machine is set in operation and thereafter the one shot device is actuated in a manner hereinafter described. The actuation of the multiplier key will set the stepping electronic tube L to 10–_n_, where _n_ represents the numeral of the multiplier key which has been actuated and which in the example chosen will be 7. Upon the actuation of the selected multiplier key the one shot device U is operated and an impulse is transmitted through the studs E—E to the trigger electrode $T^1_1$ of the valve $T_1$ which is rendered conductive and the valve $T_2$ nonconductive. Upon the valve $T_1$ being rendered conductive a potential is applied, by way of the contacts $CS^3_4$ and $CS^1_4$ of the two-way switch $CS_4$, to the studs $Q_0$ to $Q_7$ of the third order of keys, to the studs $P_0$ to $P_4$ of the second order of keys and to the stud $O_0$ of the first order of keys.

The multiplier key No. 7 of the stepping electronic tube L has initially been actuated with the result that a glow will occur upon the cathode $L^1_3$. As the brush F sweeps over the various orders of keys it will transmit in its first revolution eight impulses to the accumulator $Q_{10}$, five impulses to the accumulator $P_{10}$ and one impulse to the accumulator $O_{10}$. When the brush F has completed one revolution a circuit will be completed through the contacts 3—3, through the drive electrode $L^{11}$ of the stepping electronic tube L whereupon the glow at the cathode $L^1_3$ of the stepping electronic tube L will be extinguished and a glow at the electrode $L^1_4$ will be formed. An impulse is not transmitted to the trigger electrode $T^1_2$ of the valve $T_2$ by the zero cathode and in consequence the valve $T_2$ remains nonconductive, and the valve $T_1$ remains conductive. In the conductive state of the valve $T_1$ it is connected through the two-way switch $CS_4$ to the studs of the first, second and third order of keys and the brush in commencing its second revolution will transmit one impulse to the accumulator $O_{10}$, five to the accumulator $P_{10}$, which will cause the accumulator $P_{10}$ to read zero and transfer, in the manner hereinbefore described, an impulse by way of the stud A to the accumulator $Q_{10}$. In addition the accumulator $Q_{10}$ will receive eight impulses from the studs associated therewith, bringing the total number of impulses transmitted to the accumulator $Q_{10}$ up to 17. As a result of seventeen impulses having been transmitted to the accumulator $Q_{10}$ one impulse will be transferred from the accumulator $Q_{10}$ to the accumulator $R_{10}$, thus causing the accumulators $O_{10}$, $P_{10}$, $Q_{10}$ and $R_{10}$ to read 2, 0, 7 and 1 respectively. Upon the completion of the seventh revolution of the brush F the glow at the cathode $L^1_9$ of the stepping electronic tube L will be extinguished and the glow will pass from the cathode $L^1_9$ to the cathode $L^1_0$. Upon the glow passing from the cathode $L^1_9$ to the cathode $L^1_0$ a pulse will be transmitted to the trigger electrode $T^1_2$ of the valve $T_2$. The valve $T_2$ is thereupon rendered conductive and the valve $T_1$ nonconductive. At this point the keys 1, 5, 8 of the first, second and third orders of keys are released either by the operator so as to permit them to return to their initial positions or by depressing an appropriate control key.

When the machine hereinbefore described is set to effect a calculation involving multiplication it is first necessary for the multiplicand to be inserted into the main keyboard and for the actuated keys of the multiplicand to be held in their actuated condition, after which a multiplier is inserted into the machine by the actuation of a multiplier key of a set of multiplier keys ranging from 0 to 9 provided in column 38 (FIGURE 3).

A key 39 in a control column 40 is marked to indicate multiplication. When the key 39 is actuated, a motor switch rod 41 associated with the keys of the multiplier column 38 is brought into action. In the case of a calculation involving addition the end of the motor switch rod 41 (when viewing FIGURE 4) is held clear of the path of the free end of the flap 33 by a link 42 (FIGURE 3) connecting the switch rod 41 with a stirrup member 43 which is pivotal about the axes 44 and 45.

The end 46 of the pivotal stirrup member 43 which is disposed towards the front of the machine is arranged to project under the stem of the multiplication key 39 so that upon the actuation of the multiplication key 39 the stirrup 43 is rocked about the pivotal axes 44 and 45 thereof and in consequence draws the switch rod 41 into the path of the flap 33. As hereinbefore described the actuation of the keys of the main keyboard, for a calculation involving addition, will withdraw the rod 31 from engagement with the free end of the flap 33 but, in a calculation involving multiplication, the provision of the switch rod 41 will prevent the movement of the flap 33 and in consequence the contact 34 will be prevented from engaging with the contact 35. However, after the insertion of a multiplicand into the main keyboard, the actuation of a multiplier key in column 38 will rock an individual motor switch bar 48 to withdraw the rod 41 from engagement with the flap 33 and thereby permit the contact 34 to engage with the contact 35.

If the motor 24 were rotating whilst the above operation was being carried into effect the shaft 50 which is driven through a pulley 51 by the belt 52 from the pulley 26 mounted upon the vertical output spindle 25 of the motor 24 would be rotating. It will be readily appreciated, however, from the description of a key delay release mechanism hereinbefore set forth that upon the mere depression of a multiplier key in the column 38 all the keys of the multiplicand would be restored to normal and any further introduction, of the multiplicand into the accumulators would be prevented. It is therefore necessary to provide means whereby upon the depression of a single multiplication key 39, the pulley 51 is unclutched from the shaft 50 and the shaft 50 is locked against rotation until either the multiplication key 39 is released or until a cancel or display key is actuated. If it is desired to effect a series of multiplications by actuating a succession of multiplier keys it is possible to latch the multiplication key 39 in a depressed condition in a manner hereinafter described.

To connect the pulley 51 to the dog clutch 53 fixed to the shaft 50 for the purpose of restoring the keys after multiplication, and yet to retain the key 39 in its latched condition, it is necessary for the actuation of either the cancel keys 89 and 90 or the display keys 91 and 92 (FIGURE 3) to override the connection between the key 39 and pulley 51. In order to achieve this result the pulley 51 is positioned either free or in engagement with the dog clutch 53 by a forked member 54. When force is applied to the forked member 54 to rock the same in a clockwise direction (when viewed in FIGURE 3) about a pivot 56 it slides the pulley out of engagement with the clutch 53 and by the same motion causes the spring tongue 55 fixed to the fork 54 to move into engagement with serrations 57 on the adjacent face of the dog 53 and thereby stop the rotation of the spindle 50.

The member 54 is moved (clockwise when viewing FIGURE 3) to cause the pulley 51 to disengage the dog 53 when a downwardly extending arm 58 mounted on the stirrup member 43 is actuated to pull a connecting link 59 to the right (when viewing FIGURE 3) upon the actuation of the multiplication key 39. Movement of the downwardly extending arm 58 is transmitted to the connecting link 59 through an adjustable compression spring 60. A collar 61 is provided on the connecting link 59 to ensure that upward movement of the key stem of the multiplication key 39 releases the link 59 to allow the fork member 54 under the influence of a light torsion spring 62 to move in a counterclockwise direction and cause the pulley 51 to re-engage the dog 53.

When the multiplication key 39 is latched down for a series of multiplications by the successive actuations of various multiplier keys, the actuation of the stems of the cancel keys or the stems 63 or 64 of the display keys rocks a stirrup 65 about the pivotal axes 66 and 67 thereof to cause a depending arm 68 mounted thereon to engage a collar 69 secured relatively to the connecting link 59. The pressure exerted by the depending arm 68 on the collar 69 will compress the spring 60 still further and move the connecting link 59 to the left (when viewing FIGURE 3), so causing the fork member 54 to move the pulley 51 into engagement with the dog 53.

Should the teeth 53a of the dog 53 and 51a of the pulley 51 not freely engage with one another immediately, the arm 71 of the forked member 54 will yield slightly under the influence of a spring 72.

In the event of a calculation involving "division" or "subtraction" it is necessary to control the drive to shaft 50 in a similar fashion to that described above in connection with multiplication. It will be observed that the subtraction key is constructed in a manner similar to the division key and is released in the same way as the division key.

Figure 12:
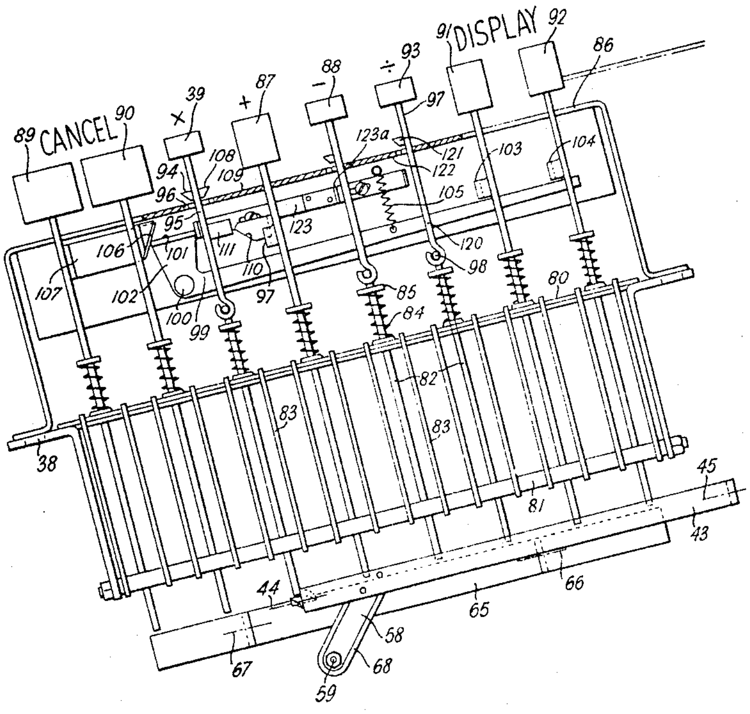

Referring to FIGURE 12 there is illustrated in side elevation the control key column 38 and stirruped parts 43 and 65 which control the disengagement and reengagement of the drive 50 to the delay device hereinbefore described. FIGURE 12 shows means of latching down the multiplication key 39 either in a manner sufficient to effect multiplication by a single digit (for example by any figure up to 9) or for a longer period where a succession of multiplications by a series of digits is to be effected (for example multiplication by a number in excess of 10).

The stems of the various control keys are arranged to extend through an upper guide plate 80 and a lower guide plate 81 of a switch unit. The key stems 82 carry contacts which correspond to the switch contacts of the circuit diagram illustrated in FIGURE 1 which are arranged to be moved into and out of engagement with contacts mounted on insulating panels 83 so as to make and break circuits required for the particular calculation to be undertaken. The key stems 82 are held in their inoperative or rest position by means of compression springs 84 arranged to extend between the upper guide plate 80 and a collar 85 secured relatively to the associated key stem 82. The upper portion of each key stem 82 is arranged to extend through a subsidiary guide frame 86 and the lower portion of each key stem 82 is arranged to extend to a position above, but just clear of parts of the stirrups 43 or 65 (FIGURE 3), as previously described.

The stems of the cancel keys 89 and 90, the plus key 87, and the display keys 91 and 92 slide freely in the guide frame 86, whereas the keystems of the multiplication key 39, the division key 93 and the minus key 88 are jointed at 94 and 98 respectively. Such a construction enables the upper part 95 of the stem 82 of the multiplication key 39 to be tilted forwardly or backwardly by the operator, whilst the joint 98 of the stem 82 of the division key 93 permits the upper part 97 of the keystem to be moved forwardly. Similarly the minus key 88 is permitted to be tilted forwardly. The depression and the tilting forwardly of the multiplication key 39 will cause a nib 94 on the upper part 95 of the keystem to engage the underside of the subsidiary guide frame 86 at 96. In this position multiplication can be effected by one digit or by a series of digits forming one multiplier in the case where automatic multiplication is involved and where after each multiplication by a digit of the multiplier the content of each accumulator is automatically moved into the next higher order. At the completion of multiplication, pressure on the plus key 87 will move a tongue 97 secured relatively to the keystem 82 of the plus key 87 downwardly against the influence of a spring 84, into contact with the horizontal arm 98 of a bell crank lever 99 mounted upon a pivot 100 and sprung upwardly by tension spring 105. The upper edge 101 of the upwardly extending arm 102 of the bell crank lever 98 will when the lever 98 is moved downwardly by the tongue 97, engage with the forwardly direct face of the upper part 95 of the keystem 82 of the multiplication key 39 and push the said upper part 95 rearwardly (that is to the right when viewing FIGURE 12) to release the nib 94 from engagement with the subsidiary frame 86 at 96. Similarly, the depression of the display keys 91 and 92 will cause the tongues 103 and 104 mounted on the respective keystems to effect the same result.

The depression of the cancel key 90 will move a ramped tongue 106 into contact with the upper edge 101 of the upwardly directed arm 102 of the bell crank lever 99 and rock the bell crank lever 99 about its pivot 100 to release the upper part 95 of the keystem 82 of the multiplication key 39. The provision of the ramped tongue 106 avoids the necessity of actuating the plus key after a single multiplication as either of the display keys 91 or 92 or the cancel keys 89 or 90 will restore the upper part 95 of the keystem 82 of the multiplication key 39.

The second cancel key 89, having a similar but larger ramped tongue 107, functions in the same manner.

When a considerable number of separate multiplication problems have to be performed it is a convenience if the operator is relieved from setting the multiplication key 39 for each problem. An alternative latched position for the multiplication key is provided.

In order to effect such more permanent latching of multiplication key 39 the operator must depress the key 39 and tilt the upper part 95 thereof rearwardly (that is to the right when viewing FIGURE 12) so that a nib 108 secured relatively to the stem 82 is trapped under the frame 86 at 109.

The depression of the display keys 91 and 92 or the cancel keys 89 and 90, whilst performing the appropriate electrical functions by means of contacts carried by the stems 82 and the associated panels 83, hereinbefore referred to, will also rock the bell crank lever 99 and the edge 101 of the upwardly extending arm 102 of the bell crank lever 98 as hereinbefore described, but this action will be ineffective with respect to the upper part 95 of the keystem 82 of the key 39 in the rearwardly directed position thereof in view of the fact that the said upper part 95 is latched away from and clear of the arc of movement of edge 101 of the upwardly extending arm 102 of the bell crank lever 98.

The multiplication key 39 is restored to normal at the conclusion of a succession of multiplications by a series of separate multipliers by the operator depressing the plus key 87, whereupon the ramped tongue 110 will push a stud 111, mounted on the rear face of the upper part 97 of the keystem 82 of the key 39 forwardly until nib 108 is free of engagement with the frame 86, at 109. In the case of division the division key 93 is provided with a joint at 98 so that the upper part 120 thereof can be tilted towards the front of the machine (that is to the left when viewing FIGURE 12). Thus, when an operator wants to effect a calculation in division he depresses key 93 and moves the same forwardly so as to cause a nib 121 secured relatively to the upper part 97 of the stem 82 to engage with the under side of the subframe 86 at 122. Mounted upon the subframe 86 is a slotted link 123 arranged to engage with screws or studs 124 permitting the link 123 to move in a longitudinal direction. The link 123 is designed so that the ends thereof engage with the forwardly directed face of the upper part 97 of the stem 82 of the division key 93. The length of the link 123 is such that the ends thereof are just clear of the upper edge 121 of the upwardly extending portion 102 of the bell crank lever 99 and just clear of the forwardly directed face of the upper part 97 of the keystem 82 of the key 93, when the key 93 is latched in a forward direction. It will thus be seen that rearward movement of the upper edge 101 of the bell crank lever 99 will push the upper part 97 of the key stem 82 of the division key 93 rearwardly and move the nib 121 out of engagement with the portion 122 of the subframe 86.

The minus key 88 is similarly provided with a hinged stem capable of being latched forwardly under subframe 86 and released by the rearward movement of an upturned tab 123a forming part of link 123.

Referring to FIGURE 11 there is illustrated in side elevation the multiplier key column provided with a key 400 designated DIVIDE.

The construction of the above line of keys is similar to that of an order of keys of the main keyboard with the exception that there is not any mechanism operable to delay the return of a key, after it has been actuated, until the machine has completed the operation intended by the actuation of the key.

In addition to the keys designated 1 to 9 inclusive a naught key 401 is provided for use when a naught occurs in the multiplier figures.

The 10 keys 401 to 410 are provided at the lower extremities thereof with bifurcated contacts 411, which in the nonactuated condition of a key do not bridge, so as to short-circuit, two fixed contacts 412 and 413.

At the rear end of the keybar 437 there is provided an extension 414 arranged, in the normal position thereof with none of the keys 0 to 9 depressed to engage with an insulated pad 415 mounted on a spring contact blade 416 holding a contact pip 418, mounted on the blade 416, out of contact with a contact pip 417 mounted on a blade 420, and in contact with 424 mounted on a blade 419.

Upon the depression of any one of the keys 0 to 9 inclusive, for example No. 4 key, the keybar 437 will move the extension 414 forwardly (that is to the left when viewing FIGURE 11) and thereby permit the contact blade 416 to move away from the blade 419 and cause the contact 418 to make contact with the contact 417 carried by the blade 420. Further, the depression of the No. 4 key will cause bifurcated contact 411 to move downwardly and bridge so as to short-circuit the contacts 412 and 413.

The operator maintains pressure on the No. 4 key until a signal from the accumulator indicates the completion of that stage of the multiplication.

The keybar 437 is extended forwardly to provide an inclined slot 421 in which is arranged to slide a nib 422 secured relatively to the stem 423 of the divide key 400. The divide key 400 is employed during stages of division and its action only effects the changeover switch contacts 417, 418, 424 and 425.

The DIVIDE key 400 does not constitute the key the operation of which sets the switch contacts of the machine in their respective positions in order to effect division, electronically. The key which controls the switch contacts that ensure that division is effected is mounted in the control column 40 and is designated 93.

The invention may also be embodied in a machine which dispenses with the studs and movable scanning brushes F, $F^1$ and $F^2$ of FIGS. 1 and 13, substituting therefor an electronic pulse generator. This pulse generator goes through a cycle for each order of the main keyboard keys and during each such cycle develops at separate outputs groups of pulses in the numbers one to nine. Each order of keys is arranged to select, by operation of an appropriate key therein, any one of these outputs. A timing device, representing in some sense an electronic analogue to the structure in FIGS. 1 and 13 whereby the studs $O_0$ to $Z_8$, $O_{22}$ to $L_{30}$ and $O_{12}$ to $L_{21}$ are scanned successively, then defines a machine cycle including a separate phase or period for each order. The pulse generator goes through a complete cycle during each of these periods, and during successive such periods the output of the pulse generator, as selected by the keys of the various orders, is gated into the accumulators of those orders successively. Actuation of any of the main keyboard keys initiates a cycle of operation of the timing device, and the machine of FIGS. 14 to 26 performs addition in essentially this way. For subtraction, a switching device is disposed between the output of the pulse generator and the pulse output selection switches operated by the main keyboard keys. This switching device in effect transposes the pulse generator outputs so that the pulses are selected by the main keyboard keys in numbers equal to the nines complements of the value of the operated ones of those keys.

Additional electron tube circuits provide for performance, on multiplication, of the shift operation already described herein with reference to FIG. 1 and of iterative addition of a multiplicand a number of times selected by operation of a multiplier key in a series of multiplier keys. Likewise, additional electron tube circuits provide for performance, on division, of the complemental addition operation and of the shift and complement operation.

Figure 14:
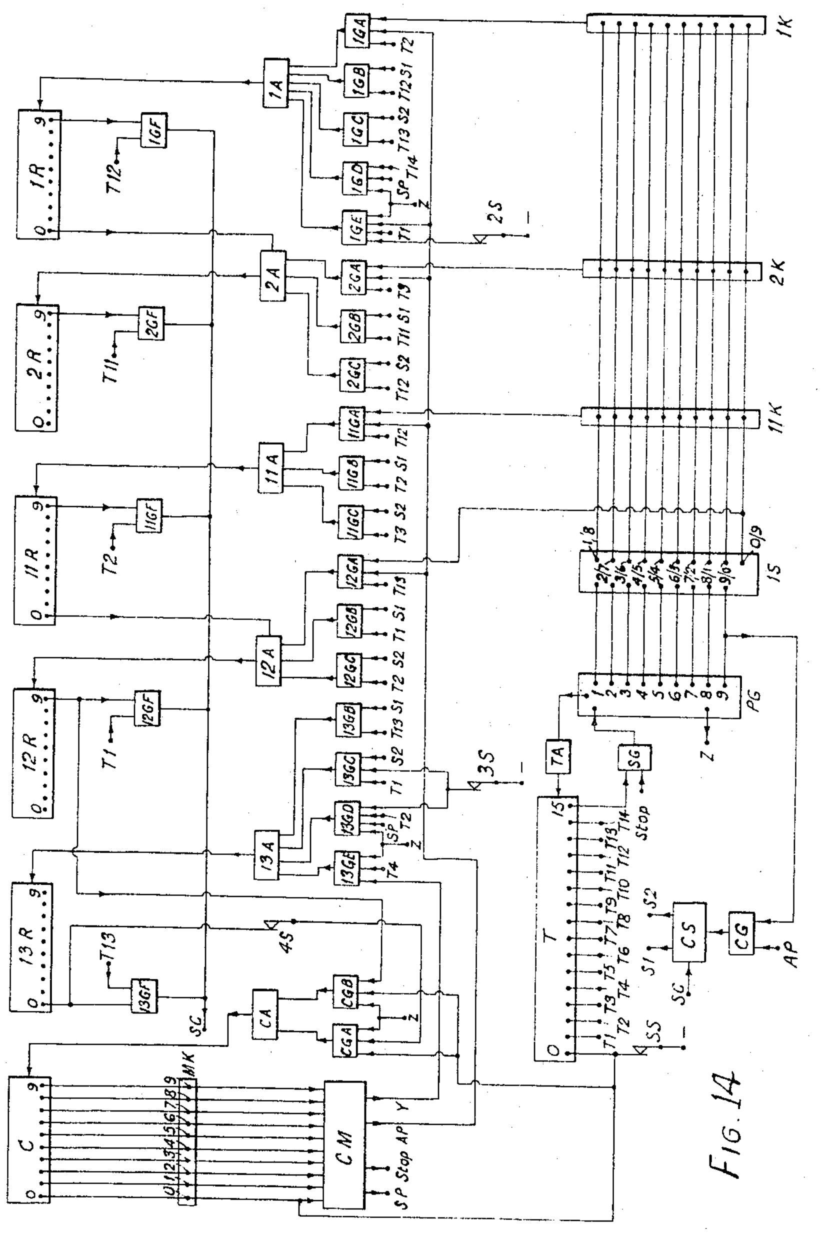
FIGURE 14 is a block diagram of the electrical circuit of a calculating machine of electronic type according to the present invention.

The calculating machine illustrated in FIGURE 14 includes eleven orders of keys, of which only the first two orders (1K and 2K) and the last order (11K) are shown in the drawing. The register of the machine comprises eleven counting devices associated with the eleven orders of keys and of these only the first two counting devices (1R and 2R) and the eleventh counting device (11R) are shown in the drawing. The register also includes a twelfth counting device 12R which is provided to receive carry pulses from the counting device 11R, but there is no order of keys associated with this counting device. It will be appreciated that there is no limit to the number of orders of keys and counting devices which can be employed in order to obtain any desired capacity for the machine, but it will normally be desirable to make the number of counting devices one greater than the number of orders of keys in order to accommodate carry-over from the counting device associated with the highest order of keys.

Each counting device has associated therewith an input amplifier and in the drawing there are illustrated amplifiers 1A and 2A for the first two counting devices 1R and 2R, and amplifiers 11A and 12A for the eleventh and twelfth counting devices 11R and 12R. The counting devices 3R to 10R (not illustrated) are respectively provided with input amplifiers 3A to 10A (also not illustrated). The counting devices will normally be in the form of multicathode electronic stepping tubes and in this case each amplifier includes the necessary drive circuit for such a stepping tube. Thus, if the stepping tubes have two drive electrodes each, the amplifiers will have two outputs each, and if the stepping tubes have three drive electrodes each, the amplifiers will be provided with three outputs each. The phase relationship between the outputs of each amplifier will be such as to step the glow in the associated tube from the 0 cathode step-by-step to the 9 cathode and thence on again to the 0 cathode.

Each amplifier has a number of inputs connected to the outputs of a number of gate circuits or AND logical elements. Each amplifier includes means for decoupling its various inputs so that the output of any one gate does not interfere with the operation of the remaining gates associated with the same input amplifier. In the drawing gates 1GA, 1GB, 1GC, 1GD and 1GE are shown supplying the amplifier 1A; gates 2GA, 2GB and 2GC are shown supplying the amplifier 2A; gates 11GA, 11GB and 11GC are shown supplying the amplifier 11A; and gates 12GA, 12GB and 12GC are shown supplying the amplifier 12A. Each of the counting devices 3R to 10R (not shown) is provided with three gate circuits —GA, —GB and —GC (also not shown). In addition to the inputs from the various gate circuits each amplifier, except amplifier 1A, is provided with a further input from the 0 output of the preceding counting device so that the number registered in each counting device is increased by one each time the counting device of the next lower order registers zero.

In addition to the twelve counting devices which constitute the register of the machine two further counting devices are provided. The first of these further counting devices, designated as 13R in the drawing, is a buffer counting device. This counting device is used, during shift or multiplication by ten, to store the digit registered in the counting device 12R until space is made for it in the counting device 1R. It is also used in division to count the number of subtraction cycles performed by the machine. The counting device 13R is provided with an input amplifier 13A and four gate circuits 13GB, 13GC, 13GD and 13GE. The second of the two further counting devices is designated in the drawing as C and functions as a control device. The primary function of this control device is to count the number of addition cycles performed during multiplication and to control the changes between subtraction and complementary shift cycles during division. This control device is associated with a set of keys MK which are used to set the multiplier when the machine is being used for multiplication. The control device C is also provided with an input amplifier CA which is controlled by two gate circuits CGA and CGB. The inputs to the gate CGA are constituted by the Z line, the output T0 of a timing device and, when the switch 4S is closed, the output 13R0 of the counting device 13R. The switch 4S is open during addition and multiplication and closed during subtraction and division. Thus, the third input to the gate CGA is ineffective during addition and multiplication so that one pulse is applied to the amplifier CA during multiplication whenever the output T0 is energised. This causes the control device to move one step forward for each complete cycle of the timing device. During division, however, the control device is only stepped forward by a pulse through the gate CGA when the counting device 13R registers 0. The inputs to the gate CGB are constituted by the Z line, the ouput T0 of the timing device and the output 12R9 of the counting device 12R.

As in the case of the counting devices 1R to 12R the counting devices 13R and C may be multicathode electronic stepping tubes and the input amplifiers must then include suitable phase-displaced drive circuits.

The pulses required for operating the counting devices referred to above are produced by a pulse generator PG which is illustrated as having separate outputs numbered 1 to 9. During one cycle of the generator the output 1 produces one pulse, the output 2 produces two pulses and so on up to the output 9 which produces nine pulses. The pulses produced by the output 4 are shown by way of example in line 1 of FIGURE 15 of the drawings. It will be seen that in this case one pulse is produced during the first pulse period of each cycle of the generator and that three pulses are produced during the fourth, fifth and sixth pulse periods of each cycle. However, the actual position of the pulses within a cycle is irrelevant to the operation of the machine and they could equally well all occupy consecutive pulse periods, for example. The outputs from the pulse generator are applied to the various orders of keys through a changeover switch 1S. This switch is in a first position when the machine is being used for addition and multiplication and in a second position when the machine is being used for subtraction and division. In the first position of the switch 1S, output 1 is connected to the number one key in each order; output 2 is connected to the number two key in each order; and so on up to the output number 9 which is connected to the number nine key in each order. When the switch 1S is in the second position, output 1 of the pulse generator is connected to the number eight key in each order of keys; output 2 is connected to the number seven key in each order; and so on up to output 8 which is connected to the number one key in each order. Further, with the switch 1S in the second position, output 9 is connected to the GA gate circuit of each counting device associated with an order of keys in which no key is operated, and also to the GA gate of 12R.

The output designated by the letter Z produces one pulse during each cycle of the generator.

To control the operation of the machine a timing device T is provided. This device has sixteen outputs which are designated T0 to T15. The wave forms of the outputs T1, T2, T3 and T4 are illustrated in lines 5, 6, 7 and 8 of FIGURE 15. A switch SS is connected to the T0 output to ensure that at the start of a calculation the first pulse appears at T1 output. The timing device is provided with an input amplifier TA which is fed by one pulse from the pulse generator during each cycle of the pulse generator. Thus, during a calculation the timing device is moved forward one step for each cycle of the pulse generator and the output voltage moves forward sequentially from output T1 to T15 and thence back to T0. The timing device makes an additional step during which none of its output terminals is energised as it moves from T15 to T0. Thus, the timing device completes one cycle while the pulse generator performs seventeen cycles.

The various outputs of the timing device are connected to the gate circuits as indicated by the references T1 to T15 shown at the inputs of the gates. Thus, for example, the output T2 is connected to one input of the gate 1GA, to one input of the gate 11GB, to one input of the gate 11GF, to one input of the gate 12GC, and to one input of the gate 13GD. The output T15 is connected to one input of a gate SG the other input to which is constituted by a stop signal. The output of this gate is applied to the pulse generator and serves to stop the generator during the fifteen cycle of the timing device if the stop line is energised.

The components so far described would enable the machine to perform addition and subtraction, but when the machine is required to perform multiplication or division it is necessary for the timing device to carry out more than one cycle and, to control the number of cycles of operation of the timing device, the control device C is provided. The control device has ten outputs which are illustrated as C0 to C9. Each of these outputs is associated with a corresponding key in a bank of multiplier keys MK. Each multiplier key, when operated, selects the corresponding output of the control device and when no multiplier key is operated the output C0 is selected. The various outputs are supplied to a switching arrangement CM which enables the outputs to be correctly routed when the machine is being used for any of its four arithmetical operations. Thus, during multiplication the selected output is connected to the stop line so that the operation of the pulse generator is stopped when the timing device has performed the number of cycles corresponding to the operated key in the bank of multiplier keys. Other outputs of the switching arrangement include an AP line, an SP line and a Y line. When the AP line is energised the machine operates to perform addition or subtraction and when the SP line is energised the machine operates to shift or multiply by ten.

In order to control the shift operation of the machine, a gate CG and an electronic changeover switch CS are provided. Nine pulses per cycle of the pulse generator are supplied to one input of the gate CG, the other input of which is constituted by the AP line. Provided the AP line is not energised, nine pulses per cycle of the pulse generator are passed to the changeover switch CS. Normally these pulses are passed through to the output S1 of the changeover switch, but when the line SC is energised during multiplication the nine pulses are passed to the output S2 instead of to the output S1. During division the pulses are normally passed through to both the outputs S1 and S2, but when the line SC is during division the pulses are prevented from reaching either of these outputs.

Additional inputs to certain of the gate circuits are provided by the switches 2S, 3S and 4S. The switch 2S is open during subtraction and division, but is closed during addition and multiplication. The switches 3S and 4S are closed during subtraction and division, but are open during addition and multipilcation.

*Operation*

When the machine is set to perform addition, the output C0 of the control device C is connected through the switching arrangement CM to the stop line and also to the AP line. Before any keys are depressed, the switch SS is in the closed position so that the output of the timing device T is held at the output T0 and the output of the control device C is held at the output C0.

It will be assumed that the number 34 is to be added to the number 57. Before the start of the calculation all the counting devices will register zero. To insert 34 into the machine, the number three key is depressed in the order 2K and the number 4 key is depressed in the order 1K. It is assumed in the following description that the two keys have been depressed together so that the 3 and the 4 are both added into the register during the same cycle of operation of the timing device T. However, this is not the normal method of operating the machine, since the operator will normally depress one key and then the other. In this case the insertion of each digit into the register will occupy a separate cycle of operation of the timing device T. It is irrelevant whether the higher order or the lower order key is depressed first.

When either of the keys is depressed, the switch SS is opened and accordingly the next pulse from the pulse generator is enabled to step the timing device from T0 to T1. This has no effect since, at this stage, there is no other input to any gate circuit to which the output T1 is connected. When the timing device steps from T1 to T2, two of the inputs of the gate 1GA are energised, since the AP line is energised by the output C0 from the control device. Since the number 4 key is depressed in the order of keys 1K, four pulses will be applied during each cycle of the pulse generator to the gate 1GA. During the period T2 these pulses pass through the gate 1GA to the input of the amplifier 1A and thence to the input of the counting device 1R. These four pulses serve to step the counting device 1R from 0 to 4. Similarly during the period T3 three pulses will be applied through the gate 2GA to the amplifier 2A and thence to the counting device 2R. During the periods T4 to T14 nothing further will happen, since none of the gates will have all its inputs energised. During the period T15 both the inputs of the gate SG will be energised, since the stop line is connected to the output C0 of the control device through the switching arrangement CM. Accordingly the pulse generator will be stopped and this stage of the calculation is completed. As soon as the keys 3 and 4 in the orders 2K and 1K are released by the operator, the contacts SS will close again and the control device T will be returned from T15 direct to T0. As a result one of the inputs to the gate SG will be removed and the pulse generator will restart.

To perform the second stage of the calculation, the number 5 key in the order 2K is depressed and the number 7 key in the order 1K is depressed. Again the switch SS is opened by the operation of either of these keys and the timing device T is allowed to step forward to T1 when it receives a pulse through the amplifier TA from the pulse generator PG. Again nothing happens during period T1, but during period T2 seven pulses are passed through the gate 1GA to the amplifier 1A and thence to the input of the counting device 1R. Accordingly the counting device steps from 4 to 9 and thence to 0 and 1. When the counting device 1R registers 0, a pulse is applied to the input of the amplifier 2A and thence to the input of the counting device 2R so that this counting device steps from 3 to 4. During the period T3 five pulses are passed through the gate 2GA to the amplifier 2A and thence to the input of the counting device 2R so that this counting device steps from 4 to 9.

During the periods T4 to T14 none of the gate circuits is opened, but during the period T15 both the inputs of the gate SG are energised and the pulse generator PG is stopped. When the keys 5 and 7 in the orders 2K and 1K are released, the switch SS is closed and the counting device T returns to T0. The register of the machine now reads 000000000091 which is the result of the addition of 34 to 57.

When the machine is to be used for subtraction, the switch 1S is changed over so that, when a key in any order of keys is depressed, the corresponding GA gate input is supplied with a number of pulses equal to the nines complement of the value of the depressed key.

As an example the subtraction of 17 from 34 will be described.

Initially the number 34 is entered into the machine with the switch 1S set for addition in the same manner as in the example described above. The switch 1S is then changed over to subtraction and the number 17 is inserted in the orders 2K and 1K. Once again it will be assumed that the two keys are depressed together, but it is to be understood that normally the operator will first depress the number one key in the order 2K and then the number seven key in the order 1K, or vice versa.

Changing the switch 1S over to subtraction has the effect of opening the switch 2S and thus removing the negative potential from the fourth input to the gate 1GE. Consequently during the period T1 the gate 1GE is opened when the pulse appears on the Z line. As a result one pulse is fed into the counting device 1R during this period so that it steps from 4 to 5.

During the period T2 two (9—7) pulses are added into the counting device 1R so that it steps from 5 to 7. During the period T3 eight (9—1) pulses are added into the counting device 2R so that it steps from 3 to 1. As it steps to zero a pulse is applied to the amplifier 3A which causes one carry pulse to be entered into the register 3R (not shown) so that this counting device steps from 0 to 1. During the period T4 nine pulses are applied to the counting device 3R so that this counting device is stepped from 1 to 0. As this counting device reaches 0, a carry pulse is applied to the counting device of the next higher order which is subsequently stepped to 0 by nine pulses from the pulse generator. This process continues until the counting device 11R has been stepped from 0 to 1 by the carry pulse and thence back to 0 by the nine pulses from the generator PG through the unoperated keys of the order 11K. As a result of the return of the counting device 11R to 0 a carry pulse is fed into the counting device 12R which is subsequently stepped during the period T13 by nine pulses applied directly to one input of the gate 12GA from the switch 1S. Thus, the register of the machine now reads 000000000017, which is the result of subtracting 17 from 34.

When the machine is to be used for multiplication, the switch 1S is in the same position as for addition, but contacts in the switching arrangement CM are changed over so that the stop line, instead of being connected directly to the output C0 of the control device C, is connected to whichever of the outputs of the control device is selected by the depression of a key in the bank of multiplier keys MK. In addition the line SP is connected to the output C0 and the line AP is connected to all of the outputs C1 to C9. During multiplication the switches 3S and 4S open, but the switch 2S is closed, with the result that the gate circuit 1GE is prevented from opening, but the gate circuits 13GC, 13GD and CGA are allowed to open when their other inputs are energised. In addition to performing the various switching operations described above, setting the machine for multiplication converts it from a key-responsive machine to a keyset machine. In other words, when a key in any of the orders of keys 1K to 11K is depressed, it will remain down until the calculation is completed. Finally, setting the machine to multiplication places the contact SS under the control of the multiplier keys in the bank MK instead of the keys in the orders 1K to 11K. Thus, when the machine is set for multiplication, the contact SS is opened when any one of the multiplier keys is depressed.

As an example the multiplication of 34 by 17 will be described.

Initially the multiplicand 34 is set on the keys of the machine by the depression of the number three key in the order 2K and the number four key in the order 1K. The orders 2K and 1K are only given by way of example, since the multiplicand could be set on any two consecutive orders of keys. However, it will normally be set in the lowest possible orders since, if it is set in too far up the machine, the first one or more digits of the answer may be lost. The two keys will lock down as the machine is set for multiplication, but the machine will not start to operate since these keys no longer control the contact SS. The first digit of the multiplier 17 is now entered into the multiplier keys by the depression of key 1 in the bank MK. This key locks down and opens the contact SS. The next pulse from the pulse generator that is applied to the amplifier TA causes the timing device to step from T0 to T1. As the output C0 of the control device is still energised, the line AP is deenergised and the line SP is energised. Accordingly, during the period T1 nine pulses are applied from the pulse generator through the gate circuit CG and the switch CS over the line S1 to one input of the gate 12GB, to the other input of which the output T1 is applied As a result nine pulses are applied through the amplifier 12A to the input of the counting device 12R which accordingly steps from 0 to 9. When nine is registered in the counting device 12R, both inputs of the gate circuit 12GF are energised and a voltage is applied through the SC line to change over switch CS. As a result the input from the date circuit CG is switched from the output S1 to the output S2. However, no further pulses are received by the gate circuit CG from the pulse generator during the period T1 and accordingly no pulses are passed through the output S2. It is to be noted that, if the number registered in the counting device 12R had been other than 0, a corresponding number of pulses would have been applied during the period T1 from the output S2 through the gate circuit 13GC to the counting device 13R. At the end of the period T1 the line SC is deenergised and the changeover switch CS reverts to its normal state in which its input is coupled to its output S1.

During the period T2 nine pulses are applied from the line S1 through the gate 11GB and the amplifier 11A to the counting device 11R which is stepped from 0 to 9. Again the changeover switch CS is changed over on the ninth pulse and reverts to its normal state at the end of the period T2 without passing any pulses to its output S2.

Also during the period T2 the gate circuit 13GD is opened to allow one pulse to be applied from the Z terminal of the pulse generator through the amplifier 13A to the input of the counting device 13R. As a result the counting device 13R is stepped from 0 to 1. It is to be noted that no pulses are passed through the gate 1GA during the period T2 since the AP line is deenergized.

During the period T3 nine pulses are applied from S1 to the counting device 10R (not illustrated) and the operation of the machine continues in the same manner until at the end of the period T12 each of the counting devices 12R to 1R register 9. During the period T13 nine pulses are applied to the counting device 13R through the gate circuit 13GB. As a result the counting device 13R is stepped from 1 to 0. When the counting device 13R reaches 0, both inputs of the gate circuit 13GF are energised so that the SC line is energized. However, once again, no further pulses are received by the gate circuit CG from the pulse generator during the period T13 and accordingly no pulses are passed through the output S2.

During the period T14 one pulse is applied from the output Z of the pulse generator through the gate circuit 1GD to the counting device 1R. As a result the counting device 1R is stepped from 9 to 0 and a carry is passed through the amplifier 2A to the counting device 2R. The counting device 2R is thus also stepped from 9 to 0 and the carry passes up through all the orders of the machine until all the counting devices up to 12R are registering 0. There is no carry from the counting device 12R to the counting device 13R and therefore the latter counting device remains at 0.

During the period T15 one input of the gate circuit SG is energized, but the stop circuit is not energized and accordingly the pulse generator PG continues to run. As a result the timing device is stepped on to the ouput T0. During the period T0 a pulse is applied from the output Z of the pulse generator through the gate circuit CGA to the amplifier CA and thence to the input of the control device C. The gate CGA is allowed to open since the switch 4S is open during multiplication. Accordingly the cotrol device is stepped from C0 to C1. This causes the SP line to be deenergized and the AP line to be energized.

During the period T1 nothing happens since the other inputs of the gate circuits 12GB, 12GF, and 13GC are not energized at this time.

During the period T2 four pulses are supplied from the generator PG through the depressed number 4 key in the order 1K and thence through the gate circuit 1GA and the amplifier 1A to the input of the counting device 1R. As a result the counting device 1R is stepped from 0 to 4. Similarly, during the period T3 three pulses are fed into the counting device 2R which is stepped from 0 to 3. Nothing further happens during the periods T4 to T14, but during the period T15 both inputs to the gate circuit SG are energized since the stop circuit is connected through the depressed number 1 key in the bank MK to the energised output C1 of the control device. Accordingly the pulse generator is stopped and the first part of the calculation is completed. When the pulse generator stops, the depressed number 1 key in the bank MK is released by means to be described hereinafter, and the switch SS is reclosed so that the timing device returns to T0 and the control device returns to C0.

Key number 7 in the bank of multiplier keys is now depressed and a shift operation similar to that described above commences while the control device is at C0. The operations performed by the machine during the periods T1 to T10 are precisely the same as those which occurred at the commencement of the calculation. However, during the period T11 the sixth pulse from the pulse generator causes the counting device 2R to register 9. Accordingly both inputs of the gate circuit 2GF are energized and a voltage is applied from the SC line to the changeover switch CS. As a result the input from the gate circuit CG is switched from the output S1 to the output S2 and the remaining three pulses from the pulse generator occurring during the period T11 are passed to the output S2 instead of to the output S1. The inputs to a gate circuit 3GC (not shown) associated with the counting device 3R (not shown) are constituted by the S2 line and the output T11 from the timing device. Accordingly this gate is opened during the period T11 and the three pulses from the S2 line are applied to the counting device 3R. This counting device was previously registering 9 and accordingly it is now stepped to 2. As it passes through 0, it causes a carry to be passed to the counting device 4R, which is accordingly stepped from 9 to 0. This carry is then passed up through all the orders until all the counting devices 4R to 12R are registering 0.

During the period T12 the counting device 1R is stepped to 9 by the first five pulses from the pulse generator over the S1 line. When the counting device 1R reaches 9, both inputs of the gate circuit 1GF are energised and a voltage is applied through the SC line to change over the changeover switch CS from S1 to S2. Accordingly the remaining four puses which occur during the period T12 are passed through the S2 line, the gate 2GC and the amplifier 2A to the input of the counting device 2R. Accordingly the counting device 2R is stepped from 9 to 3, the resulting carry causing counting device 3R to step from 2 to 3.

During the period T13 nine pulses are applied over the S1 line through the gate 13GB to the counting device 13R. As a result the counting device 13R is stepped from 1 to 0. When the counting device 13R reaches 0, both inputs of the gate circuit 13GF are energised so that the SC line is energised. However, no further pulses are received by the gate circuit CG from the pulse generator during the period T13 and accordingly no pulses are passed through to the output S2.

During the period T14 one pulse is applied from the output Z of the pulse generator through the gate circuit 1GD to the counting device 1R. As a result the counting device 1R is stepped from 9 to 0 and a carry is passed through the amplifier 2A to the counting device 2R. The counting device 2R is thus stepped from 3 to 4. The machine therefore now registers 000000000340.

During the period T15 one input of the gate circuit SG is energised, but the stop circuit is not energized and accordingly the pulse generator PG continues to run. As a result the timing device T is stepped on to the output T0. During the period T0 a pulse is applied from the output Z of the pulse generator through the gate circuit CGA to the input of the control device C. Accordingy the control device is stepped from C0 to C1. This causes the SP line to be denergised and the AP line to be energised.

During the period T1 nothing happens, but during the period T2 four pulses are supplied from the generator PG through the depressed number 4 key in the order 1K to the input of the counting device 1R. As a result the counting device 1R is stepped from 0 to 4. Similarly during the period T3 three pulses are fed into the counting device 2R which is stepped from 4 to 7. Nothing further happens during the periods T4 to T15 but during the next period T0 the control device C is stepped from C1 to C2. The SP line is still deenergised and the AP line is still energised so that the machine performs another addition and the counting device 1R is stepped from 4 to 8 and the counting device 2R from 7 to 0. When the counting device 2R reaches 0, it sends a carry pulse to the counting device 3R which is accordingly stepped from 3 to 4.

The machine continues to perform repeated addition while the control device is stepped up to C7. When the control device reaches C7, the stop line is energised and the pulse generator is stopped during the period T15. The machine now registers 000000000578. The various steps in the calculation are shown in the following Table 1.

TABLE 1

| C | 13R | 12R | 11R | 4R | 3R | 2R | 1R | |
|---|---|---|---|---|---|---|---|---|
| 0 | 0 | 0 | 0 | 0 | 0 | 0 | 0 | 34 entered on keyboard, but not in register. |
| 0 | 0 | 0 | 0 | 0 | 0 | 0 | 0 | Multiplier key 1 depressed and machine starts. Shift, as C is at 0. |
| 1/0 | 0 | 0 | 0 | 0 | 0 | 3 | 4 | As C is not at 0, add 34. At T15 machine stops and C returns to 0. |
| 0 | 0 | 0 | 0 | 0 | 3 | 4 | 0 | Multiplier key 7 depressed and machine starts. Shift as C is at 0. |
| 1 | 0 | 0 | 0 | 0 | 3 | 7 | 4 | As C is not at 0, add 34. |
| 2 | 0 | 0 | 0 | 0 | 4 | 0 | 8 | As C is not at 0, add 34. |
| 3 | 0 | 0 | 0 | 0 | 4 | 4 | 2 | Add 34. |
| 4 | 0 | 0 | 0 | 0 | 4 | 7 | 6 | Add 34. |
| 5 | 0 | 0 | 0 | 0 | 5 | 1 | 0 | Add 34. |
| 6 | 0 | 0 | 0 | 0 | 5 | 4 | 4 | Add 34. |
| 7/0 | 0 | 0 | 0 | 0 | 5 | 7 | 8 | Add 34. Add T15 machine stops and C returns to 0. |

When the machine is to be used for division the switch 1S is in the same position as for subtraction, but contacts in the switching arrangement CM are changed over so that the stop line is connected to the output C7 of the control device C, so that the line SP is connected to the outputs C1, C3, C5, C7 and C9 of the control device and so that the line AP and the line Y are connected to the outputs C0, C2, C4, C6 and C8 of the control device. During division the switch 3S is closed with the result that the gates 13GC and 13GD are prevented from opening but the switch 2S is opened with the result that the gate circuit 1GE is allowed to open when its other inputs are energised. Further the switch 4S is closed so that the gate CGA is prevented from opening except when the counting device 13R is at 0. As in the case of multiplication, setting the machine to division converts it from a key-responsive machine to a key-set machine, and places the contact SS under the control of the multiplier keys in the bank MK. Further, setting the machine for division affects the operation of the change-over switch CS, so that the outputs S1 and S2 are in parallel and are connected to the input so long as the SC line is not energised, but are disconnected from the input when the SC line is energised.

As an example, the division of 146 by 12 will be described.

Initially the machine is set for addition and the number 146 is entered into the highest orders of the machine by the depression of the key 1 in the order 11K, the key 4 in the order 10K and the key 6 in the order 9K. As a result the number 146 is registered in the counting devices 11R, 10R and 9R in the same manner as described above for addition. The machine is now set for division and the divisor 12 is entered into the keys of the orders 11K and 10K. It is not essential that the dividend be inserted in the highest orders of the machine. Further, it is preferred that the divisor be entered in the highest orders of the machine.

The 0 key in the bank MK is now depressed to open the contact SS. As a result the next impulse from the pulse generator to the timing device steps the timing device from T0 to T1. Since the control device C is at C0, the line AP is energised and during the period T1 one pulse is fed into the counting device 1R through the gate circuit 1GE so that this counting device steps from 0 to 1.

During the period T2 nine pulses are added into the counting device 1R through the gate 1GA so that this counting device steps from 1 to 0. When the counting device 1R registers 0, a carry pulse is fed to the input of the counting device 2R which accordingly steps from 0 to 1. During the period T3 nine pulses are added into the counting device 2R through the gate 2GA so that this counting device steps from 1 to 0. A carry is thus fed to the counting device 3R which is subsequently stepped to 0 and supplies a carry to the counting device 4R. The process continues until the counting device 8R has been stepped round and back to 0. Moreover, during the period T4 a pulse from the output Z of the pulse generator is applied through the gate 13GE to the counting device 13R which steps from 0 to 1. During the period T9 a carry pulse is applied to the counting device 9R to step it from 6 to 7, and during the period T10 nine further pulses are added into the counting device 9R to step it from 7 to 6. As the counting device 9R passes through zero, it sends a carry pulse to the counting device 10R which is stepped from 4 to 5. During the period T11 seven (9—2) more pulses are applied to the counting device 10R which accordingly steps from 5 to 2. As the counting device 10R passes through 0, it applies a carry pulse to the counting device 11R which accordingly steps from 1 to 2. During the period T12 eight (9—1) further pulses are applied to the counting device 11R which accordingly steps from 2 to 0. As the counting device 11R passes through zero, it applies a carry pulse to the counting device 12R which is accordingly stepped from 0 to 1. During the period T13 nine pulses are applied through the gate 12GA to the counting device 12R which is accordingly stepped from 1 to 0. No operation takes place during the periods T14 and T15. Moreover, when the timing device T reaches T0, the pulse from the output Z of the pulse generator has no effect on the control device since the gate CGA is disabled as a result of the fact that the control device 13R has been stepped from 0 to 1, and the gate CGB is disabled since the counting device 12R is not registering 9. Accordingly the machine performs a further subtraction operation similar to that just described. At the end of this operation the machine reads 990600000000. Further the counting device 13R registers 2.

When the counting device 12R reaches 9, all the inputs of the gate circuit CGB are energised on the occurrence of the pulse at the output Z of the pulse generator during the period T0, and a pulse is applied to the input of the counting device C, stepping it from C0 to C1. As has been pointed out above, the output C1 is connected to the SP line and not to the AP line and accordingly the next operation is similar to the shift or multiplication by ten performed during multiplication. However, since the outputs S1 and S2 are now in parallel the machine operates to complement all the numbers registered in the machine at the same time as it shifts them. Throughout the period T1 both inputs of the gate 12GF are energised since the counting device 12R is registering 9. Accordingly the line SC is energised and the switch CS is disabled, so that no pulses are applied to the gate 12GB or to the gate 13GC. Similarly during the whole of the period T2 both inputs of the gate 11GF are energised and no pulses are applied to the gate 11GB or to the gate 12GC. During the period T3 nine pulses are applied through the gate 10GB (not shown) to step the counting device 10R from 0 to 9. These nine pulses are also applied through the gate 11GC to step the counting device 11R from 9 to 8. When the counting device 11R passes through 0, it applies a carry pulse to the counting device 12R which thus steps from 9 to 0. During the period T4 pulses are applied through the gate 9GB to step the counting device 9R on from 6. When the counting device 9R reaches 9, the two inputs to the gate circuit 9GF are energised and a voltage is applied to the SC line. As a result the switch CS is disabled and the outputs from S1 and S2 cease. Thus only three of the nine pulses occurring during the period T4 are effective at the outputs S1 and S2. Thus, three pulses are applied through the gate 10GC to the input of the counting device 10R which is stepped from 9 to 2. As the counting device 10R passes through 0, it applies a carry pulse to the counting device 11R which thus steps from 8 to 9. No pulse is applied during the period T4 from the output Z of the pulse generator to the counting device 13R since the line Y is not energised as the control device C is at C1.

During the period T5 nine pulses are applied to the counting devices 8R and 9R stepping the former to 9 and the latter to 8. As the counting device 9R passes through zero, it applies a carry pulse to the counting device 10R stepping that counting device from 2 to 3. During the period T6 nine pulses are applied to the counting devices 7R and 8R stepping the former to 9 and the latter to 8. As the counting device 8R passes through zero, it applies a carry pulse to the counting device 9R which thus steps from 8 to 9. Similar conditions apply during the periods T7 to T12 during which the counting devices 8R to 3R are stepped to 9, the counting device 2R to 8 and the counting device 1R to 9. During the period T13 eight pulses are applied to the counting devices 13R and 1R stepping the former to 0 and the latter to 7. As the counting device 1R passes through 0, it applies a carry pulse to the counting device 2R stepping that counting device to 9. The counting device 13R is stepped to 0 instead of to 9 as in the case of the other counting devices because the gate 13GF is connected to 13R0 and not 13R9.

During the period T14 one pulse is applied from the pulse generator output Z through the gate 1GD to the counting device 1R which accordingly steps from 7 to 8. During the period T15 nothing happens, but during the next period T0 the control device C is stepped from C1 to C2, by means of a pulse applied through the gate CGA which opens when the pulse from the Z output of the pulse generator arrives, since the counting device 13R is at 0. As a result the lines AP and Y are energised and the line SP is deenergised. Consequently the machine again commences to perform repeated complementary addition in the manner described above. The results of this operation are shown in Table 2. It will be seen that the machine performs eight complementary addition operations at the end of which the register reads 997999999998. The counting device 13R reads 8 and the control device C is stepped from 2 to 3 when the counting device 12R reaches 9. Thus the line SP is energised and the lines Y and AP are deenergised, with the result that the machine operates to shift and complement. As a result of this step the register reads 020000000012. The figures 1 and 2 in the counting devices 2R and 1R are the first two digits of the answer and the figure 2 in the counting device 11R is the remainder. The machine, however, repeats the process described above with the results shown in Table 2. The first four digits of the answer now appear in the counting devices 4R, 3R, 2R and 1R. If further digits are required, these counting devices can be cleared by means of a "CLEAR RIGHT" key and a further four digits may be produced in the same four counting devices by repressing the 0 key in the bank MK which will have been released when the control device was stepped to C7 at the end of the last shift and complement operation. Alternatively, since space is available in the counting devices 8R to 5R, the 0 key in the bank MK may be repressed without clearance of the counting devices 4R to 1R and in this case eight figures of the answer will appear in the counting devices 8R to 1R.

Thus on division, the machine of FIG. 13, once set into operation, automatically effects extraction of four quotient digits. Further quotient digits may be extracted, in groups of four each, one group for each operation of the 0 key in the column or bank of multiplier keys MK0 to MK9 in FIG. 25.

TABLE 2

| C | 13R | 12R | 11R | 10R | 9R | 4R | 3R | 2R | 1R | |
|---|---|---|---|---|---|---|---|---|---|---|
| 0 | 0 | 0 | 1 | 4 | 6 | 0 | 0 | 0 | 0 | 146 is added into the orders 11R, 10R and 9R. Press DIVIDE key, enter 12 in keys of 11K and 10K and press 0 multiplier key. |
| 0 | 1 | 0 | 0 | 2 | 6 | 0 | 0 | 0 | 0 | 12 is subtracted from 14 in 11R and 10R. 12R does not register 9, therefore C is not moved. Subtract again. |
| 1 | 2 | 9 | 9 | 0 | 6 | 0 | 0 | 0 | 0 | 12R registers 9. Therefore C is stepped to 1 and a shift and complement operation initiated. |
| 2 | 0 | 0 | 9 | 3 | 9 | 9 | 9 | 9 | 8 | Note that the "tens" complement of the number in 13R is shifted into 1R. C is stepped to 2 at the end of the shift and further subtractions commence. |
| 2 | 1 | 0 | 8 | 1 | 9 | 9 | 9 | 9 | 8 | 12R does not register 9. Therefore subtract again. |
| 2 | 2 | 0 | 6 | 9 | 9 | 9 | 9 | 9 | 8 | Do. |
| 2 | 3 | 0 | 5 | 7 | 9 | 9 | 9 | 9 | 8 | Do. |
| 2 | 4 | 0 | 4 | 5 | 9 | 9 | 9 | 9 | 8 | Do. |
| 2 | 5 | 0 | 3 | 3 | 9 | 9 | 9 | 9 | 8 | Do. |
| 2 | 6 | 0 | 2 | 1 | 9 | 9 | 9 | 9 | 8 | Do. |
| 2 | 7 | 0 | 0 | 9 | 9 | 9 | 9 | 9 | 8 | Do. |
| 3 | 8 | 9 | 9 | 7 | 9 | 9 | 9 | 9 | 8 | 12R registers 9. Therefore shift and complement. |
| 4 | 0 | 0 | 2 | 0 | 0 | 0 | 0 | 1 | 2 | C is stepped to 4. Therefore subtract. |
| 4 | 1 | 0 | 0 | 8 | 0 | 0 | 0 | 1 | 2 | 12R does not register 9. Therefore subtract again. |
| 5 | 2 | 9 | 9 | 6 | 0 | 0 | 0 | 1 | 2 | 12R registers 9. Therefore shift and complement. |
| 6 | 0 | 0 | 3 | 9 | 9 | 9 | 8 | 7 | 8 | C is stepped to 6. Therefore subtract. |
| 6 | 1 | 0 | 2 | 7 | 9 | 9 | 8 | 7 | 8 | 12R does not register 9. Therefore subtract again. |
| 6 | 2 | 0 | 1 | 5 | 9 | 9 | 8 | 7 | 8 | Do. |
| 6 | 3 | 0 | 0 | 3 | 9 | 9 | 8 | 7 | 8 | Do. |
| 7 | 4 | 9 | 9 | 1 | 9 | 9 | 8 | 7 | 8 | 12R registers 9. Therefore shift and complement. |
| 0 | 0 | 0 | 8 | 0 | 0 | 1 | 2 | 1 | 6 | Answer is in 4R, 3R, 2R and 1R. Remainder in 11R. |

Figure 16:
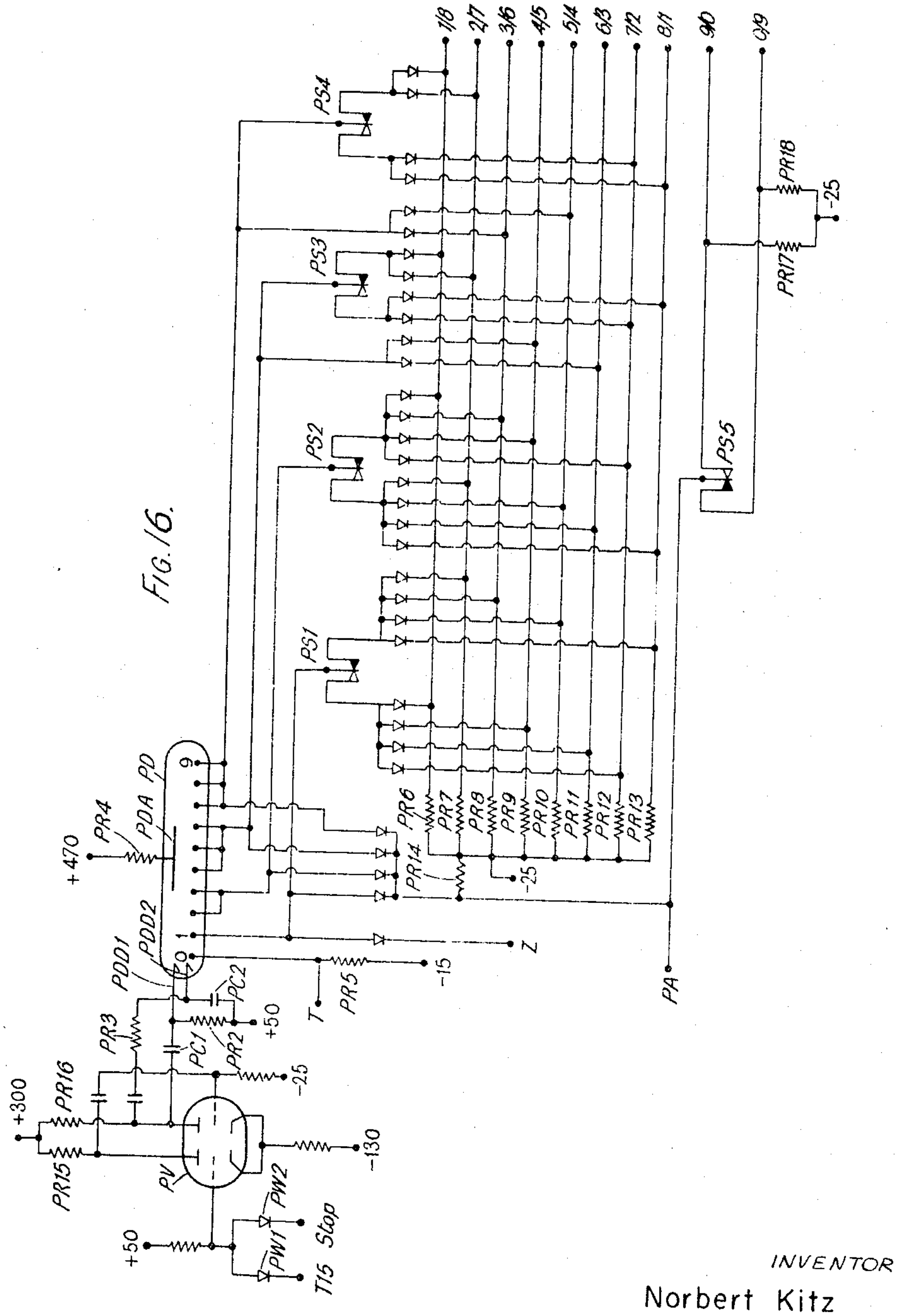
FIGURE 16 is a simplified circuit diagram of the pulse generator PG and changeover switch 1S illustrated in FIGURE 14.

FIGURE 16 is a simplified circuit diagram of the pulse generator PG and the changeover switch 1S. The pulse generator includes a ten cathode electronic stepping tube PD and a double triode valve PV. The valve PV is connected in a conventional cathode coupled multivibrator circuit which normally oscillates at 5 kc./s. This frequency ensures that the speed of operation of the machine as a whole is such that it is impossible for an operator performing addition or subtraction to make successive key strokes at a faster speed than the machine can deal with them.

The two anodes of the valve PV are connected through respective resistors PR15 and PR16 to a potential of +300 volts and the two cathodes are connected through a common resistor PR17 to a potential of −130 volts. The control grid of the left-hand half of the double-triode PV is connected to a gate circuit comprising two diode rectifiers PW1 and PW2. This grid is connected to the terminal T15 of the timing device TD through the diode PW1 and to the stop line through the diode PW2. This grid is also connected to a potential of +50 volts through a resistor PR1. Terminal T15 is connected to a potential of −130 volts through a resistor (not shown in this figure) as also is the stop line. Unless the potentials of these terminals are lifted, the arrangement is such that the circuit will oscillate. If, however, the potentials of both the terminal T15 and the stop line are lifted, the circuit will stop oscillating.

The output of the valve PV is taken from the anode of the right-hand triode and is applied to the drive electrodes of the stepping tube PD in a conventional manner. This anode is connected to the drive electrode PDD1 through a differentiating circuit consisting of the capacitor PC1 and the resistor PR2, and to the drive electrode PDD2 through an integrating circuit consisting of the resistor PR3 and the capacitor PC2. The drive arrangement is such that each pulse from the anode of the right-hand triode of the valve PV steps the glow from one cathode of the tube PD to the next succeeding cathode.

The anode PDA of the tube PD is connected to a potential of +470 volts through a resistor PR4, and the cathodes 1 to 9 of this tube are connected through diode rectifiers and resistors PR6 to PR14 to a potential of −130 volts. The 0 cathode is connected through a resistor PR5 to a potential of −15 volts. It is also connected to a terminal T which leads to the input amplifier of the timing device. As the glow is being stepped continuously along the cathodes of the tube PD during operation of the machine positive pulses are developed in succession across the cathode loads of the tube. Accordingly a positive pulse is applied to the terminal T each time a glow passes the 0 cathode of the tube.

The cathodes 2 to 9 of the tube PD are connected together in groups, the first group consisting of the cathodes 2 and 3, the second group of the cathodes 4, 5 and 6 and the third group of the cathodes 7, 8 and 9. These groups of cathodes and the cathode 1 are connected through switches PS1, PS2, PS3, PS4 and PS5 and rectifiers (which are unnumbered) to output terminals which are designated as 1/8, 2/6 . . . 9/0, 0/9. Each switch is illustrated with one black contact and one white contact. The black contact in each case is closed when the machine is set for performing substraction or division and the white contact in each case is closed when the machine is set for performing addition or multiplication. Each output terminal is connected to a number of cathodes equal to the first figure in its designation when the machine is set for addition or multiplication, and is connected to a number of cathodes equal to the second figure in its designation when the machine is set for substraction or division. It will be seen, for example, that, when the machine is set for addition, one pulse is applied from cathode 1 through the white contact of switch PS1 to the terminal 1/8 and that nine pulses are applied from the cathodes 1 to 9 through the white contact of the switch PS5 to the terminal 9/0. On the other hand, when the machine is set for substraction eight pulses are applied to the terminal 1/8. Two of these eight pulses are derived from the cathodes 2 and 3 through the black contact of the switch PS2, three from the cathodes 4, 5 and 6 through the black contact of the switch PS3, and three from the cathodes 7, 8 and 9 through the black contact of the switch PS4. The terminal 0/9 is disconnected from the cathodes of the tube PD when the switch PS5 is set to the white contact and the terminal 9/0 is disconnected from the tube PD when the switch PS5 is set to the black contact. The potential of either of these terminals, when it is disconnected from the tube PD, is maintained at a potential of substantially −25 volts by means of respective resistors PR17 and PR18. This arrangement ensures that the gate circuits to which these terminals are connected are closed except when the terminals are being supplied with pulses from the cathodes of the tube PD.

The terminals 1/8 to 8/1 are connected to a potential of −25 volts through resistors PR6 to PR13 respectively and the movable contact of the switch PS5 is connected to the potential of −25 volts through a resistor PR14.

Figure 17:
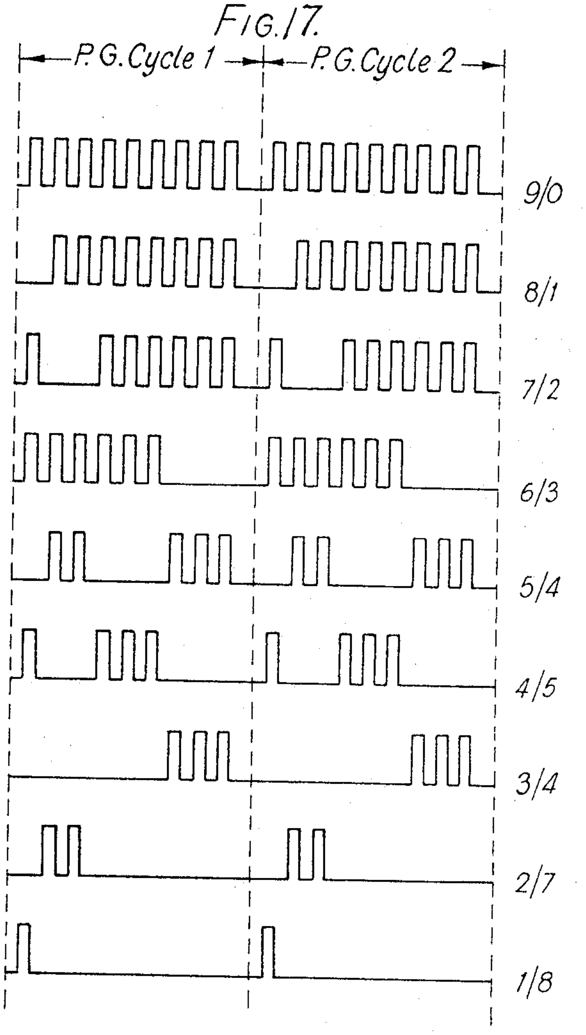
FIGURE 17 illustrates the wave forms on the terminals 1/8 to 9/0 in FIGURE 16.

The pulse wave forms on the terminals 1/8 to 9/0 when the machine is set for addition or multiplication are shown in FIGURE 17.

Figure 18:
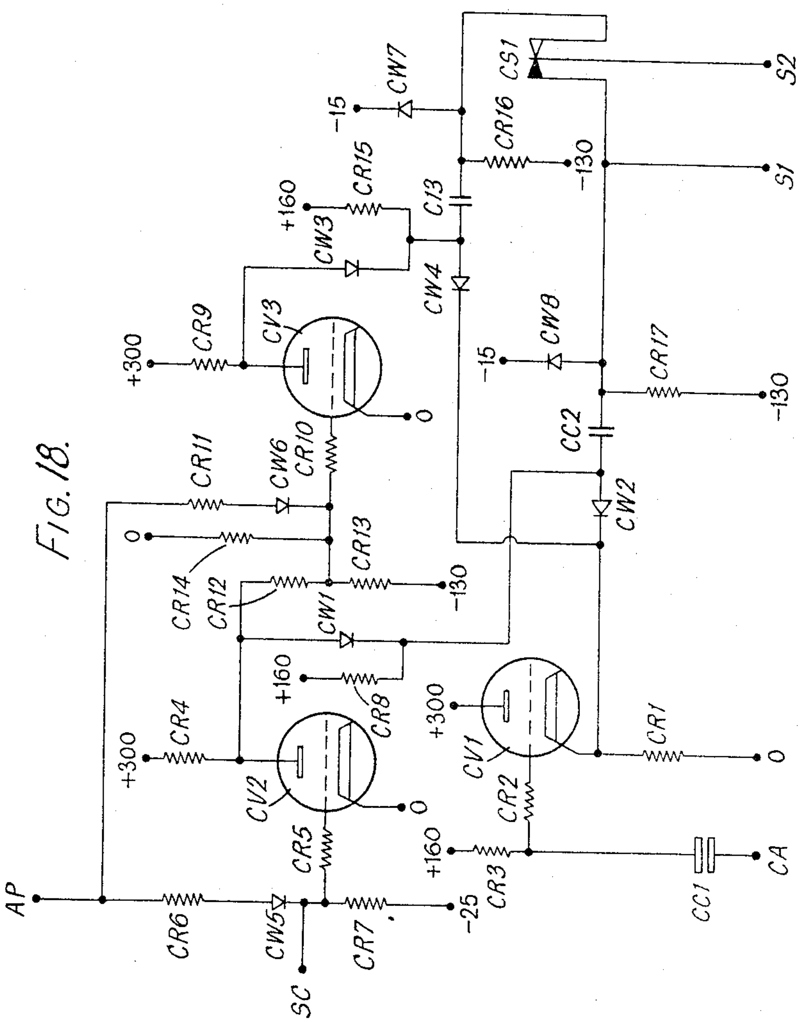
FIGURE 18 is a circuit diagram of the gate circuit CG and the electronic changeover switch CS illustrated in FIGURE 14.

FIGURE 18 is a circuit diagram of the gate circuit CG and the electronic changeover switch CS. The principal elements of the arrangement illustrated are a valve CV1 operating as a cathode follower, valves CV2 and CV3 operating essentially as amplifiers, a first gate circuit comprising diode rectifiers CW1 and CW2, a second gate circuit comprising the diode rectifiers CW3 and CW4, and a changeover switch CS1.

The anode of the valve CV1 is connected to a potential of +300 volts and the cathode is connected to a potential of 0 volts through a resistor CR1. The grid of this valve is connected through a grid stopper resistor CR2 and a capacitor CC1 to a terminal CA. This terminal is connected to the terminal PA in the pulse generator illustrated in FIGURE 16 and accordingly nine positive-going pulses are applied to this terminal during each cycle of the pulse generator. The junction of the resistor CR2 and the capacitor CC1 is connected through a resistor CR3 to a potential of +160 volts. The output of the valve CV1 is taken from the cathode and is applied to one input of each of the two gates referred to above. If the first gate consisting of the rectifiers CW1 and CW2 is open, the nine pulses are applied through a capacitor CC2 to the terminal S1. Further, if the changeover switch CS1 is in the left-hand position (shown in black) the nine pulses are also applied to the output S2. This is the condition when the machine is set for division. When the switch CS1 is set to the right-hand position (shown in white) the nine pulses are applied to the output S2 only if the second gate consisting of the rectifiers CW3 and CW4 is open. This is the condition during multiplication.

The anode of the valve CV2 is connected to +300 volts through a resistor CR4 and the cathode is connected to a potential of 0 volts. The grid of this valve is connected through a grid stopper resistor CR5 to a terminal SC and through the grid stopper resistor, a diode rectifier CW5, and a resistor CR6 to a terminal AP. The grid of this valve is also connected through the grid stopper resistor and a further resistor CR7 to a potential of −25 volts. Therefore, when there is no input to either the terminal AP or the terminal SC, the valve CV2 is cut off so that the anode potential is above the +160 volts applied through a resistor CR8 to the junction of the two rectifiers CW1 and CW2. Accordingly, the gate comprising these two rectifiers is open and pulses are able to pass from the input terminal CA to the output terminal S1. When the AP line is energised, it raises the terminal AP to +15 volts with the result that the valve CV2 commences to conduct so that its anode potential drops below +160 volts. As a result the gate comprising the rectifiers CW1 and CW2 is closed and pulses are prevented from travelling from the terminal CA to the terminal S1. Similarly if the SC line is energised, it raises the potential of the terminal SC to +15 volts with the result that pulses are prevented from travelling from the terminal CA to the terminal S1.

The anode of the valve CV3 is connected to a potential of +300 volts through a resistor CR9 and the cathode is connected to a potential of 0 volts. The grid is connected through a grid stopper resistor CR10, a diode rectifier CW6 and a resistor CR11 to the terminal AP and also to the junction between two resistors CR12 and CR13 which are connected in series between the anode of the valve CV2 and a potential of −130 volts. The grid of this valve is also connected through the grid stopper resistor CR10 and a further resistor CR14 to a potential of 0 volts. When the AP line is not energised, the valve CV2 is nonconducting, as mentioned above, and its mean anode potential is approximately +170 volts. As a result the potential at the junction of the resistors CR12 and CR13 (the resistances of which are equal) is sufficient to ensure that the valve CV3 conducts. Accordingly, the anode potential of this valve drops below +160 volts which is applied through a resistor CR15 to the junction of the two rectifiers CW3 and CW4. As a result the gate comprising the two rectifiers CW3 and CW4 is closed and pulses are prevented from travelling from the cathode of the valve CV1 through the capacitor CC3 to the right-hand contact of the switch CS1.

When the AP line is energised and raises the potential of the terminal AP to +15 volts, it causes the valve CV2 to conduct as mentioned above. This causes the anode potential of this valve to drop and accordingly the potential of the junction of the resistors CR12 and CR13 would also drop if it were not held up by the connection between terminal AP and this point through the resistor CR11 and the reactifier CW6. This connection holds the grid of the valve CV3 sufficiently positive under these conditions for it to remain conducting and for the gate comprising the rectifiers CW3 and CW4 to remain closed.

If the AP line is not energised, but the SC line is energised, so that the terminal AP is at −25 volts, whereas the terminal SC is at +15 volts, the valve CV2 conducts, but the valve CV3 ceases to conduct since the potential of its grid is no longer held up by the potential from the terminal AP. Accordingly, the gate comprising the rectifiers CW1 and CW2 is closed, but the gate comprising the rectifiers CW3 and CW4 is open so that the pulses cannot pass from the terminal CA to the terminal S1, but can pass to the right-hand contact of the switch CS1. Accordingly, when the machine is being used for multiplication pulses pass from the terminal CA to the terminal S2 when the SC line is energised and the AP line is not energised.

In addition to the components already mentioned FIGURE 5 also shows a rectifier CW7 and a resistor CR16 connected to the right-hand contact of the switch CS1 and a rectifier CW8 and a resistor CR17 connected to the terminal S1. These components serve to ensure that the terminals S1 and S2 are at a potential substantially −15 volts when they are not receiving pulses from the terminal CA so that at these times they serve to close the gate circuits to which they are connected.

Figure 19:
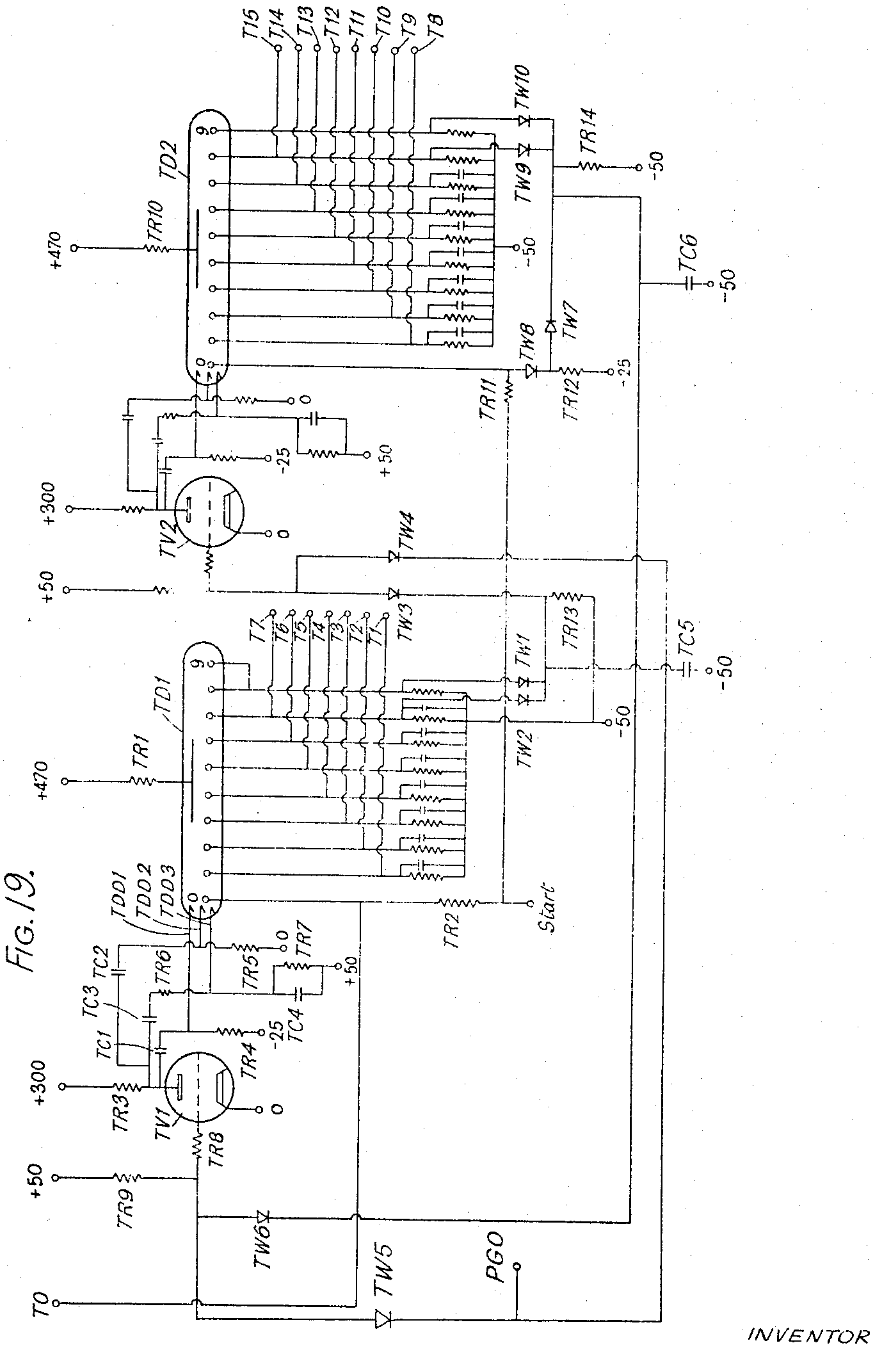
FIGURE 19 is a circuit diagram of the timing device T and its input amplifier TA illustrated in FIGURE 14.

FIGURE 19 is a circuit diagram of the timing device T and its input amplifier TA. The principal components of the timing device are two ten-cathode electronic steppng tubes TD1 and TD2 together with their drive circuits which include triode valves TV1 and TV2. The anode of the tube TD1 is connected through a resistor TR1 to a potential of +470 volts. The cathode 0 of the tube TD1 is connected through a resistor TR2 to a start terminal which is maintained at a potential of −130 volts until a key in any one of the orders of keys 1K to 11K is depressed during addition or subtraction, and until one of the keys in the bank of keys MK is depressed during multiplication or division. As a result the glow in this tube is maintained on the cathode 0 until one of the said keys is actuated. The cathode 0 is also connected to a terminal T0 which constitutes one of the inputs to each of the gate circuits CGA and CGB. The cathodes 1 to 7 of the tube TD1 are connected through resistive and capacitative loads to a potential of −50 volts and also to terminals T1 to T7 respectively. The cathodes 7, 8 and 9 of this tube are connected through isolating rectifiers TW1 and TW2 to the input of a gate circuit consisting of diode rectifiers TW3 and TW4 at the input of the valve TV2. The particular stepping tubes illustrated in this figure have three drive electrodes and accordingly the drive circuits are designed to provide three phase displaced outputs. The anode of the valve TV1 is connected through a resistor TR3 to a potential of +300 volts and is also connected through a differentiating circuit comprising a capacitor TC1 and a resistor TR4 to the drive electrode TDD1, through a differentiating circuit comprising a capacitor TC2 and the resistor TR5 to the drive electrode TDD2, and through a coupling capacitor TC3 and an integrating circuit comprising a resistor TR6 and the capacitor TC4 to the drive electrode TDD3. In addition the drive electrode TDD1 is connected through the resistor TR4 to a potential of −25 volts, the drive electrode TDD2 is connected through the resistor TR5 to a potential of 0 volts and the drive electrode TDD3 is connected through a resistor TR7 to a potential of +50 volts. This arrangement ensures that when a pulse is applied to the grid of the valve TV1 the glow in the tube TD1 is stepped from one cathode to the next.

The grid of the valve TV1 is connected through a grid stopper resistor TR8 to the output of a gate circuit consisting of the diode rectifiers TW5 and TW6. This grid is also connected through the grid stopper resistor and a resistor TR9 to a potential of +50 volts. The rectifier TW5 is connected to a terminal PG0 which is the cathode 0 of the pulse generator. The rectifier TW6 is connected through rectifiers TW7 and TW8 to the cathode 0 of the tube TD2. It is also connected through a resistor TR14 to a potential of −50 volts.

The anode of the tube TD2 is connected through a resistor TR10 to a potential of +470 volts. The cathode 0 of this tube is connected through a resistor TR11 to the start terminal and is also connected through the rectifier TW8 and a resistor TR12 to a potential of −25 volts. The junction of the rectifier TW8 and the resistor TR12 is connected through the rectifier TW7 to one input of the gate circuit associated with the grid of the valve TV1 as described above. The cathodes 8 and 9 of the tube TD2 are connected through rectifiers TW9 and TW10 respectively to the said input of the gate circuit associated with the grid of the valve TV1. The cathodes 1 to 7 of the tube TD2 are connected through resistive and capacitive loads to a potential of −50 volts. The cathodes 8 and 9 are similarly connected through resistive loads to the same potential. However, the cathodes T1 to T8 are connected respectively to terminals T8 to T15.

The drive circuit for the tube TD2 is identical with that for the tube TD1 and accordingly will not be described in detail.

Before a key is depressed the glow in each of the tubes TD1 and TD2 is called to the cathode 0 by the negative potential on the start terminal. After this negative potential has been removed by the depression of a key the next pulse applied to the terminal PG0 is able to step the glow in the tube TD1 from the cathode 0 to the cathode 1. It is able to do this because the glow in the tube TD2 is still on the cathode 0 so that the gate circuit at the input of the valve TV1 is open. As a result of the glow passing to the cathode 1 the potential of the terminal T1 is raised. Subsequent pulses applied to the terminal PG0 step the glow in the tube TD1 successively along the cathodes to the cathode 6. These pulses are also applied to one input of the gate circuit at the input of the valve TV2 but they are unable to drive the tube TD2 since this gate is closed by the negative potential applied to the other input of this gate circuit through a resistor TR13. However, the next pulse applied to the terminal PG0 steps the glow on to the cathode 7 of the tube TD1 and accordingly the potential of the second input to the gate circuit associated with the valve TV2 is raised. This allows the gate circuit to open and the next pulse applied to the terminal PG0 is able to drive both the tubes TD1 and TD2. Accordingly the glow in the tube TD1 steps to the cathode 8 and the glow in the tube TD2 steps to the cathode 1 thus raising the potential of the terminal T8. In order to prevent the gate at the input of the valve TV2 from closing while the glow is passing between the cathode 7 and the cathode 8 of the tube TD1, a capacitor TC5 is provided to store the positive potential previously on the cathode 7 until the potential of the cathode is raised. Similarly a capacitor TC6 is provided to keep open the gate at the input of the valve TV1 long enough to ensure that the glow reaches the cathode 8 of the tube TD1. After this step the gate circuit at the input of the valve TV2 is maintained open through the rectifier TW1 since the glow is resting on the cathode 8 of the tube TD1. However, as the glow has left the cathode 0 of the tube TD2, one input of the gate circuit associated with the valve TV1 is de-energised and accordingly pulses from the terminal PG0 are now unable to step the tube TD1. Accordingly the subsequent pulses at the terminal PG0 step the glow in the tube TD2 successively along the cathodes to the cathode 7 thus energizing the terminals T9 to T14 successively. When the glow is stepped on to the cathode 8 of the tube TD2 a potential is applied through the rectifier TW9 to the input of the gate circuit associated with the valve TV1 so that the next following pulse is able to step the glow in the tube TD1 on to the cathode 9 at the same time as the glow in the tube TD2 is stepped on to its cathode 9. Under these conditions the gate circuits at the inputs of both valves TV1 and TV2 remain open and accordingly the next pulse steps the glow in both tubes back to the cathode 0. It will thus be seen that a cycle of the timing device is completed in 17 steps corresponding to 17 cycles of the pulse generator.

Figure 20:
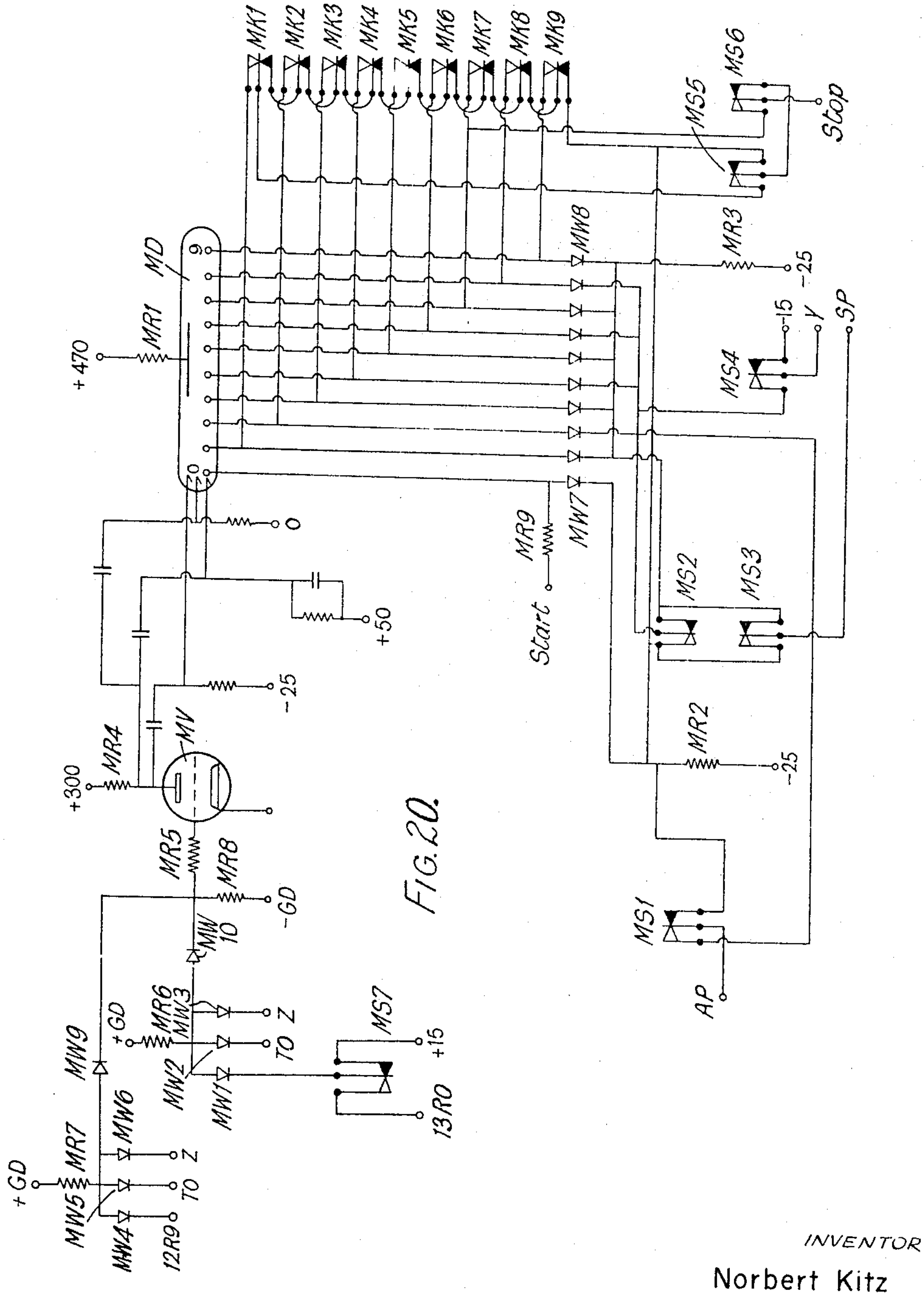
FIGURE 20 is a circuit diagram of the control device C, its input amplifier CA, the gate circuits CGA and CGB, the bank of multiplier keys MK and the switching arrangement CM illustrated in FIGURE 14.

FIGURE 20 is a circuit diagram of the control device C, its input amplifier CA, the gate circuits CGA and CGB, the bank of multiplier keys MK and the switching arrangement CM. The control device consists essentially of a ten-cathode electronic stepping tube MD; the input amplifier consists of a triode valve MV together with its associated components; the gate CGA consists of three diode rectifiers MW1, MW2 and MW3; the gate CGB consists of diode rectifiers MW4, MW5 and MW6; the bank of multiplier keys consists of nine change-over switches MK1 to MK9; and the switching arrangement CM consists of the switches MS1 to MS6. The switches are normally in the position indicated by the black contact, but the switches MS1, MS3, and MS5 are changed over when the machine is set for multiplication, the switches MS4 and MS6 are changed over when the machine is set for division and the switch MS2 is changed over when the machine is set for subtraction or division.

The anode of the tube MD is connected through a resistor MR1 to a potential of +470 volts. The 0 cathode of this tube is connected through a rectifier MW7 and a resistor MR2 to a potential of −25 volts. The cathodes 1, 3, 5, 7 and 9 are connected through individual rectifiers such as MW8 to the right-hand (black) contacts of the switches MS2 and MS3. They are also connected through the individual rectifiers and a common resistor MR3 to a potential of −25 volts. The cathodes 2, 4, 6 and 8 are connected to the centre (movable) contact of the switch MS2 and to the left-hand (white) contact of the switch MS4. When the switch MS2 is in the right-hand (black) position, these cathodes are connected through their individual rectifiers and the resistor MR3 to a potential of −25 volts. When the switch MS2 is in the left-hand (white) position, these cathodes are connected to a potential of −25 volts through their individual rectifiers and the resistor MR2. Each of the cathodes 1 to 9 is connected to the upper (white) contact of a respective one of the keys MK1 to MK9. These contacts are normally open, but each is closed when the respective key is depressed.

The glow in the stepping tube MD is moved from cathode to cathode by means of the drive circuit including the valve MV. The particular stepping tube illustrated is shown with three drive electrodes and these are connected to the anode of the valve MV through two differentiating circuits and an integrating circuit. The three drive electrodes are connected through resistors to potentials of −25 volts, 0 volts and +50 volts respectively. The anode of the valve MV is connected through a resistor MR4 to a potential of +300 volts. The grid of the valve MV is connected through a grid stopper resistor MR5 and isolating rectifiers MW9 and MW10 to the outputs of the two gate circuits previously referred to. The anodes of the rectifiers MW1, MW2 and MW3 are connected through a resistor MR6 to a source of varying positive potential +GD referred to hereinafter. Similarly the anodes of the diodes MW4, MW5 and MW6 are connected through a resistor MR7 to the same source +GD. The cathode of the rectifier MW1 is connected to the centre contact of a changeover switch MS7 which is in the right-hand (black) position when the machine is being used for addition or multiplication and in the left-hand (white) position when the machine is being used for subtraction or division. The right-hand contact is connected to a potential of +15 volts and the left-hand contact is connected to the 0 cathode of the stepping tube 13R. This switch is therefore equivalent to the switch 4S shown in FIGURE 14. The cathode of the rectifier MW4 is connected to the ninth cathode of the stepping tube 12R (FIGURE 14), the cathodes of the rectifiers MW2 and MW5 are connected to the 0 cathode of the stepping tube TD1 (FIGURE 19) and the cathodes of the rectifiers MW3 and MW6 are connected to the terminal Z shown in FIGURE 16. The grid of the valve MV is also connected through the grid stopper resistor MR5 and a resistor MR8 to a varying negative potential −GD which will be referred to hereinafter.

The 0 cathode of the tube MD is connected through a resistor MR9 to the start line and accordingly, when the machine is switched on, but before a key is depressed, a potential of −130 volts is applied to this resistor MR9. Under these conditions the glow resides on the 0 cathode. Pulses may be applied to step the glow to the succeeding cathodes either through the gate consisting of the rectifiers MW1, MW2, and MW3 or through the gate consisting of the rectifiers MW4, MW5 and MW6. When the machine is being used for addition or subtraction the glow normally remains throughout on the 0 cathode.

When the machine is being used for multiplication or division the glow also starts on the 0 cathode. As a result of the current through the tube the potential of the 0 cathode is raised and this potential rise is applied through the rectifier MW7 and the operated switch MS3 to the terminal SP. It is to be noted that during multiplication the terminal AP is connected through the operated switch MS1 to the cathodes 2, 4, 6 and 8 of the tube MD and also through the unoperated switch MS2 to the cathodes 1, 3, 5, 7 and 9 of the tube MD. However, since at this time the glow is not residing on any of the cathodes 1 to 9 of the tube MD, the potential of the terminal AP is negative and accordingly the machine operates to perform a shift operation. The glow is stepped forward once for each cycle of the timing device by means of the pulses applied through the rectifiers MW2 and MW3. As soon as the glow is stepped from the 0 cathode to the 1 cathode, the positive potential is removed from the terminal SP and is applied to the terminal AP so that the machine operates to perform addition. Assuming that the key MK4 has been depressed, this process will continue until the glow reaches cathode 4 in the tube MD, when a positive potential will be applied from this cathode through the operated key MK4 and the unoperated switch MS6, to the stop line.

When the machine is being used for division, a key MK0 (not shown) is depressed and this has the effect of opening the start contact without changing over any of the keys MK1 to MK9. Once again the glow is on the 0 cathode at the start of calculation and with the machine set for division the 0 cathode is connected through the rectifier MW7 and the unoperated switch MS1 to the AP terminal so that the potential of this terminal is raised. The potential on the AP line is also applied to the terminal Y through the operated switches MS2 and MS4. Accordingly the machine performs complementary addition and also allows the "odd one" to be applied to the counting device 13R during the period T4. The switch MS7 is changed over when the machine is set for division and accordingly pulses are not applied through the gate CGA to the drive valve unless the counting device 13R (FIGURE 14) is at 0. A pulse, however, is applied to the drive valve through the gate CGB when the counting device 12R is at 9. When the glow in the tube MD is stepped on to the cathode 1, the potential of the AP line drops and the potential of the SP line is raised through the unoperated switch MS3. Accordingly the machine operates to perform a complementary shift operation. When the glow in the tube MD is stepped on to the cathode 2, conditions are again as when it was on the cathode 0 and, when the glow is stepped on to the cathode 3, conditions are the same as when it was on the cathode 1. When the glow reaches cathode 7, the potential of the stop terminal is raised through the operated switch MS6 and the pulse generator is disabled.

Figure 21:
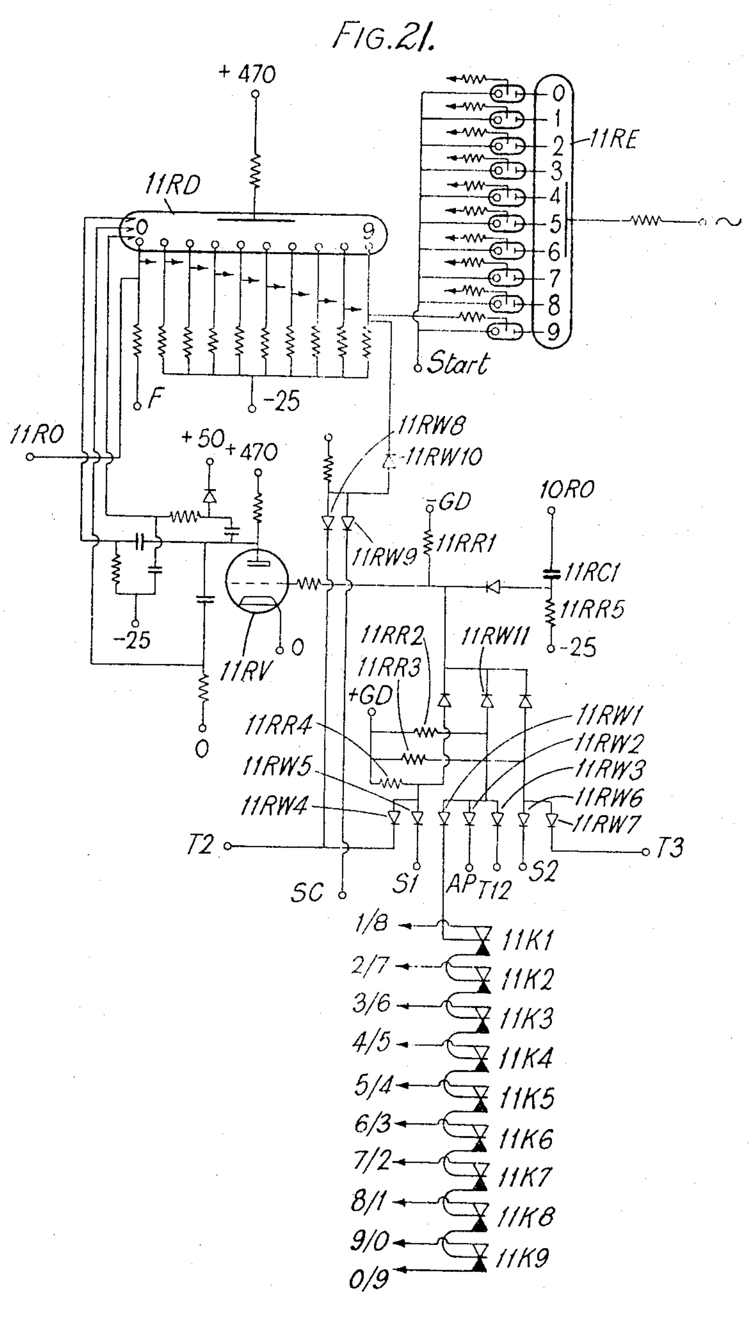
FIGURE 21 is a circuit diagram of the counting device 11R, its input amplifier 11A, the gate circuits 11GA, 11GB, 11GC and 11GF and the bank of keys 11K illustrated in FIGURE 14.

FIGURE 21 is a circuit diagram of the counting device 11R together with its input amplifier 11A, the gate circuits 11GA, 11GB, 11GC and 11GF, and the bank of keys 11K.

The counting device consists essentially of a ten-cathode electronic stepping tube 11RD and a display tube 11RE; the amplifier 11A consists essentially of a valve 11RV and its associated components which are arranged to provide phase-displaced drive potentials for the tube 11RD similar to those described for the tube TD1 illustrated in FIGURE 19. The gate circuit 11GA consists of rectifiers 11RW1, 11RW2, and 11RW3; the gate circuit 11GB consists of rectifiers 11RW4 and 11RW5; the gate circuit 11GC consists of rectifiers 11RW6 and 11RW7; and the gate circuit 11GF consists of rectifiers 11RW8 and 11RW10. Pulses are applied to the grid of the valve 11RV whenever both, or all, of the inputs of any one of the gate circuits 11GA, 11GB or 11GC are energised. The output of the gate 11GF is applied to the terminal SC through a rectifier 11RW9 and the potential of this terminal will be raised if the glow in the stepping tube 11RD is on the cathode 9 during the period T2.

The connections between the stepping tube 11RD and the display tube 11RE are as shown in FIGURE 5 of U.S. Patent No. 2,954,507 of N. Kitz et al. for "Indicating Devices," which issued September 27, 1960 and is assigned to the same assignee as the present invention and the circuit operates in the manner described with reference to that figure. The cathode 0 of tube 11RD in addition to being connected to the associated trigger tube is also connected to a terminal 11R0, which leads to the input amplifier 12A.

All the gate circuits illustrated have two or more diodes with a common anode connection, from which a signal output is taken. The anodes of the diodes 11RW1, 11RW2 and 11RW3 are connected through a resistor 11RR2 to a source of potential +GD; the diodes 11RW4 and 11RW5 are connected to the same source through a resistor 11RR4, and the diodes 11RW6 and 11RW7 are connected to the same source through a resistor 11RR3. The input cathodes carry a normal closed gate potential of −15 volts to −25 volts.

Each gate output circuit is shown connected through a further diode to a load resistor 11RR1. In the case of each gate circuit a resistor, for example, resistor 11RR2, a diode, for example diode 11RW11, and the resistor 11RR1, form a potential divider between +GD and −GD. The further diodes such as 11RW11 are included in order to allow all the gates to feed the same output load.

The output potential when the gate is closed may be about —12 volts, allowing for three volts dropped across only one diode holding the gate closed. In the gate open condition all the input cathodes may rise to +15 volts. Now if +GD be taken as +50 volts and —GD as —25 volts, and allowing three volts drop in the series diode, for example diode 11RW11, the output potential rises to +11 volts.

Unfortunately a nonconducting diode behaves like a small capacitor, and one output may be loaded by several diodes in this condition. For example, the diodes 11RW2 and 11RW3 may have their cathodes at a potential of +15 volts. Then the diode 11RW1 may be pulsed with pulses through the keys 11K which drive its cathode from —15 volts to +15 volts. The time of rise of the pulses at the output will be controlled by the shunt capacitance of the output circuit, which will include the diodes 11RW2 and 11RW3, together with the available charging current for this stray capacitance.

If each of the resistors 11RR1 to 11RR4 has a resistance of 1 megohm, the charging resistance comprises two parallel 1-megohm resistors and is therefore 0.5 megohm. The potential rises from —12 volts to +11 volts on an exponential curve. If, therefore, the capacitance is 100 picofarads, the rise time will be 50 microseconds approximately.

The back of the pulse, or fall time, is also affected by some of the stray capacitance. Although the gate may close quickly as one of the input potentials drops, this may leave the coupling diode 11RW11 between this part of the circuit and the output in a non-conducting state. At the start of the rise of a pulse there was 23 volts across 0.5 megohm. Now at the start of the fall there is 25 volts across 1 megohm. The stray capacitance should therefore be about halved, which is in fact the case.

The forward impedance of the diodes makes the use of lower gate load resistance values impracticable. The source impedance of the input circuits to the gates also adds to the diode impedance and imposes a more severe limitation.

Figure 22:
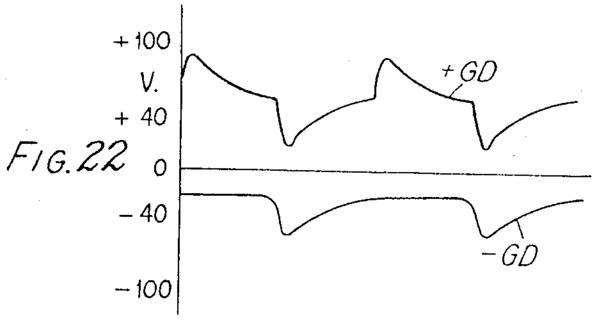
FIGURE 22 illustrates the plus and minus gate drive wave forms in the machine of FIGURE 14.

The capacitance losses are, therefore, partially neutralised, according to one aspect of the invention, by the use of variable potentials on the terminals +GD and —GD. The waveforms of these potentials are illustrated in FIGURE 22, which shows that +GD is the +50 volt supply added to a differentiated oscillator pulse. —GD is part of an A.C. waveform, gated, and referred to the —25 volt line. The +GD waveform may be derived, for example, from the secondary of a transformer the primary of which is connected in the anode circuit of the right-hand triode of the valve PV illustrated in FIGURE 16. The —GD waveform may be derived from the guide electrode PDD1 through a rectifier and a resistor, the junction of said rectifier and resistor being connected through a further rectifier to the —25 volt line.

+GD rises sharply to a maximum of +80 volts at the same time as the front of the pulses from the pulse generator PG. This assists the gate to open both by the increased current flowing in the 1 megohm resistors coupling into the gates, and by current in the stray capacitance across these resistors and elsewhere in the wiring.

—GD serves a similar function at the end of these pulses, so helping to restore the cutoff bias to the drive valves.

As would be expected, these additional sources of pulses supplied to the gates and drive valve grids, can give rise to errors; but present in the right amount they can make poor pulses into good ones.

A gate which is held closed by the negative potential from a TD cathode will "leak" a small amount of +GD waveform. The amount of this will depend upon the impedance of this cathode circuit, and on the series diode impedance. The leak of "spikes" from +GD is minimised by the shunt capacitors on the TD cathode loads.

Turning again to FIGURE 21 we find four possible signal inputs to the grid of the drive valve 11RV. Each is isolated from the others by a diode. The first signal input is that provided for the carry from the 0 cathode of the preceding counting device 10R. As the glow may rest on this cathode, it is necessary to differentiate the voltage on it in order to produce the required carry pulse. The differentiating circuit provided consists of a capacitor 11RC1 and a resistor 11RR5. The second input is that provided for pulses from the pulse generator PG when one of the nine keys 11K is depressed.

The add gate 11GA has three input diodes; one to the number line keys; one to the AP line; and one to T12 which is connected to the cathode 5 of the tube TD2. The cathode 5 potential, when there is no glow on this cathode, is adjusted to take the +GD1 load off the other two diodes. This condition holds for all other gates controlled by TD cathodes. During the period of the T12 positive pulse the +GD load falls on the AP line, which is strong enough (has enough tail current) to hold down a limited number only of GD loads. (This condition is met in multiplication and division for the shift cycles.)

When no key in the order 11K is depressed and the add gate finds its AP line diode and its T12 line diode cathode potential positive, the remaining diode to the 0/9 output of the switch 1S holds the gate closed, unless the machine is set for subtraction, when the gate will open to admit nine pulses.

The shift line S1 connects to the drive valve 11RV when a T2 pulse occurs, whereas the shift line S2 connects at T3 time, to take the spill over from the counting device 10R if the shift change line SC so directs.

The input to the diode 11RW1 of the gate 11GA is taken from the centre contact of the key 11K1. When none of the keys 11K1 to 11K9 is depressed, this diode is connected through the closed contacts of all the keys 11K1 to 11K9 to the 0/9 output of the switch 1S as mentioned above. When any one of the keys is depressed, this diode is disconnected from the 0/9 output and connected to the output appropriate to the value of the depressed key in its order. Thus, for example, when the key 11K3 is depressed the diode is connected to the 3/6 output of the switch 1S. Thus, when the machine is set for addition, three pulses are applied to this diode during each cycle of the pulse generator and, when the machine is set for subtraction, 6 pulses are applied to this diode during each cycle of the pulse generator.

All stages of the register have three sets of gates like the 11R stage.

The units counting device 1R finds itself with no carry input from the counting device 13R, but with two additional gates for "odd one" pulses. The gate 1GE allows an "odd one" for a subtraction cycle only, at T1 time; while the 1GD allows an "odd one" pulse at T14 time for each shift cycle.

The counting device 13R has four input gates; numbers are shifted out at T13 time of a shift cycle, when pulses up to nine if required appear at S1.

Numbers are shifted in a T1 time, from the counting device 12R via the S2 line. This is stopped on a division setting by the switch 3S holding a diode of the gate 13GC to —15 volts.

The gate 13GD has this same control for an "odd one" pulse, added at T2 time for a shift cycle, in order to distinguish between the normal (multiplication) and the complementary (division) shift.

The gate 13GE, with three diodes, is also an "odd one" adder, now at T4 time. Switch MS4 ensures that "odd ones" are only added when the machine is set to division, and then are admitted for every subtraction cycle.

The cathodes 1 to 9 of the stepping tube 11RD are connected to a potential of —25 volts through individual desistors while the cathode 0 is connected through a resistor to a terminal F. The 0 cathodes of the counting device stepping tubes 12R and 7R to 10R are all connected to the terminal B. Further the 0 cathodes of the counting device stepping tubes 5R and 6R are connected to the terminal F when the machine is set for division, otherwise the 0 cathodes of these tubes are connected to the terminal B. The terminal F is connected to a potential of —132 volts through a "CLEAR LEFT" key and the terminal B is connected to a potential of 130 volts through a "CLEAR RIGHT" key. Thus operation of the "CLEAR RIGHT" key, for example, causes the glow to return to the 0 cathode in the counting devices 1R to 4R when the machine is set for division and in the counting devices 1R to 6R when the machine is not set for division.

The cathodes of all the trigger tubes associated with the display tube 11RE are connected to the start terminal so that the tube is extinguished while a calculation is being performed.

Reference has hereinbefore been made to the fact that, when a multiplier key is depressed, it will be held down. This is achieved by virtue of the fact that an output from the valve PV (FIG. 16) is applied to the control electrode of a thyratron valve (not illustrated) to energise a solenoid (also not illustrated) located in the anode circuit of the thyratron. The key depressed is held depressed by a locking mechanism which is kept locked by the solenoid as long as the solenoid is energised, and the solenoid will remain energised as long as the multivibrator circuit (which includes the valve PV) oscillates. When the circuit stops oscillating the lock is released and the key returns to its unoperated position.

Figures 23, 24:
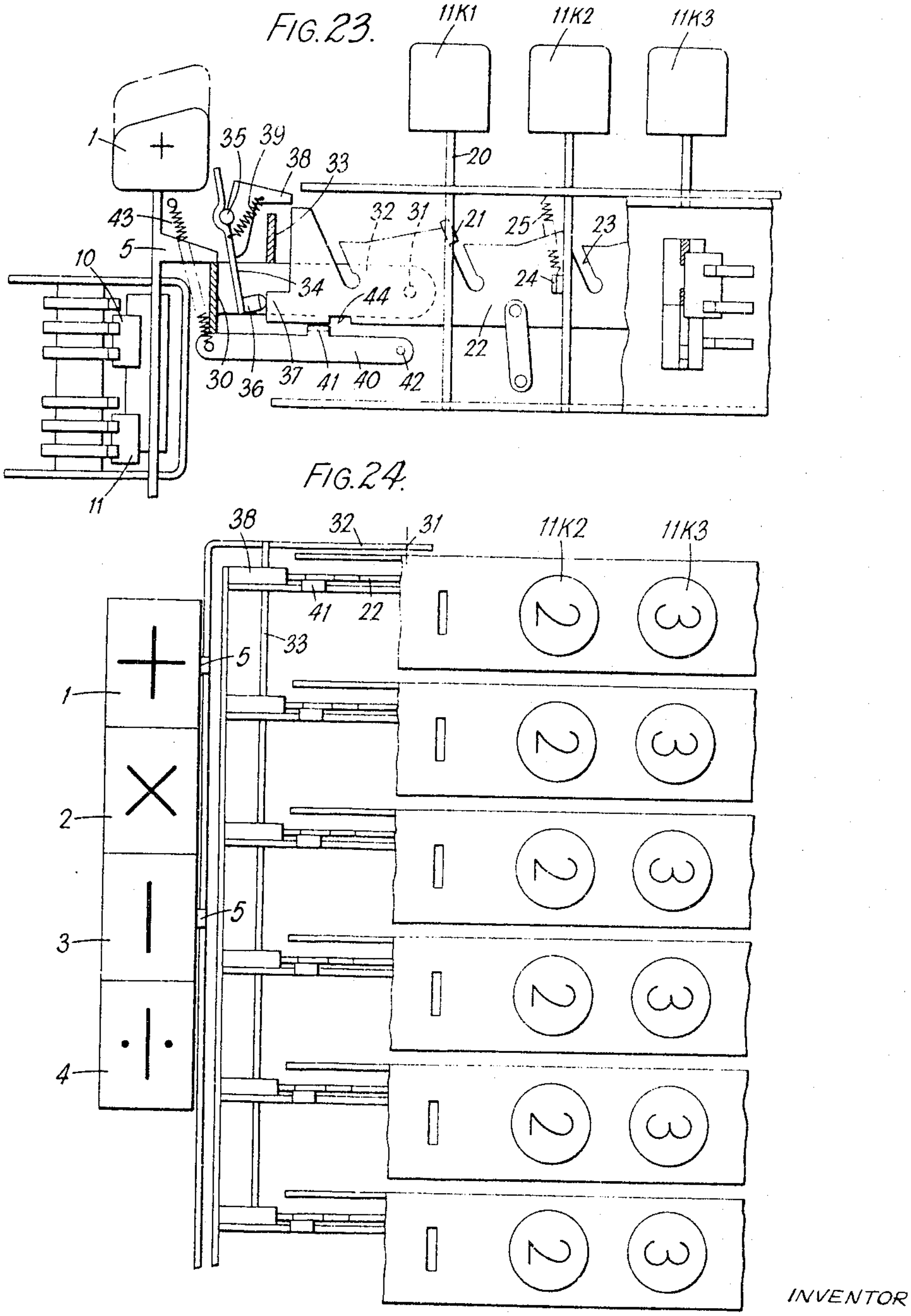
FIGURES 23 and 24 illustrate in sectional side elevation and in plan, respectively, the keyboard and phasing interlocks with which is provided the machine of FIGURE 25.

Referring to FIGURES 23 and 24, the calculating machine is provided with a set of four control keys 1, 2, 3, 4, the key 1 being depressed when it is desired to condition the machine for addition, the key 2 for multiplication, the key 3 for subtraction and the key 4 for division. The stem of each of keys 1 and 3 is provided with a rearwardly extending arm 5 and the stem of key 1 is also illustrated in FIGURE 23 as being associated with a pair of switch contacts 10 and 11, each of which is illustrated as bridging the lower two contacts of a set of three contacts. The two sets of three contacts correspond to two of the five sets of three contacts which constitute the switches PS1 to PS5 (FIGURE 16) and it will therefore be appreciated that the key 1 is associated with three further sets of contacts (not illustrated) which are identical with or similar to those illustrated in FIGURE 23. In each set of three contacts in FIGURE 23, the uppermost contact corresponds to the white contact, and the lowermost contact to the black contact, in FIGURE 16.

Referring now particularly to FIGURE 23, there are illustrated the keys 11K1, 11K2 and 11K3 of the 11K order of keys, the stem 20 of each key having a laterally directed lug 21 which is in contact with a key bar 22 which is mounted for forward and rearward movement in the machine and in the upper edge of which there is a plurality of inclined slots 23. A boss 24 on each key stem 20 acts as the anchorage for one end of a light spring 25, the other end of which is anchored to a part of the machine framework.

A bail 30 is mounted for rocking motion about the axis of a pair of studs or spindles 31 (of which only one is visible in the drawings) through the intermediary of a pair of arms 32 (of which only one is visible in the drawings). The bail 30 extends across all of the orders of the machine and is so arranged that the upper edge thereof is located in the path of travel of the arm 5 secured to the stem of each of the keys 1 and 3. A further bail 33 is mounted upon the upper edge of each of the arm 32 and extends across all of the orders of the machine parallel to the bail 30.

A plate 34 is mounted in the machine for pivotal movement about the axis of a spindle 35. The plate 34 is provided with a series of rearwardly extending bosses 36 which are held against the front end 37 of the key bar 22 by a spring (not illustrated). Also mounted for pivotal movement about the axis of the spindle 35 and independently of the plate 34 is a plurality of blocking members 38, there being a member 38 associated with each order of the machine and a spring 39 extends between the plate 34 and the member 38 so as to urge the said member in a clockwise direction about its pivotal axis.

A key bar locking device 40, associated with each order of the machine, is provided with an horizontally disposed lug 41 and is mounted for pivotal movement about the axis of a spindle 42 and is urged at all times in a clockwise direction about the axis of the spindle 42 under the influence of a spring 43, one end of which is anchored to the forward end of the key bar locking device 40 and the other end of which is anchored in any convenient manner on the framework of the machine.

The operation of the mechanism hereinbefore described is as follows:

When either of the keys 1 and 3 is depressed, the arm 5 thereof makes contact with and presses downwardly the bail 30. The lower edge of the bail 30 is depressed into contact with the upper edge of each of the key bar locking devices 40, thereby moving the lugs 41 thereof out of contact with the undersides of the various key bars 22. At the same time as the bail 30 is moved downwardly so also is the bail 33. Upon depression of, for example, key 11K3 the lug 21 on the key stem 20 engages the associated slot 3 in the key bar 22 and causes forward movement thereof. The front end 37 of the key bar 22 causes the plate 34 to be rotated about its axis of rotation in a clockwise direction thereby causing the blocking member 38 in each of the orders in which an amount key has not been depressed to move into the path which the key bars in those orders would move if a key in those orders were to be depressed. The blocking member 38 in the order of the actuated key makes contact with the upper edge of the key bar which has moved into the path of travel of the blocking member 38. Thus, as long as the key 11K3 is held depressed, it is impossible for the machine operator to depress a key in any of the other ten orders of the machine. When the key 11K3 is released, it is restored to its rest condition by means of its spring 25 and such restoration ensures that the key bar 22 is moved rearwardly to its rest position. Rearward movement of the key bar 22 allows the plate 34 and each of the members 38 to rotate the axis of the spindle 35 in an anticlockwise direction under the influence of the associated spring.

When either of the two keys 2 and 4 are depressed, both the keys 1 and 3 are returned to their position of rest if they have been depressed. When either of the keys 1 and 3 return to its position of rest the arm 5 on the stem thereof moved upwardly and consequently the bail 30 and the bail 33 became displaced upwardly from the position illustrated in FIGURE 10 under the influence of the spring 43 because the lowermost edge of the bail 30 is, at all times, in contact with the upper edge of the key bar locking device 40. When the bails 30 and 33 are in this upper position, the lug 41 on the key bar locking device 40 is in contact with the underside of the key bar 22. Upon depression of, for example, the key 11K3, the key bar moves forwardly, as hereinbefore explained, until the lug 41 registers with a notch 44 formed in the underside of the key bar 22. As soon as these two parts are in register, the lug 41 is moved upwardly into the notch 44 thereby arresting the key bar in its forward position. Once again, forward movement of the key bar causes clockwise rotation of the plate 34 but, by virtue of the fact that the bail 33 is in its upper position, the blocking member 38 is held stationary in space and clockwise rotation of the plate 34 will, therefore, merely stretch the spring 39. It will be appreciated, therefore, that when setting the machine for either multiplication or division, it is possible to depress in succession, the keys representing the digits of a multiplicand to be set up in the machine either simultaneously or in succession.

Release of the keys of a multiplicand thus set up is achieved by depression of either of the keys 1 and 3 whereupon, as hereinbefore explained, the arm 5 on the stem of the key depressed moves the bail 30 downwardly about its axis of rotation in order to rotate the key bar locking device 40 in an anticlockwise direction about the axis of the spindle 42 and thereby stretch the spring 43.

Clockwise rotation of the spindle 35, which is effected by forward movement of any of the key bars 22 in the machine during either addition or subtraction breaks a pair of "start" contacts (not illustrated) equivalent to the contact SS. However, when either key 2 or 4 is depressed to set the machine for multiplication or division, respectively, these "start" contacts are shorted and the contact SS is opened upon depression of a multiplier key.

In addition to the facilities provided by the machine hereinbefore described it may sometimes be required that the machine should be capable of dealing with numbers including a decimal point and of indicating where the decimal point is in the answer. A further facility that may be required is the possibility of moving numbers from one part of the register to another. If these additional facilities are required the equipment illustrated in FIGURE 26 may be incorporated in a machine as hereinbefore described.

Figure 26:
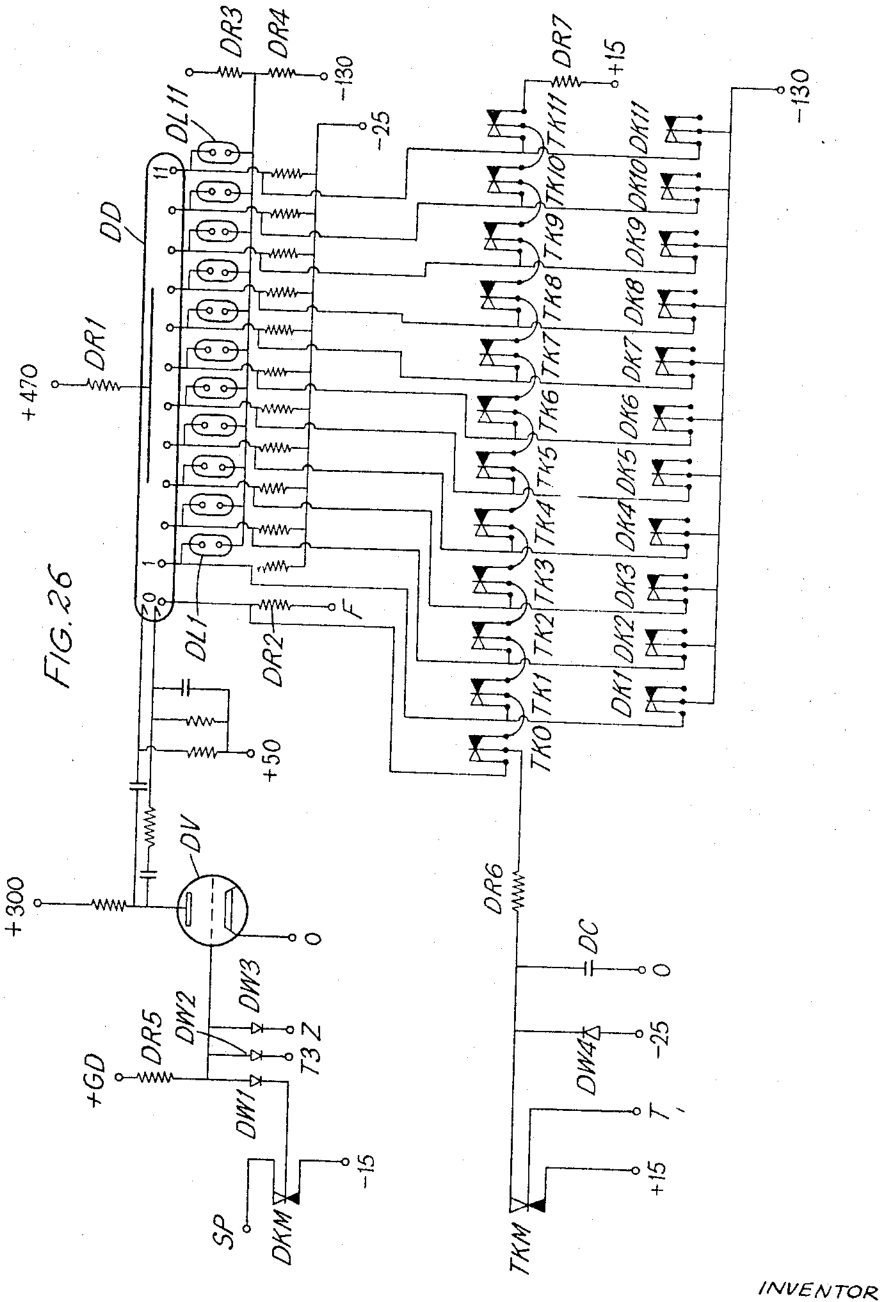
FIGURE 26 is a circuit diagram of apparatus which may be incorporated into the machine of FIGURE 14 in order to permit the moving of numbers from one part of the register of that machine to another part of that register.

The equipment illustrated in FIGURE 26 includes an electronic stepping tube DD having twelve cathodes and driven by a valve DV, a bank of tubulator keys TK0 to TK11 a bank of decimal keys DK1 to DK11 and a bank of decimal point indicating tubes DL1 to DL11.

The anode of the stepping tube DD is connected to a potential of +470 volts through a resistor DR1. The 0 cathode of the tube DD is connected through a resistor DR2 to a terminal F and the cathodes 1 to 11 are connected through respective resistors to a potential of −25 volts. Each of the cathodes 1 to 11 is also connected to the anode of a respective one of the neon indicating tubes DL1 to DL11. The cathodes of these indicating tubes are connected in common to the junction of a pair of resistors DR3 and DR4, the ends of which are connected between a potential of 0 volts and a potential of −130 volts. The potential of the junction of these resistors is such that each indicating tube will light when the glow in the stepping tube DD is resting on the cathode connected to the anode of that indicating tube but not at any other time. As can be seen from FIGURE 25, the indicating tubes DL1 to DL11 are arranged between the display tubes 1RE to 12RE which display the number stored in the register of the machine. Thus, the indicating tube DL1 is located between the display tubes 2RE and 1RE and indicates that the decimal point exists between the digits indicated by these two display tubes.

The stepping tube DD has two drive electrodes and the anode of the valve DV is connected to these drive electrodes through a circuit similar to that described with reference to the drive of the tube PD illustrated in FIGURE 16. The grid of the drive valve DV is connected to the output of a gate circuit consisting of a resistor DR5 connected to the terminal +GD and three rectifiers DW1, DW2 and DW3. The cathode of the rectifier DW1 is connected through a changeover switch DKM to a potential of −15 volts and to a terminal SP. Normally the cathode of this rectifier is connected to a potential of −15 volts, but when the switch DKM is operated this cathode is connected to the terminal SP (FIGURES 14 and 20). The cathode of the rectifier DW2 is connected to the terminal T3 (FIGURES 14 and 19) and the cathode of the rectifier DW3 is connected to the terminal Z (FIGURES 14 and 16).

Each of the cathodes 0 to 11 of the stepping tube DD is connected to the normally open contact (white contact) of a respective one of the tabulator keys TK0 to TK11. The moving contact of the key TK0 is connected through a resistor DR6 to the normally open (white contact) of a switch TKM. The moving contact of this key is connected to a terminal T and the normally made (black contact) of this switch is connected to a potential of +15 volts. The white contact of this switch is also connected through a capacitor DC to a potential of 0 volts and through a rectifier DW4 to a potential of −25 volts. The black contact of the key TK11 is connected through a resistor DR7 to a potential of +15 volts. The black contact of each of the remaining keys TK0 to TK10 is connected to the moving contact of the next higher key.

Besides being connected to the white contacts of the keys TK1 to TK11, the cathodes 1 to 11 of the stepping tube DD are also connected to the white contacts of the keys DK1 to DK11. The moving contacts of the keys DK1 to DK11 are connected to a potential of −130 volts. The black contacts of the keys DK1 to DK11 are unconnected.

Figure 25:
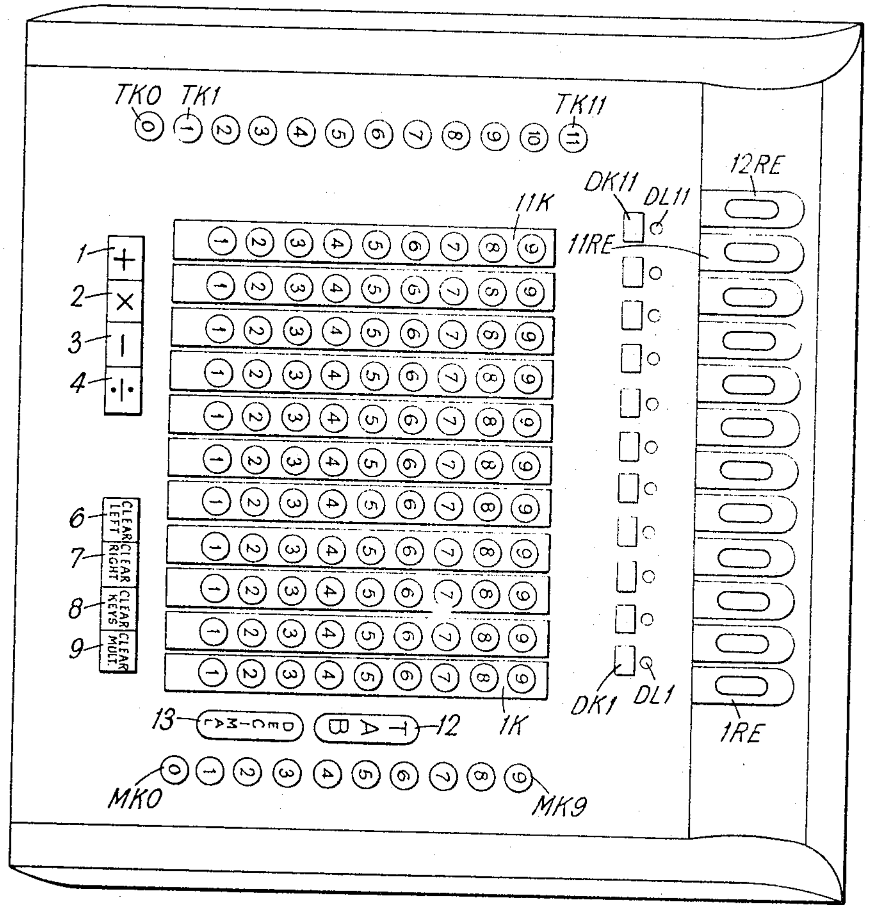
FIGURE 25 is a plan view of the exterior of a machine of electronic type according to the invention whose circuit is shown in FIGURE 14.

Normally the glow in the stepping tube DD is resting on the cathode 0. It is attracted to this cathode when the terminal F is connected to a potential of −130 volts by the operation of a CLEAR LEFT key (FIGURE 25). If, however, one of the keys DK1 to DK11 is actuated, the glow will be attracted to the corresponding cathode of the tube DD and the corresponding indicating tube will light. Thus, for example, if the key DK1 is operated, the glow will be attracted to the cathode 1 of the stepping tube DD and the indicating tube DL1 will light. As a result a decimal point will appear between the ultimate and penultimate display tubes on the right-hand side of the register. The keys DK1 to DK11 do not remain in the operated position after they have been actuated but return to their normal position. However, once the glow in the tube DD has been attracted to a particular cathode it remains there and accordingly the corresponding indicating tube will remain alight. As can be seen from FIGURE 25, the decimal point will also be situated between the ultimate and penultimate banks of keys on the right-hand side of the keyboard and accordingly this must be taken into consideration when entering numbers into the machine. Thus, for example, if the indicating tube DL1 is illuminated, the number 123 must be inserted with the 1 in the bank 4K, the 2 in the bank 3K and the 3 in the bank 2K. Similarly the number 1.4 must be inserted with the 1 in the bank 2K and the 4 in the bank 1K. During addition and subtraction, providing the numbers are correctly inserted as indicated above, the answer will remain correct without movement of the decimal point. During multiplication, however, there may be a decimal point in the multiplier as well as, or instead of, in the multiplicand. In this case, the switch DKM is closed before the first digit on the right of the decimal point is inserted into the multiplier keys and remains closed while any further digits to the right of the decimal point are being entered. Thus, for example, if 1.5 is to be multiplied by 1.5, the 1 is inserted in the order of keys 2K, the 5 is inserted in the order 1K and the key DK1 is depressed. The multiplier key MK1 is then actuated and the machine performs the first step in the calculation, as a result of which the last two indicating tubes of the register read 1.5. The switch DKM is then actuated and the multiplier key MK5 is depressed. As a result the machine shifts the digits 1 and 5 from the counting devices 2R and 1R into the counting devices 3R and 2R respectively. At the same time, during the shift cycle the gate at the input of the valve DV will open once when a pulse appears on the Z line during the period T3 and the glow in the tube DD will be stepped from cathode 1 to the cathode 2. Accordingly, the indicating tube DL1 will be extinguished and the indicating tube DL2 will be illuminated. The machine then adds 5 five times into the counting device 1R and 1 five times into the counting device 2R so that the counting device 1R reads 5, the counting device 2R reads 2 and the counting device 3R reads 2. Further, the decimal point is now situated between the display device of the counting devices 2R and 3R so that the result of the calculation is 2.25.

Figure 15:
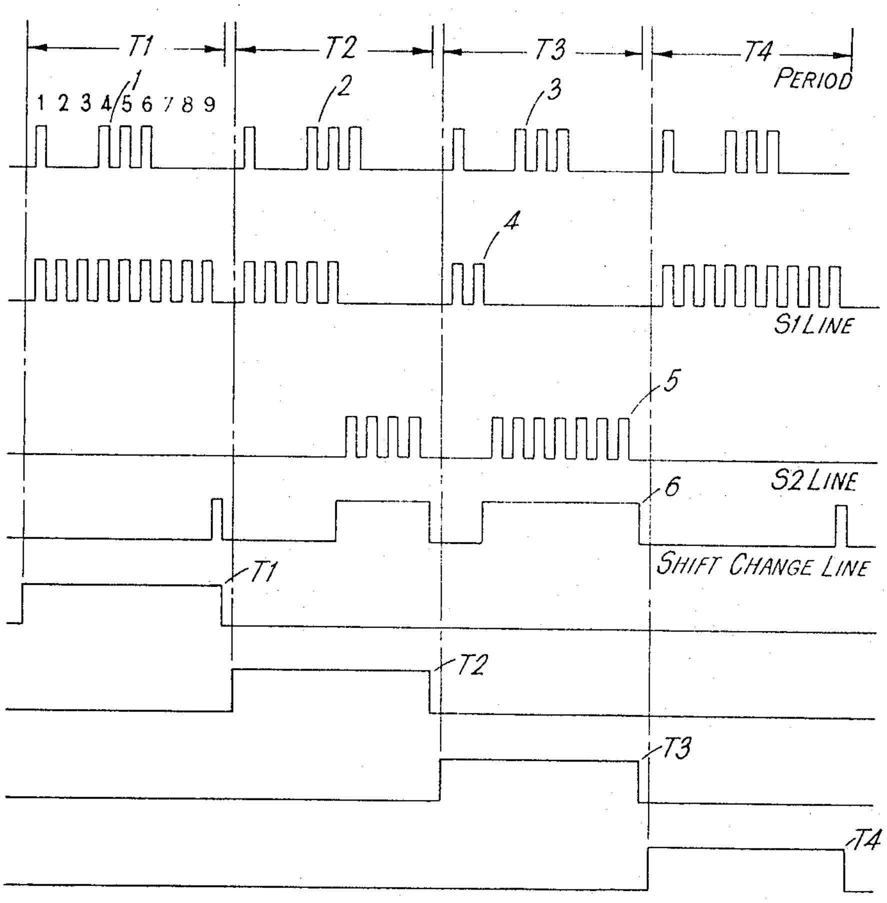
FIGURE 15 illustrates the wave forms of the outputs T1, T2, T3 and T4 of the timing device of FIGURE 14.

The terminal T connected to the moving contact of the switch TKM is used to provide an additional input to the gate circuits associated with the valve MV (FIGURE 20), and the valve PV (FIGURE 15). Normally this terminal is connected to a potential of +15 volts through the black contact of the switch TKM so that neither of these additional inputs affects the operation of the respective gate circuits. However, when the switch TKM is operated this terminal is connected to a potential of −25 volts through the rectifier DW4. As a result input pulses are prevented from reaching the grid of the valve MV so that the glow in the stepping tube MD (FIGURE 20) cannot be moved. Further, the stop potential cannot reach the grid of the left-hand triode of the valve PV with the result that this valve cannot be prevented from oscillating. However, when one of the keys TK0 to TK11 is actuated, the potential of the terminal will be raised when the glow in the stepping tube DD is resting on the cathode connected to the white contact of that key. Thus, if the key TK3, for example, is operated, the potential of the terminal T will be raised when the glow reaches the cathode 3 in the stepping tube DD.

The switch TKM is controlled by a TAB key (FIGURE 25) which is effectively a multiplier key, in the sense that, when the machine is set to perform multiplication, depression of this key opens the start contact SS, and that the key is locked in its operated position until the oscillator PV is stopped, when the key is automatically returned to its normal position.

When the tabulator keys are being used, the switch DKM is also operated so that the glow in the stepping tube DD is stepped forward one cathode each time a shift operation is performed by the machine. Thus, it will be assumed that the number 12.34 has been inserted at the right-hand end of the register, that the machine is switched to perform multiplication, that the switch DKM has been operated and that the tabulator key TK4 is depressed. If now the switch TKM is operated to start the machine, the machine will perform two shift cycles during the first of which the glow in the stepping tube DD will be stepped from the cathode 2 to the cathode 3 and during the second of which the glow will be stepped from the cathode 3 to the cathode 4. The numbers in the counting devices will also be shifted during these two shift cycles so that the number 12.34 will now be displayed in the display tubes of the counting devices 6R, 5R, 4R and 3R instead of in the display tubes of the counting devices 4R, 3R, 2R and 1R. The indicator tube DL4 situated between the display tubes and the counting devices 5R and 4R will be illuminated.

FIGURE 25 of the accompanying drawings is a plan view of the exterior of the machine hereinbefore described. This figure shows the physical arrangement of those parts of the machine which are required to be actuated or viewed by the operator.

It will be seen that the banks of keys 1K to 11K are arranged centrally on the top surface of the machine and that the bank of multiplier keys MK0 to MK9 is arranged on the right-hand side of the order of keys 1K and the bank of tabulator keys TK0 to TK11 is arranged on the left-hand side of the order of keys 11K. The cold-cathode display tubes 1RE to 12RE are arranged vertically in a housing above the general level of the top surface of the machine so that they are conveniently visible to the operator. The anodes of the display tubes 5RE to 12RE are connected to the supply through a contact which is opened when the machine is set to perform division, so that only the tubes 1RE to 4RE, which display the quotient, are illuminated. Between each pair of adjacent display tubes is one of the decimal-point-indicating tubes DL1 to DL11, and immediately in front of each of the indicating tubes DL1 to DL11 is a corresponding one of the keys DK1 to DK11.

Between the bank of multiplier keys and the order of keys 1K are two large keys 12 and 13. The former of these is the TAB key which operates the switch TKM (FIGURE 26). The key 13 is a multiplier decimal key which operates the switch DKM (FIGURE 26).

In front of the orders of keys are arranged a first bank of control keys 1 to 4 and a second bank of control keys 6 to 9. The control key 1 is pressed when the machine is required to perform addition, the control key 2 is pressed when the machine is required to perform multiplication, the control key 3 is pressed when the machine is required to perform subtraction and the control key 4 is pressed when the machine is required to perform division. The control key 6 is pressed when it is desired to return the counting devices at the left-hand side of the register to zero and the control key 7 is pressed when it is desired to return the counting devices at the right-hand side of the register to zero. Arrangements are provided for causing the key 6 to control the counting devices 7R to 12R and for the key 7 to control the counting devices 1R to 6R except when the machine is set for division, when the key 6 controls the counting devices 5R to 12R and the key 7 controls only the counting devices 1R to 4R. The switching arrangements for achieving this have not been particularly described since they will be obvious to anyone skilled in the art. The key 8 is used when it is desired to release keys in the orders of keys 1K to 11K which have been dpressed with the machine set to multiplication or division. This key is provided with an arm 5 similar to that illustrated in FIGURE 24 on the keys 1 and 3, which arm presses down the bail 30 when the key is depressed. The key 9 is used to clear any multiplier key which may not have been released as a result of interference with the normal operation of the machine during multiplication.

I claim:

1. A calculating machine including a plurality of orders of keys, a corresponding plurality of counting devices, a counting device being uniquely associated with each order of keys, one plurality of energisable electrodes arranged in a circular path and associated with said counting devices and with said orders of keys, means resulting from the actuation of a key of any one order of keys for energising a predetermined number of electrodes of the electrodes associated with said order of keys, the number of energised electrodes being related to the value of the actuated key, means for transmitting from the energised electrodes to the associated counting device a number of electrical impulses equal to the number of energised electrodes to effect a change, related to the value of the actuated key, in the registration of the said counting device, means operatively connected to the counting device of the lower order of two adjacent orders of counting devices and operable upon the counting device of the lower order registering a predetermined maximum value to feed an impulse to the counting device of the higher order and so cause the registration thereof to be increased by one, and means operable upon the actuation of a key to register a number in an associated counting device to ensure that any key of the order of keys including the actuated key is inoperable to register an additional number upon the said counting device until the number which the initially actuated key represents has been registered in the associated counting device.

2. A calculating machine comprising a plurality of pulse-operated counting devices, carry means effective between adjacent ones of said counting devices, a plurality of electrodes, a plurality of orders of keys coupled to said electrodes, each order being uniquely associated with one of said counting devices, means responsive to the actuation of any of said keys for establishing an electrical connection substantially simultaneously to a number of the electrodes equal to the value of the actuated key in its order, means for scanning all of the electrodes, and means responsive to the actuation of any of said keys for initiating a cycle of operation of the machine during which the orders of keys are successively coupled to their respective associated counting devices to cause a number of pulses equal to the value of any actuated key to be fed from the connected electrodes to the counting device associated with the order of that key.

3. A calculating machine including a plurality of orders of keys, a corresponding plurality of counting devices each counting device comprising a multi-cathode stepping electronic tube, a batch of electrodes uniquely associated with each counting device and each order of keys, means resulting from the actuation of a key of an order of keys for selecting a predetermined number of electrodes of a batch of electrodes, the selected number of electrodes being related to the value of the actuated key, means for energising the selected electrodes, means for transmitting sequentially from the energised selected electrodes of the batches of electrodes to the counting devices associated with said batches of electrodes a number of electrical impulses to each counting device equal to the number of selected electrodes associated with said counting device to effect a change, related to the value of the actuated key, in the registration of the said counting device, a valve common to the counting devices of the different orders operatively connected to the counting devices of adjacent orders in such a manner that as a result of a counting device registering a predetermined maximum value the said valve feeds an impulse to the counting device of the next higher order to increase the registration thereof by one, and a display device operatively connected to the cathodes of each counting device in such a manner that when the glow is arrested upon a cathode of the counting device the outline of a numeral corresponding to the numeral registered by the cathode of the counting device is displayed by the display device associated therewith.

4. A calculating machine comprising a plurality of impulse counting devices, one for each of a plurality of denominational orders, a plurality of sets of switches, one set uniquely associated with each of said counting devices, pulse delivery means to deliver impulses to said counting devices successively during separate phases allocated to said counting devices individually within a machine cycle and in response to the operation of a switch in each of the switch sets of said one or more counting devices, said impulses being determined in number for each of said one or more counting devices by the operated switch in the corresponding one of said sets, a single two-state carry storage device input-connected to all of said counting devices and settable to one state upon the appearance in any of said counting devices of a pulse count of predetermined value, and means responsive to the setting of said carry storage device to said one state to deliver an additional impulse to said pulse delivery means for delivery thereby to the counting device of phase succeeding that of the counting device in which said predetermined pulse count appeared.

5. A calculating machine according to claim 4 wherein said means to deliver an additional impulse comprises a second two-state device settable to a state effective for pulse delivery only upon restoration of said first two-state device to its other state, and means operative at the beginning of each of said phases to reset said first two-state device to its other state if and only if it has been set to its said one state.

6. A key controlled electronic calculating machine which comprises in combination a plurality of orders of keys, an accumulator controlled by electrical impulses uniquely associated with each order of keys, impulse distributing means operable, as a result of the actuation of any one key of an order of keys, to introduce into the accumulator associated with said order of keys an impulse or a series of impulses related to the value of the actuated key so as to increase the value registered in the accumulator by an amount equal to the complement of the value of the actuated key, an electronic stepping tube, means for shifting the contents of the accumulator associated with the highest order of keys into the said tube, means for complementing and shifting the contents of each accumulator into the accumulator associated with the next higher order of keys, means for increasing the number registered by said tube by unity each time a cycle of operation of the machine does not result in a carry from the accumulator associated with the highest order of keys, and means for initiating a number of cycles of operation of the machine equal to the number required to produce a carry from said tube.

7. A calculator comprising a plurality of accumulators, one for each of a plurality of numerical orders, a carry accumulator, separate carry means coupled between each accumulator of said plurality and the accumulator of adjacent higher order in said plurality and between the accumulator of highest order in said plurality and said carry accumulator, and means to change the count in each accumulator of said plurality except the lowest to a complement of the count in the accumulator of adjacent lower order, to change the count in said carry accumulator to a complement of the count in the accumulator of highest order in said plurality, and to change the count in the accumulator of lowest order in said plurality to a complement of the count in said carry accumulator.

8. A decimal calculator comprising a plurality of orders of keys, a plurality of accumulators, one for each of said orders, means operable, in response to the actuation of any one key in each of one or more of said orders, to introduce into the accumulators of corresponding order pulses in number equal to the nines complement of the actuated key of such order, a carry accumulator, separate impulse carry means between each accumulator of said plurality and the accumulator of adjacent higher order and between the accumulator of highest order in said plurality and said carry accumulator, and means responsive to such introduction without the occurrence of an impulse carry into said carry accumulator to shift the impulse count in each accumulator of said plurality to the nines complement of the count in the accumulator of next lower order in said plurality, to shift the count in the accumulator of lowest order in said plurality to the nines complement of the count in said carry accumulator, and to shift the count in said carry accumulator to the nines complement of the count in the accumulator of highest order in said plurality.

9. A key controlled calculating machine which comprises in combination a plurality of keys, a plurality of counting devices, each counting device being associated with a single denominational order, a plurality of circumferentially arranged stationary energisable electrodes associated with said counting devices, means resulting from the actuation of a key of said plurality of keys for selecting a predetermined number of the electrodes of the said plurality of electrodes, the selected number of electrodes being related to the value of the actuated key, means for applying a potential to each of the preselected electrodes and for transmitting in succession from said electrodes to the counting device associated with said actuated key a number of electrical impulses equal to the selected number of electrodes to effect a change, related to the value of the actuated key, in the registration of the said counting device, a multicathode stepping electronic tube, a series of multiplier keys each associated with a cathode of the multicathode stepping electronic tube, said stepping electronic tube being operable, as a result of the actuation of a multiplier key of the series of multiplier keys and after the impulse or the plurality of impulses related to the value of the actuated key of the plurality of keys have been transmitted to the associated counting device, to cause the glow on a cathode of the stepping electronic tube to be moved to the next adjacent cathode and cause the transmission means for transmitting the impulses to transmit a further impulse or a further plurality of impulses to the associated counting device, means operable, after the glow on the cathode of the stepping electronic tube has been moved sequentially from one cathode to another and has reached the cathode corresponding to the actuated multiplier key to cut off the transmission of impulses to the said associated counting device, and means operable, upon the multicathode electronic tube having ensured the transmission to the counting devices of the various orders associated with the actuated keys of the plurality of keys of a number of impulses equivalent to the product of the multiplicand by one digit of the multiplier, to transfer the numeral registered in each counting device into the counting device of the next adjacent higher order.

10. A calculating machine which comprises in combination a plurality of keys, a plurality of counting devices, a plurality of electrodes associated with said counting devices, means resulting from the actuation of a key of said plurality of keys for selecting a predetermined number of the electrodes of the said plurality of electrodes, the selected number being related to the value of the actuated key, means for transmitting from the said preselected electrodes to the counting device associated with the actuated key of said plurality of keys a number of electrical impulses related to the selected number of electrodes to effect a change, related to the value of the actuated key, in the registration of the said counting device, and two secondary sources of impulses successively connected to the counting devices of a pair of adjacent counting devices and operable to register in the counting device of the higher order the value initially registered in the lower order of the said pair of counting devices.

11. An office calculating machine which comprises in combination a plurality of orders of keys, a corresponding plurality of counting devices, a plurality of primary electrodes associated with the said orders of keys and said counting devices, means resulting from the actuation of a key of an order of keys for selecting a predetermined number of the electrodes of the said primary electrodes, the selected number of electrodes being related to the value of the actuated key, means for applying a potential to the selected primary electrodes, means operable as a result of the actuation of a key of said order of keys for effecting the sequential transmission from said electrodes to the associated counting device of a number of electrical impulses equal to the selected number of electrodes to effect a change, related to the value of the actuated key, in the registration of the said counting device, and two sources of auxiliary impulses connected successively to the counting devices of the respective orders of counting devices, one of said sources being operable to register in each counting device a predetermined numeral the registration of which causes an impulse to ensure that the second auxiliary source feeds a number of impulses into the counting device of the higher order which corresponds to the numeral initially registered in the lower order of the said pair of adjacent counting devices.

12. A calculating machine comprising a plurality of pulse-operated counting devices, a plurality of orders of keys each order being uniquely associated with one of said counting devices, means for generating and distributing electrical pulses so connected with said keys that during a cycle of operation of the machine the number registered by each counting device is changed by the application of pulses from said pulse-generating and distributing means by an amount equal to the value of any actuated key in the order of keys associated with that counting device, a series of multiplier keys, means responsive to the actuation of a multiplier key for shifting the contents of each counting device into the counting device of the next higher order, and means operative after the completion of the shift for initiating a number of cycles of operation of the machine equal to the value of the actuated multiplier key.

13. A calculating machine comprising a plurality of pulse-operated counting devices, carry means effective between adjacent ones of said counting devices, a plurality of electrodes, a plurality of orders of keys coupled to said electrodes, each order being uniquely associated with one of said counting devices, means responsive to the actuation of any of said keys for establishing an electrical connection substantially simultaneously to a number of the electrodes equal to the value of the actuated key in its order, means for scanning all the electrodes, means for coupling the orders of keys successively to their respective associated counting devices once during each cycle of operation of the machine to cause a number of pulses equal to the value of any actuated key to be fed from the connected electrodes to the counting device associated with the order of that key, a series of multiplier keys, means responsive to the actuation of a multiplier key for shifting the contents of each counting device into the counting device of the next higher order and means operative after the completion of the shift for initiating a number of cycles of operation of the machine equal to the value of the actuated multiplier key.

14. A calculating machine comprising a plurality of pulse-operated counting devices, a plurality of electrodes, a plurality of orders of keys, each order being uniquely associated with one of said counting devices, and each key being operative when actuated to establish an electrical connection substantially simultaneously to each of a number of said electrodes equal to the value of that key in its order, means for successively scanning all the electrodes, means for deriving from the scanned electrodes a number of pulses equal to the number of connected electrodes, means operative during a cycle of operation of the machine for applying to each of the counting devices a number of pulses equal to the value of any actuated key in the order of keys associated with that counting device, a series of multiplier keys, means responsive to the actuation of a multiplier key for shifting the contents of each counting device into the counting device of the next higher order, and repeating means controlled by the series of multiplier keys and operative after the completion of the shift operation to initiate a number of cycles of operation of the machine equal to the value of the actuated multiplier key.

15. A calculating machine comprising a plurality of pulse-operated decimal counting devices, carry means operative between adjacent ones of said counting devices, a plurality of orders of keys each of which orders is uniquely associated with one of said counting devices, means for causing, during a cycle of operation of the machine, the application to each counting device of a number of pulses equal to the value of any actuated key in the order of keys associated with that counting device, a series of ten multiplier keys, means responsive to the actuation of any one of said multiplier keys for generating groups of ten impulses, means for applying one of said groups of pulses to each counting device in succession until that counting device produces a carry whereafter the remainder of said group of pulses is applied to the counting device of the next higher order, and means operative after groups of pulses have been applied to all the counting devices for initiating a number of cycles of operation of the machine equal to the value of the actuated multiplier key.

16. A calculating machine comprising a plurality of multicathode electronic counting tubes, carry means operative between adjacent ones of said counting tubes, a plurality of orders of keys each order being associated with one of said counting tubes, means for generating and distributing electrical pulses so connected with said keys that during a cycle of operation of the machine a number of pulses equal to the value of any actuated key in any order is applied to the counting tube associated with that order, a multicathode electronic control tube, a series of multiplier keys each associated with a cathode of said control tube, means responsive to the actuation of any one of said multiplier keys for shifting the number registered by each counting tube to the counting tube of the next higher order, means operative after the completion of the shift for transferring the glow in said control tube to the next succeeding cathode and for initiating one cycle of operation of the machine, and means for repeating said glow transfer and said cycle initiation until the glow reaches the cathode associated with the actuated multiplier key.

17. A calculating machine comprising a plurality of pulse-operated counting devices, carry means effective between adjacent ones of said counting devices, an electronic pulse generator having a plurality of pulse outputs, a plurality of orders of keys coupled to said pulse generator each order being uniquely associated with one of said counting devices and each key being operative, when actuated, to establish an electrical connection to the pulse output corresponding to the value of that key in its order, a timing device synchronised by the pulse generator, and means controlled by the timing device for coupling the orders of keys successively to their associated counting devices to cause a number of pulses equal to the value of any actuated key to be fed from the connected pulse output to the counting device associated with the order of that key.

18. A calculating machine as claimed in claim 17 including means controlled by said timing device for disabling said pulse generator when all the orders of keys have been coupled to their associated counting devices.

19. A calculating machine comprising a plurality of pulse-operated counting devices, carry means effective between adjacent ones of said counting devices, a pulse generator having a plurality of outputs, a plurality of orders of keys coupled to said pulse generator, each order being uniquely associated with one of said counting devices, means responsive to the actuation of any of said keys for establishing an electrical connection to the pulse output corresponding to the value of the actuated key in its order, an electronic timing device, and means responsive to the actuation of any of said keys for initiating a cycle of operation of said timing device during which the orders of keys are successively coupled under the control of said timing device to their respective associated counting devices to cause a number of pulses equal to the value of any actuated key to be fed from the connected pulse generator output to the counting device associated with the order of that key.

20. A calculating machine comprising a plurality of pulse-operated counting devices, carry means effective between adjacent ones of said counting devices, a multicathode electronic stepping tube having a plurality of cathode, a plurality of orders of keys, each order being uniquely associated with one of said counting devices, means responsive to the actuation of any of said keys for establishing an electrical connection substantially simultaneously to a number of the cathodes equal to the value of the actuated key in its order, means for causing a glow to step cyclically around all the cathodes of said stepping tube, a timing device, and means including said timing device for completing said electrical connection to each of said counting devices via the keys of the order associated with such counting device during a separate cycle of operation of said stepping tube.

21. A calculating machine comprising a plurality of pulse-operated counting devices, a multicathode electronic stepping tube having a plurality of cathodes, a plurality of orders of keys coupled to said cathodes each order being uniquely associated with one of said counting devices, means responsive to the actuation of any of said keys for establishing an electrical connection substantially simultaneously to a number of the cathodes equal to the value of the actuated key in its order, means for driving said stepping tube, and gating means adapted during each of a succession of cycles of said stepping tube to connect a distinct one of said counting devices with said stepping tube via the keys of the order with which such counting device is associated.

22. A calculating machine comprising a plurality of pulse-operated counting devices, a plurality of orders of keys each order being uniquely associated with one of said counting devices, a pulse generator having a plurality of pulse outputs, means responsive to the actuation of any key in said orders of keys for establishing an electrical connection to the pulse output corresponding to the value of the actuated key in its order, means for coupling the orders of keys successively to their respective associated counting devices, a series of multiplier keys, means responsive to the actuation of a multiplier key for effecting multiplication by ten by shifting the contents of each counting device into the counting device of the next higher order, and means responsive to the completion of the shift operation for initiating a number of cycles of operation of said coupling means equal to the value of the actuated multiplier key during each of which cycles the number registered by each counting device is increased by the application of pulses from the pulse generator by an amount equal to the value of any actuated key in the order of keys associated with that counting device.

23. A calculating machine comprising a plurality of pulse-operated counting devices, carry means effective between adjacent ones of said counting devices, an electronic stepping tube having a plurality of cathodes, a plurality of orders of keys coupled to said cathodes, each order being uniquely associated with one of said counting devices, a timing device synchronised by said stepping tube, means responsive to the actuation of any of said keys for establishing an electrical connection substantially simultaneously to a number of the cathodes equal to the value of the actuated key in its order, means for driving the stepping tube, means controlled by the timing device for coupling the orders of keys successively to their respective associated counting devices once during each cycle of operation of the timing device to cause a number of pulses equal to the value of any actuated key to be fed from the connected cathodes to the counting device associated with the order of that key, a series of multiplier keys, means for effecting multiplication by ten by shifting the contents of each counting device into the counting device of the next higher order, and means for initiating a number of cycles of operation of the timing device equal to the value of the actuated multiplier key.

24. A calculating machine comprising a plurality of pulse-operated decimal counting devices, carry means operative between adjacent ones of said counting devices, a plurality of orders of keys each of which orders is uniquely associated with one of said counting devices, a pulse generator having a plurality of outputs, means responsive to the actuation of a key in any of said orders of keys for causing, during a normal cycle of operation of the machine, the application to each counting device of a number of pulses from said pulse generator equal to the value of any actuated key in the order of keys associated with that counting device, a series of ten multiplier keys, means responsive to the actuation of any one of said multiplier keys for initiating an abnormal cycle of operation of the machine, means operative during said abnormal cycle for applying a group of nine pulses to each counting device in succession until that counting device registers nine whereafter the remainder of said group of nine pulses is applied to the counting device of the next higher order, means operative during said abnormal cycle for applying one additional pulse to the counting device of the lowest order, and means operative after the said groups of pulses have been applied to all the counting devices for initiating a number of normal cycles of operation of the machine equal to the value of the actuated multiplier key.

25. A calculating machine comprising a plurality of multicathode electronic counting tubes, carry means operative between adjacent ones of said counting tubes, a plurality of orders of keys each order being associated with one of said counting tubes, a pulse generator having a plurality of outputs each of which is associated with a key having a particular value in each order, means responsive to the actuation of any of said keys for causing the pulse generator output associated with the value of the actuated key to be connected once during a cycle of operation of the machine to the counting tube associated with the order of the actuated key to cause a number of pulses equal to the value of the actuated key to be applied to said counting tube, a multicathode electronic control tube, a series of multiplier keys each associated with a cathode of said control tube, means responsive to the actuation of any one of said multiplier keys for shifting the number registered by each counting tube to the counting tube of the next higher order, means operative after the completion of the shift for transferring the glow in said control tube to the next succeeding cathode and for initiating one cycle of operation of the machine, and means for repeating said glow transfer and said cycle initiation until the glow reaches the cathode associated with the actuated multiplier key.

26. A calculating machine comprising a plurality of pulse-operated counting devices, a plurality of orders of keys each order being uniquely associated with one of said counting devices, a pulse generator having a plurality of pulse outputs, means responsive to the actuation of any key in said orders of keys for establishing an electrical connection to the pulse output corresponding to the value of the actuated key in its order, means for coupling the orders of keys successively to their respective associated counting devices, a series of multiplier keys, means responsive to the actuation of a multiplier key for initiating a number of cycles of operation of said coupling means equal to the value of the actuated multiplier key during each of which cycles the number registered by each counting device is increased by the application of pulses from the pulse generator by an amount equal to the value of any actuated key in the order of keys associated with that counting device, and means for shifting the contents of each counting device resulting from the first of two successive actuations of multiplier keys into the counting device of the next higher order.

27. A calculating machine comprising a plurality of pulse-operated counting devices, carry means effective between adjacent ones of said counting devices, a plurality of orders of keys each order being uniquely associated with one of said counting devices, a pulse generator having a plurality of pulse outputs each associated with the complement of the value of one of the keys in each order, means responsive to the actuation of a key in any of said orders of keys for establishing an electrical connection to the pulse output associated with the complement of the value of that key, means operative during a cycle of operation of the machine for causing the number registered by each counting device to be increased by the application of pulses from said pulse generator by an amount equal to the complement of the value of any actuated key in the order of keys associated with that counting device, first and second electronic stepping tubes, means for complementing and shifting the number registered by the counting device associated with the highest order of keys into the first electronic stepping tube, means for complementing and shifting the number registered by each other counting device into the counting device associated with the next higher order of keys, means for complementing and shifting the number registered by the second electronic stepping tube into the counting device associated with the lowest order of keys, means for initiating a number of cycles of operation of the machine equal to the number required to cause the first electronic stepping tube to register a predetermined number, and means for increasing the number registered by the second electronic stepping tube by unity each time a cycle of operation of the machine takes place.

28. A calculating machine comprising a series of first counting devices, a second counting device, and a third counting device, carry means effective between adjacent ones of said first counting devices and between the highest of said first counting devices and said second counting device, a plurality of orders of keys each order being uniquely associated with a respective one of said first counting devices, control means for selecting primary or secondary cycles of operation of the machine, means operative during a primary cycle of operation of the machine for causing the number registered by each counting device to be increased by an amount equal to the complement of the value of any actuated key in the order of keys associated with that counting device, means operative during a secondary cycle of operation of the machine for complementing and shifting the number registered by said highest first counting device into said second counting device, for complementing and shifting the number registered by each of said first counting devices except said highest first counting device into the next higher counting device, and for complementing and shifting the number registered by said third counting device into the lowest of said first counting devices, means for causing said control means to select a secondary cycle when said second counting device registers a predetermined number and a primary cycle when said second counting device fails to register said predetermined number, and means for causing said third counting device to register the number of primary cycles performed by the machine.

29. A calculating machine comprising a plurality of pulse-operated counting devices, a plurality of orders of manually actuatable keys each order of keys being uniquely associated with one of said counting devices, means operative during a cycle of operation of the machine for applying a number of pulses related to the value of any actuated key to the counting device associated with the order of that key, switching means for setting the machine to perform a plurality of different arithmetical operations including addition and multiplication, a plurality of multiplier keys, locking means operative upon operation of said switching means to set the machine for multiplication to prevent any actuated key in any of said orders from returning to its unactuated position when released until the machine has gone through a number of said cycles equal to the value of an actuated multiplier key, and means controlled by said switching means for disabling said locking means when the machine is set to perform addition.

30. A calculating machine comprising a plurality of orders of keys, a plurality of counting devices one associated with each order of keys, a multioutput pulse generator, an electronic multicathode stepping tube driven by said pulse generator, means responsive to the actuation of any of said keys for establishing an electrical connection to an output of said pulse generator corresponding to the value of the actuated key in its order, means for retaining the glow in said stepping tube on a first predetermined cathode, means responsive to the actuation of any of said keys for disabling said glow-retaining means and thus allowing the glow to be stepped successively among the cathodes, means controlled by the potential on a plurality of the cathodes of said stepping tube for coupling the orders of keys successively to their respective associated counting devices, and means controlled by the potential on a second predetermined cathode of said stepping tube for stopping said pulse generator.

31. A calculating machine comprising a plurality of orders of keys, a plurality of counting devices one associated with each order of keys, a separate gating device between each order of keys and its associated counting device, a multicathode electronic stepping tube, and means for driving said stepping tube, wherein the potential on each of at least some of the cathodes of said stepping tube is operative to open a respective one of said gating devices when the glow is on said cathode.

32. A calculating machine comprising a plurality of orders of keys, a plurality of counting devices one associated with each order of keys, a gating device between each order of keys and its associated counting device, a plurality of multicathode electronic stepping tubes, means for driving said stepping tubes sequentially, and connections between at least some of the cathodes of each stepping tube and respective ones of said gating devices, whereby each gating device is opened when the glow is on the cathode connected thereto.

33. A calculating machine comprising a pulse generator, a plurality of orders of keys coupled to said pulse generator, a plurality of counting devices one associated with each order of keys, a separate first gating device between each order of keys and its associated counting device, two multicathode electronic stepping tubes, means coupled to said pulse generator for driving each of said stepping tubes, a separate second gating device between the pulse generator and each of said driving means, a connection between at least one cathode of each stepping tube and the second gating device controlling the driving means of the other stepping tube, whereby each second gating device is opened when the glow is on a cathode connected thereto, and connections between at least some of the cathodes of each stepping tube and respective ones of said first gating devices, whereby each first gating device is opened when the glow is on the cathode connected thereto.

34. A calculating machine comprising a plurality of pulse-operated counting devices, an electronic pulse generator, a plurality of orders of keys coupled to said pulse generator each order being associated with one of said counting devices and each key being operative, when actuated, to select during each cycle of operation of the pulse generator a number of pulses equal to the value of that key in its order, a timing device controlled by said pulse generator and operative to couple the orders of keys successively to their respective associated counting devices, a series of multiplier keys each of which is operative, when actuated, to initiate the operation of the timing device and to stop the pulse generator when the timing device has performed a number of cycles equal to the value of the actuated multiplier key, latching means for retaining any actuated multiplier key in its operated position, and means controlled by the pulse generator for releasing said latching means when the pulse generator stops.

35. A calculating machine according to claim 34 wherein said pulse generator comprises a multicathode electronic stepping tube driven by a free-running oscillator and wherein a voltage is derived from said oscillator and used to control a solenoid which when energised holds said latching means in the locked position.

36. A calculating machine according to claim 34, wherein said pulse generator comprises a multicathode electronic stepping tube driven by a free-running oscillator, wherein a voltage is derived by means of a rectifier from said oscillator and is applied to the control electrode of a trigger tube, and wherein a solenoid, which when energised holds said latching means in the locked position, is included in the anode circuit of said trigger tube.

37. A calculating machine including a series of pulse-operated counting devices, carry means operative between adjacent counting devices in said series, an electronic pulse generator adapted to produce groups of pulses, means for applying pulses from a separate one of said groups of pulses to each counting device until it is full and for applying the remainder of said group of pulses to the next higher counting device in said series.

38. A calculating machine as claimed in claim 37, including means for applying one additional pulse to the lowest counting device in said series, wherein pulses from a first one of said groups of pulses are applied to the highest counting device in said series, the remainder of that group after the highest counting device is full being applied to the lowest counting device in the series, and wherein pulses from succeeding groups of pulses are applied successively to the remaining counting devices in order from the second highest in the series to the lowest.

39. A calculating machine including a series of pulse-operated counting devices, a plurality of orders of keys associated with said counting devices, a pulse generator which comprises a multicathode electronic stepping tube driven by a free-running oscillator, a gating circuit between each order of keys and its associated counting device, and a transformer the primary winding of which is energised from the circuit of said oscillator and the secondary of which supplies a drive voltage for each of said gating circuits.

40. A calculating machine as claimed in claim 39, wherein each gating circuit comprises a first resistor, a first asymmetrically conducting device and a second resistor connected in series between a terminal of the secondary winding of said transformer and one of the guide electrodes of said multicathode electronic stepping tube, an output terminal connected to the junction between the first asymmetrically conducting device and the second resistor, and a plurality of input terminals connected to the junction between the first resistor and the first asymmetrically conducting device through individual second asymmetrically conducting devices directed oppositely to said first asymmetrically conducting device, wherein the output terminal of each gating circuit is operatively connected to the input of the associated counting device, and wherein one of the input terminals of each gating circuit is operatively connected through its associated order of keys to the output of the pulse generator.

41. A key operated calculating machine comprising a series of pulse-operated counting devices, means for initiating shift cycles during each of which the content of the highest counting device in the series is shifted into the lowest counting device in the series, and for shifting the content of each counting device except the highest in the series into the next higher counting device in the series, a multicathode electronic stepping tube, a control terminal, means for connecting said control terminal to any selected one of the cathodes of said stepping tube, means for driving said stepping tube so that the glow is advanced by one cathode during each shift cycle, and means coupled to said control terminal for terminating a series of shift cycles when the glow in the stepping tube reaches the cathode connected to said control terminal.

42. A calculating machine comprising a plurality of pulse-operated counting devices, carry means effective between adjacent ones of said counting devices, an electronic stepping tube having a plurality of cathodes, a plurality of orders of keys coupled to said cathodes, each order being uniquely associated with one of said counting devices, an "add-substract" switch, means responsive to the actuation of any of said keys for establishing an electrical connection substantially simultaneously to a number of said cathodes, said number being equal to the value of the actuated key in its order when the add-subtract switch is in the add position and equal to the complement of the value of the actuated key when the add-subtract switch is in the subtract position, means for driving the stepping tube, and means for initiating a cycle of operation of the machine during which the orders of keys are successively coupled to their respective associated counting devices to cause a number of pulses equal to the number of connected cathodes to be fed from the connected cathode to the counting device associated with the order of that key.

43. A calculating machine including a series of pulse-operated counting devices, carry means operative between adjacent counting devices in said series, an electronic pulse generator adapted to produce groups of pulses, means for applying pulses from successive ones of said groups of pulses to successive pairs of adjacent counting devices in said series until that one of said adjacent counting devices which is lower in said series is full.

44. A calculating machine including a series of counting devices arranged as a register, means for entering a plural-digit dividend into said reigster, divisor-storing means, means for performing repeated subtraction of a number stored in the divisor-storing means from the dividend entered in the register, means for counting the number of subtractions performed, means for ascertaining when said repeated subtraction has caused the number in the register to be reduced below zero, and means operated in response to said ascertaining means for stopping the repeated subtraction and causing the digits of the number in the register to be shifted into counting devices of higher order in said register and complemented.

45. A key operated calculating machine comprising a series of pulse-operated counting devices, a series of cold-cathode display tubes one associated with each counting device for displaying the numbers registered in said counting devices, a multicathode electronic stepping tube, a series of cold-cathode indicating tubes one located in association with the space between each pair of adjacent display tubes and adapted to light when the glow in the stepping tube rests on the cathode of the stepping tube associated with such indicating tube, a plurality of decimal point keys associated with the cathodes of said stepping tube arranged to determine the cathode on which the glow rests, a plurality of multiplier keys, repeating means for causing the machine to perform a number of addition cycles equal to the value of an actuated multiplier key, and means operable after one of said decimal point keys has been actuated for applying a pulse to the drive electrodes of said stepping tube for each depression of a multiplier key.

References Cited by the Examiner

UNITED STATES PATENTS

| | | | |
|---|---|---|---|
| 2,442,428 | 6/1948 | Mumma | 235—160 |
| 2,556,200 | 6/1951 | Lesti | 307—88.5 |
| 2,557,729 | 6/1951 | Eckert | 307—88.5 |
| 2,845,597 | 7/1958 | Perkins | 235—154 X |
| 2,986,333 | 5/1961 | Thomas | 235—160 |
| 3,104,316 | 9/1963 | Allen et al. | 235—160 |

MALCOLM A. MORRISON, *Primary Examiner.*

ROBERT C. BAILEY, *Examiner.*

M. P. ALLEN, M. J. SPIVAK, *Assistant Examiners.*